United States Patent
Bang et al.

(10) Patent No.: US 11,099,812 B2
(45) Date of Patent: Aug. 24, 2021

(54) DEVICE AND METHOD FOR PERFORMING FUNCTIONS

(71) Applicant: SAMSUNG ELECTRONICS CO., LTD., Suwon-si (KR)

(72) Inventors: Han-min Bang, Suwon-si (KR); Hyok-sung Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/984,951

(22) Filed: Aug. 4, 2020

(65) Prior Publication Data

US 2020/0364028 A1  Nov. 19, 2020

Related U.S. Application Data

(63) Continuation of application No. 16/127,943, filed on Sep. 11, 2018, now Pat. No. 10,768,892, which is a
(Continued)

(30) Foreign Application Priority Data

Jul. 31, 2014 (KR) ........................ 10-2014-0098627
Nov. 14, 2014 (KR) ........................ 10-2014-0159183
Feb. 23, 2015 (KR) ........................ 10-2015-0025234

(51) Int. Cl.
*G06F 3/16* (2006.01)
*G06F 9/451* (2018.01)
(Continued)

(52) U.S. Cl.
CPC ............ *G06F 3/167* (2013.01); *G06F 3/0481* (2013.01); *G06F 3/04842* (2013.01);
(Continued)

(58) Field of Classification Search
CPC ........ G06F 3/167; G06F 9/5044; G06F 9/451; G06F 3/04842; G06F 3/04883;
(Continued)

(56) References Cited

U.S. PATENT DOCUMENTS 5,471,521 A  11/1995  Minakami
6,782,423 B1  8/2004  Nakayama
(Continued)

FOREIGN PATENT DOCUMENTS

CN  102105929 A  6/2011
CN  103064828 A  4/2013
(Continued)

OTHER PUBLICATIONS

Communication dated Dec. 18, 2017, from the State Intellectual Property Office of People's Republic of China in counterpart Application No. 201510463464.0.
(Continued)

*Primary Examiner* — Andrey Belousov
(74) *Attorney, Agent, or Firm* — Sughrue Mion, PLLC

(57) ABSTRACT

Provided is a device including a display, an audio inputter, and a controller. The display displays at least one screen page of an application that is being executed. The audio inputter receives a voice command of a user. The controller performs an operation corresponding to the voice command by using screen page transition information for transition between application screen pages corresponding to the voice command, which is obtained from information about user interface (UI) elements included in the application screen pages of the application. Each of the UI elements performs a predetermined function when selected by the user.

24 Claims, 80 Drawing Sheets

Related U.S. Application Data continuation of application No. 14/813,959, filed on Jul. 30, 2015, now Pat. No. 10,127,011.

(51) Int. Cl.
| | |
|---|---|
| *G06F 3/0481* | (2013.01) |
| *G06F 3/0488* | (2013.01) |
| *G06F 9/50* | (2006.01) |
| *H04M 1/724* | (2021.01) |
| *G06F 3/0484* | (2013.01) |
| *H04M 1/7243* | (2021.01) |

(52) U.S. Cl.
CPC .......... *G06F 3/04883* (2013.01); *G06F 9/451* (2018.02); *G06F 9/5044* (2013.01); *G06F 9/5055* (2013.01); *H04M 1/724* (2021.01); *G06F 2203/0381* (2013.01); *H04M 1/7243* (2021.01); *H04M 2250/74* (2013.01)

(58) Field of Classification Search
CPC ................. G06F 3/0481; G06F 9/5055; G06F 2203/0381; H04M 1/72519; H04M 1/72547; H04M 2250/74
See application file for complete search history.

(56) References Cited

U.S. PATENT DOCUMENTS

| | | | |
|---|---|---|---|
| 7,587,670 | B2 | 9/2009 | Snover et al. |
| 7,827,035 | B2 | 11/2010 | Grant et al. |
| 7,831,660 | B2 | 11/2010 | Park |
| 8,452,602 | B1 | 5/2013 | Bringert et al. |
| 8,560,324 | B2 | 10/2013 | Shin et al. |
| 8,713,119 | B2 | 4/2014 | Lindahl |
| 8,818,816 | B2 | 8/2014 | Inoue et al. |
| 2004/0010410 | A1 | 1/2004 | Oh et al. |
| 2005/0091582 | A1 | 4/2005 | Snover et al. |
| 2008/0059195 | A1 | 3/2008 | Brown |
| 2008/0162138 | A1 | 7/2008 | Gurram et al. |
| 2008/0288260 | A1 | 11/2008 | Cho et al. |
| 2010/0312547 | A1 | 12/2010 | Van Os et al. |
| 2011/0178804 | A1 | 7/2011 | Inoue |
| 2012/0130712 | A1* | 5/2012 | Shin .................... G06F 3/167 704/231 |
| 2012/0209608 | A1 | 8/2012 | Lee |
| 2013/0085761 | A1 | 4/2013 | Bringert et al. |
| 2013/0179173 | A1 | 7/2013 | Lee et al. |
| 2013/0275164 | A1 | 10/2013 | Gruber et al. |
| 2015/0319006 | A1 | 11/2015 | Plummer |

FOREIGN PATENT DOCUMENTS

| | | | |
|---|---|---|---|
| CN | 103428355 | A | 12/2013 |
| CN | 103559242 | A | 2/2014 |
| EP | 1 701 247 | A2 | 9/2006 |
| EP | 2 555 538 | A1 | 2/2013 |
| EP | 2 753 021 | A1 | 7/2014 |
| KR | 10-2002-0080174 | A | 10/2002 |
| KR | 10-2009-0107365 | A | 10/2009 |
| TW | 201403457 | A | 1/2014 |
| WO | 2007/055470 | A1 | 5/2007 |

OTHER PUBLICATIONS

Communication dated Feb. 5, 2018, from the European Patent Office in counterpart European Application No. 15179188.6.
Communication dated Jan. 9, 2020, issued by the Indian Patent Office in counterpart Indian Application No. 2727/MUM/2015.
Communication dated Sep. 5, 2018, from the Chinese Patent Office in counterpart Chinese Application No. 201510463464.0.
Google Voice Search (http://www.youtube.com/watch?v=PS1FbB5qWEI ) Web Based Video Published Nov. 12, 2014.
Office Action dated Jul. 30, 2019 by the Taiwan Intellectual Property Office in counterpart Taiwanese Patent Application No. 104123797.
Communication dated Mar. 18, 2016 issued by European Patent Office in counterpart European Patent Application No. 15179188.6.
Communication dated Oct. 21, 2015, issued by the International Searching Authority in counterpart International Application No. PCT/KR2015/007524 (PCT/ISA/210 & PCT/ISA/237).
Search Report dated Oct. 1, 2019 by the European Patent Office in counterpart European Patent Application No. 19173177.7.
Walsh, Robert, "Designing Accessories for iOS and OS X—Session 701", Core OS, #WWDC14, Jul. 7, 2014, https://gist.github.com/jianpx/eea1e938d5868e980b11/revisions, XP055625482.
Communication dated Jun. 29, 2021, issued by the Korean Intellectual Property Office in Korean Application No. 10-2015-0025234.

* cited by examiner

<control type="FrameLayout" resourceID="cover" isClickable="true" isLongClickable="false" isScrollable="false" isFocusable="false" />
<control type="ImageView" resourceID="thumbnail" isClickable="true" isLongClickable="false" isScrollable="false" isFocusable="false" />
<control type="ImageButton" resourceID="custom" isClickable="true" isLongClickable="false" isScrollable="false" isFocusable="true" />
<control type="ImageButton" resourceID="profile_settings" isClickable="true" isLongClickable="false" isScrollable="false" isFocusable="true" />
<control type="View" resourceID="profile" isClickable="true" isLongClickable="false" isScrollable="false" isFocusable="false" />
<control type="TextView" resourceID="nickname" isClickable="false" isLongClickable="false" isScrollable="false" isFocusable="false" />
<control type="Button" resourceID="dial" isClickable="true" isLongClickable="false" isScrollable="false" isFocusable="true" />
<control type="Button" resourceID="chat" isClickable="true" isLongClickable="false" isScrollable="false" isFocusable="true" />
<control type="Button" resourceID="extra" isClickable="true" isLongClickable="false" isScrollable="false" isFocusable="true" />
<control type="ImageButton" resourceID="close" isClickable="true" isLongClickable="false" isScrollable="false" isFocusable="true" />

```

[Feature] Chat Window Open
[Resource] Type=Button, ResourceID=chat, isClickable=true, isLongClickable=false, isScrollable=false, isFocusable=false

```
<transition sourceUIPageID="friendSummay" targetUIPageID="chatroom" action="Click" >
  <filter>
    <filterEntry filterType="FilterByClassType" filterClassType="Button" />
    <filterEntry filterType="FilterByResourceID" filterResourceID="chat" />
  </filter>
</transition>
```

FIG. 15

SCREEN COMPONENT INFORMATION (1500)

```xml
<xml version="1.0">
<app Descriptor>
  <appName>OOOTalk</appName>
  <appPackageName>com.kko.talk</appPackageName>

<UIPage ID="uniqueID1">
      <Control resourceID="friendName" type="Textview" isClickable=false ··· />
      <Control resourceID="chat" type="Button" isClickable=true ··· />

<UIPage ID="uniqueID2">
      <Control resourceID="voicetalk" type="button" isClickable=true ··· />
      <Control resourceID="call" type="Button" isClickable=true ··· />

•
       •

<Feature Manager>
    <app Feature name="VoiceTalk" UIPage="uniqueID2" resourceID="voicetalk" action="Click" />
    </appFeature>
    <app Feature name="SendMessage" UIPage="uniqueID3" resourceID="send" action="Click" />
    </appFeature>
       •
       •
  </Feature Manager>

<State Machine>
    <transition action="Click" source="uniqueID1" target="uniqueID2" resourceID="chat" />
    </transition>
    <transition action="Click" source="uniqueID3" target="uniqueID2" resourceID="chat" />
    </transition>
       •
       •
  </state machine>
</app Descriptor>
```

| UI Page (1610) | Controls (1620) | UI Transition (1630) | Features (1640) |
|---|---|---|---|
| FRIENDLISTTAB (First Page) | type="TextView" resourceID="global_header_title_text"<br>type="TabHost" resourceID="tabhost"<br>type="TabWidget" resourceID="tabs"<br>type="TextView" resourceID="badge"<br>type="ViewPager" resourceID="viewpager"<br>type="FrameLayout" resourceID="tab"<br>type="ExpandableListView" resourceID="ex_list_view"<br>type="ImageView" resourceID="icon"<br>type="LinearLayout" resourceID="search_area"<br>type="EditText" resourceID="text_edit"<br>type="TextView" resourceID="title"<br>type="View" resourceID="profile"<br>type="TextView" resourceID="name"<br>type="TextView" resourceID="message" | friendListTab -> chatListTab, action="Click" resourceFilter<br>friendListTab -> searchFriendTab, action="Click" resourceFilter<br>friendListTab -> moreTab, action="Click" resourceFilter<br>friendListTab -> friendSummary, action="Click" resourceID="name"<br>friendListTab -> $EXIT$, action="KeyEvent" key="BackKey" | Friend Information |
| CHATLISTTAB (Second Page) | type="TextView" resourceID="global_header_title_text"<br>type="ImageButton" resourceID="start_new_chat"<br>type="TabHost" resourceID="tabhost"<br>type="TabWidget" resourceID="tabs"<br>type="TextView" resourceID="badge"<br>type="ViewPager" resourceID="viewpager"<br>type="FrameLayout" resourceID="tab"<br>type="ListView" resourceID="list"<br>type="ImageButton" resourceID="btn_create"<br>type="ImageView" resourceID="icon"<br>type="View" resourceID="profile"<br>type="TextView" resourceID="name"<br>type="TextView" resourceID="time"<br>type="TextView" resourceID="message" | chatListTab -> friendListTab, action="Click" resourceFilter<br>chatListTab -> searchFriendTab, action="Click" resourceFilter<br>chatListTab -> moreTab, action="Click" resourceFilter<br>chatListTab -> $EXIT$, action="KeyEvent" key="BackKey" | |

| UI Page (1610) | Controls (1620) | UI Transition (1630) | Features(1640) |
|---|---|---|---|
| SEARCHFRIENDTAB (Third Page) | type="TextView" resourceID="global_header_title_text"<br>type="TabHost" resourceID="tabhost"<br>type="TabWidget" resourceID="tabs"<br>type="TextView" resourceID="badge"<br>type="ViewPager" resourceID="viewpager"<br>type="FrameLayout" resourceID="tab"<br>type="ExpandableListView" resourceID="ex_list_view"<br>type="ImageView" resourceID="icon"<br>type="LinearLayout" resourceID="search_area"<br>type="LinearLayout" resourceID="qr_code"<br>type="TextView" resourceID="title"<br>type="TextView" resourceID="textView_view_all"<br>type="View" resourceID="profile"<br>type="TextView" resourceID="textView_name"<br>type="TextView" resourceID="textView_contents"<br>type="ImageButton" resourceID="button_add" | searchFriendTab -> friendListTab, action="Click" resourceFilter<br>searchFriendTab -> chatListTab, action="Click" resourceFilter<br>searchFriendTab -> moreTab, action="Click" resourceFilter<br>searchFriendTap -> $EXIT$, action="KeyEvent" key="BackKey" | |
| MORETAB (Fourth Page) | type="TextView" resourceID="global_header_title_text"<br>type="TabHost" resourceID="tabhost"<br>type="TabWidget" resourceID="tabs"<br>type="ViewPager" resourceID="viewpager"<br>type="FrameLayout" resourceID="tab"<br>type="ScrollView" resourceID="more_function_listLayout"<br>type="ImageView" resourceID="icon"<br>type="GridView" resourceID="more_function_grid"<br>type="TextView" resourceID="kakao_app_title"<br>type="Button" resourceID="app_center_button"<br>type="GridView" resourceID="apps_grid"<br>type="ImageView" resourceID="banner"<br>type="TextView" resourceID="function_name"<br>type="TextView" resourceID="app_name" | moreTab -> friendListTab, action="Click" resourceFilter<br>moreTab -> chatListTab, action="Click" resourceFilter<br>moreTab -> searchFriendTab, action="Click" resourceFilter<br>moreTab -> $EXIT$, action="KeyEvent" key="BackKey" | |

| UI Page (1610) | Controls (1620) | UI Transition (1630) | Features (1640) |
|---|---|---|---|
| FRIENDSUMMARY (Fifth Page) | type="FrameLayout" resourceID="cover"<br>type="ImageView" resourceID="thumbnail"<br>type="ImageButton" resourceID="custom"<br>type="ImageButton" resourceID="profile_settings"<br>type="View" resourceID="profile"<br>type="TextView" resourceID="nickname"<br>type="Button" resourceID="dial"<br>type="Button" resourceID="chat"<br>type="Button" resourceID="extra"<br>type="ImageButton" resourceID="close" | friendSummary -> chatroom, action="Click" resourceID="chat"<br>friendSummary -> friendListTab, action="KeyEvent" key="BackKey" | Chat Window Open, Phone Call, VoiceTalk |
| CHATROOM (Sixth Page) | type="ListView" resourceID="chat_log_list"<br>type="LinearLayout" resourceID="back_button"<br>type="LinearLayout" resourceID="input_window_layout"<br>type="TextView" resourceID="txt_custom_title"<br>type="View" resourceID="media_send_button"<br>type="LinearLayout" resourceID="ll_message_edit_text"<br>type="Button" resourceID="send"<br>type="EditText" resourceID="message_edit_text"<br>type="ImageButton" resourceID="emoticon_button" | chatRoom -> chatListTab, action="KeyEvent" key="BackKey"<br>chatRoom -> FriendTab, action="KeyEvent" key="BackKey" | Message Transmission, Picture Transmission |

```
                                                                   1710
<filter useScrollMode="true" scrollResourceID="ex_list_view">
        <filterEntry filterType="FilterByClassType" filterClassType="TextView" />
        <filterEntry filterType="FilterByUserArgument" />
</filter>
```

| PackageName (1910) | AppName (1920) | AppVersion (1930) | Screen Description Version (1940) | Usage (1950) |
|---|---|---|---|---|
| jp.nav.chat1.android | Chatting app 1 | 1.0.0.1 | 1.0.0.1.1 | 105 |
| com.chat2.talk | Chatting app 2 | 2.3.4.1 | 2.3.4.1.2 | 50 |
| photo.camera.hdcameras | Camera app | 3.1.2.4 | 3.1.2.4.5 | 10 |
| com.sec.chat3 | Chatting app 3 | 2.1.1.4 | 2.1.1.4.3 | 201 |

FIG. 19B

```
<packageManager>

<item key="jp.nav.chat1.android">
<package appName="chatting app 1" packageName="jp.nav.chat1.android"
appVersion="1.0.0.1" screenDescriptionVersion="1.0.0.1.1" usage="105" />
</item>

<item key="com.chat2.talk">
<package appName="chatting app 2" packageName="com.chat2.talk"
appVersion="2.3.4.1" screenDescriptionVersion="2.3.4.1.2" usage="50" />
</item>

<item key="photo.camera.hdcameras">
<package appName="camera" packageName="photo.camera.hdcameras"
appVersion="3.1.2.4" screenDescriptionVersion="3.1.2.4.5" usage="10" />
</item>

<item key="com.sec.chat3">
<package appName="chatting app 3" packageName="com.sec.chat3"
appVersion="2.1.1.4" screenDescriptionVersion="2.1.1.4.3" usage="201" />
</item>

...

</packageManager>
```

FIG. 21
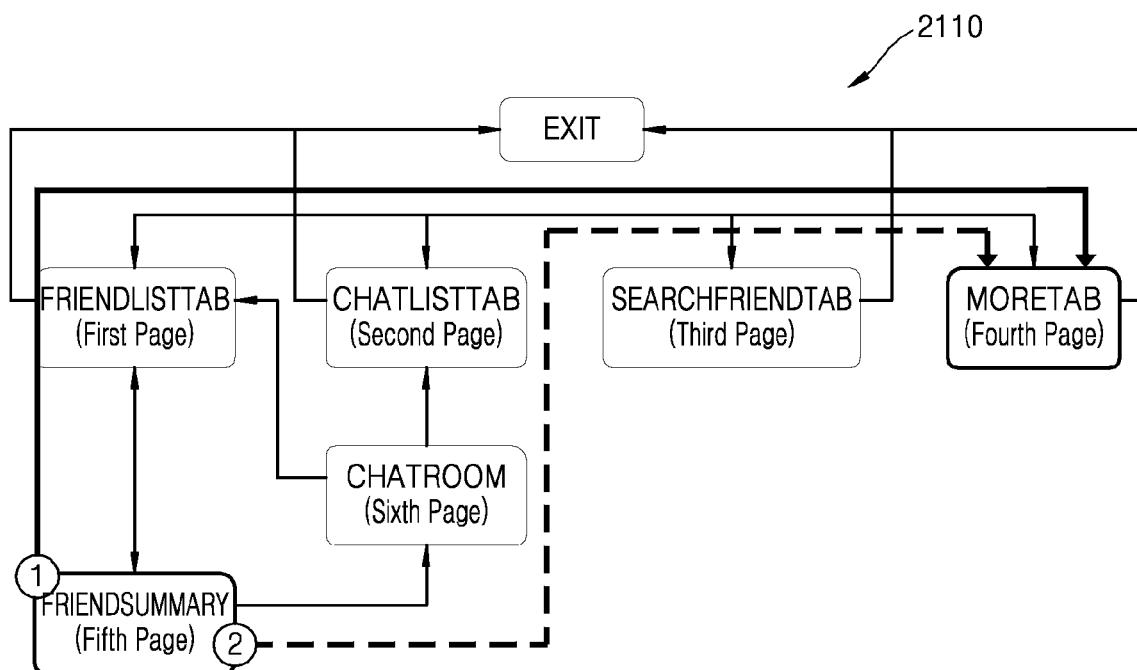
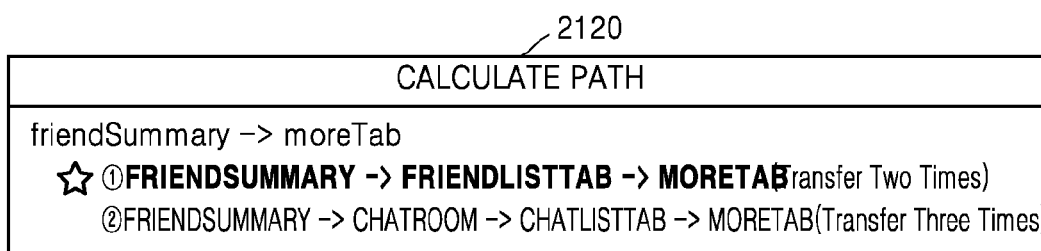

FIG. 22A
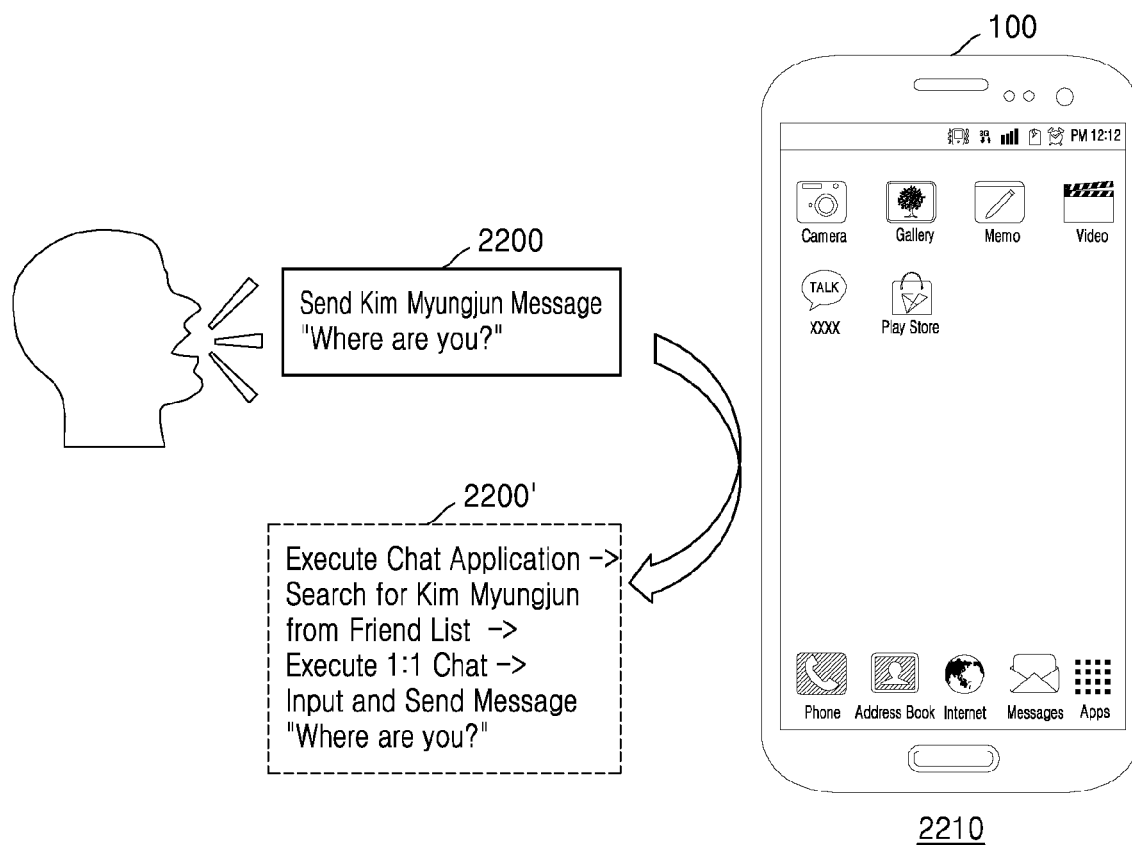
<PAGE TRANSITION PATH>
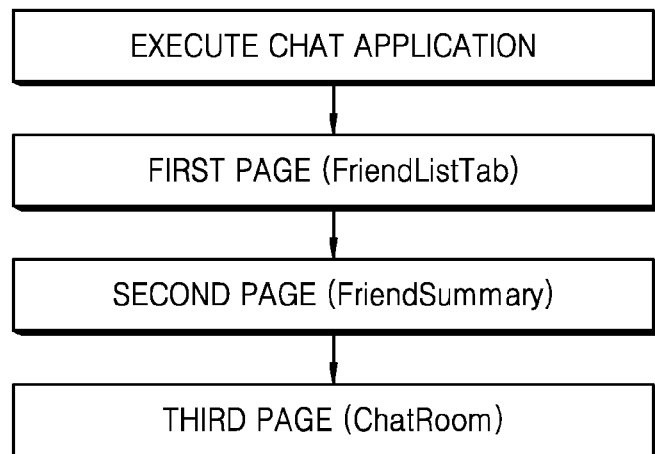

FIG. 22B
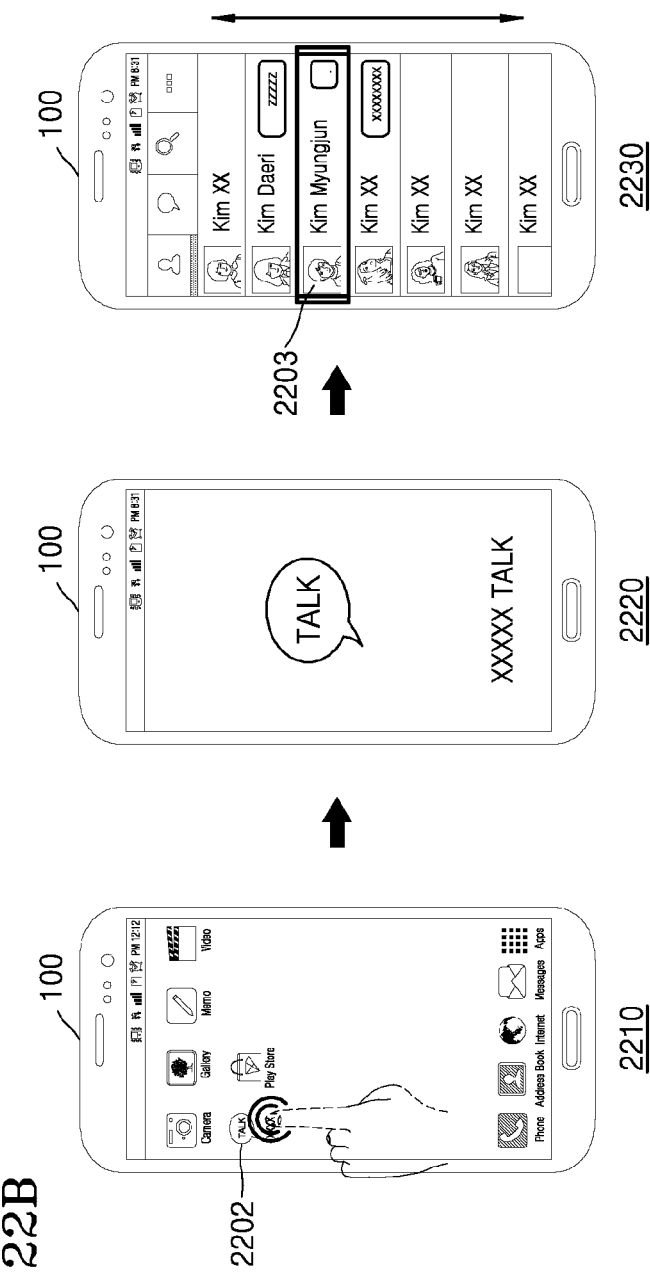
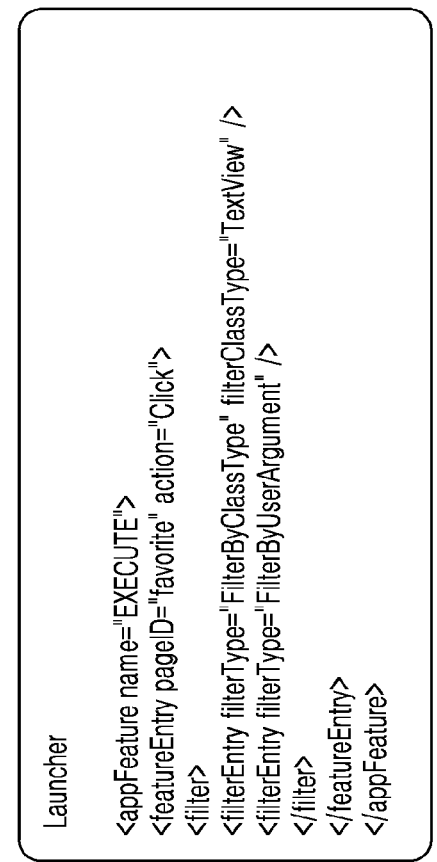

FIG. 22C

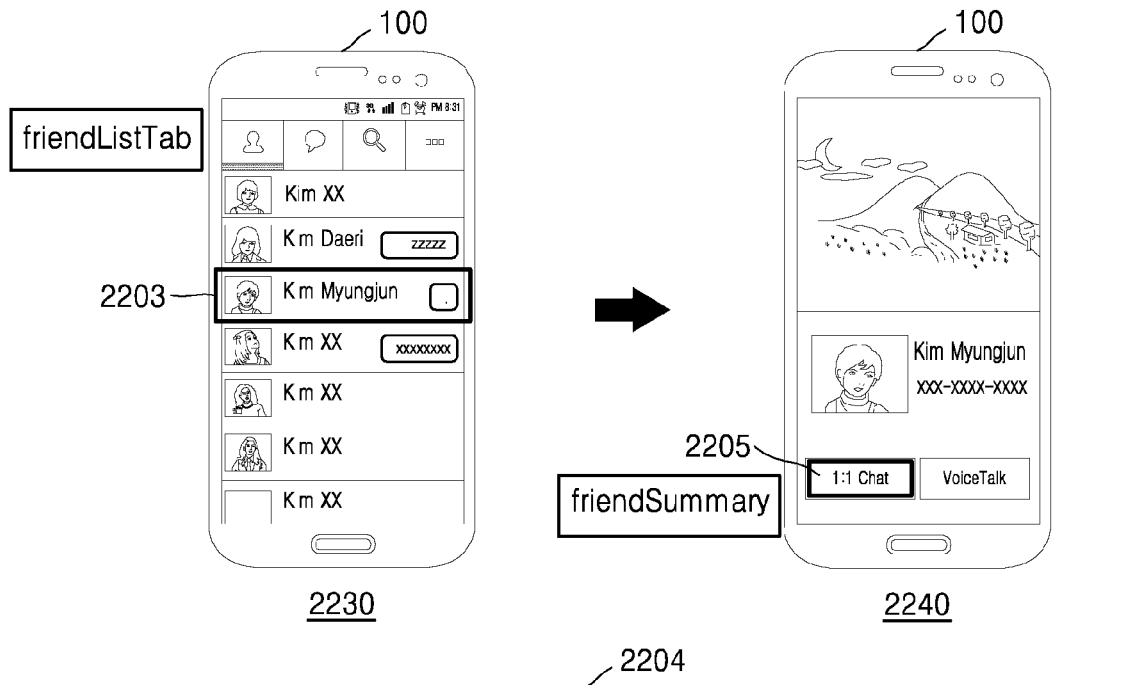

```
OOO Talk
Current Page: friendListTab
<stateMachine>

<transition sourceUIPageID='friendListTab' targetUIPageID="friendSummay" action="Click" >
<filter useScrollMode="true" scrollResourceID="ex_list_view">
<filterEntry filterType="FilterByClassType" filterClassType="TextView" />
<filterEntry filterType="FilterByUserArgument" />
</filter>
</transition>
</stateMachine>

<appFeature name='Chat Window Open">
<featureEntry pageID="friendSummay" action="Click">
<filter>
<filterEntry filterClassType="Button" filterType="FilterByClassType"/>
<filterEntry filterType="FilterByResourceID" filterResourceID="chat"/>
</filter>
</featureEntry>
</appFeature>
```

1. START & END UTTERANCE (S2411)

FIG. 26A
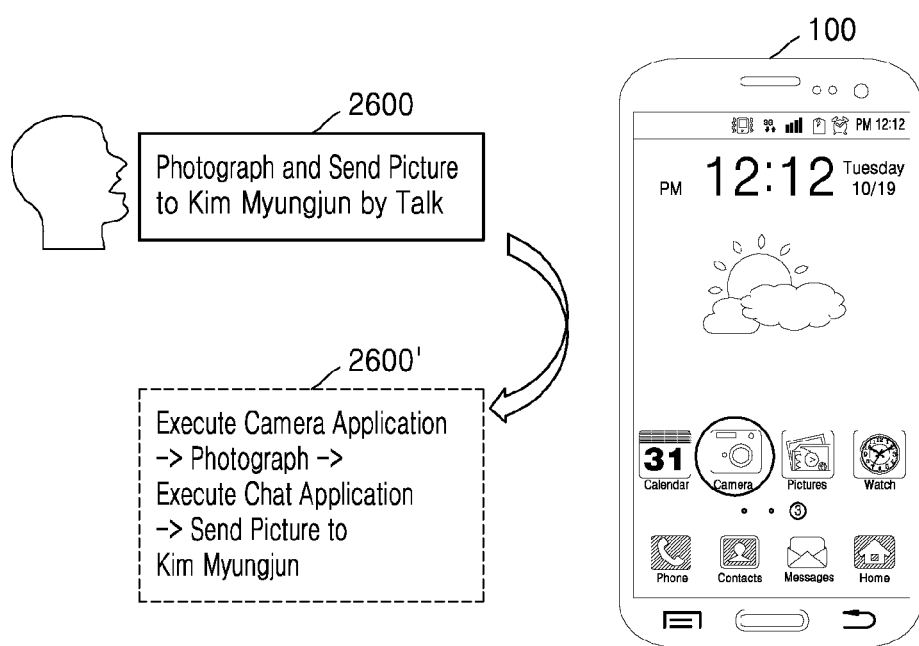
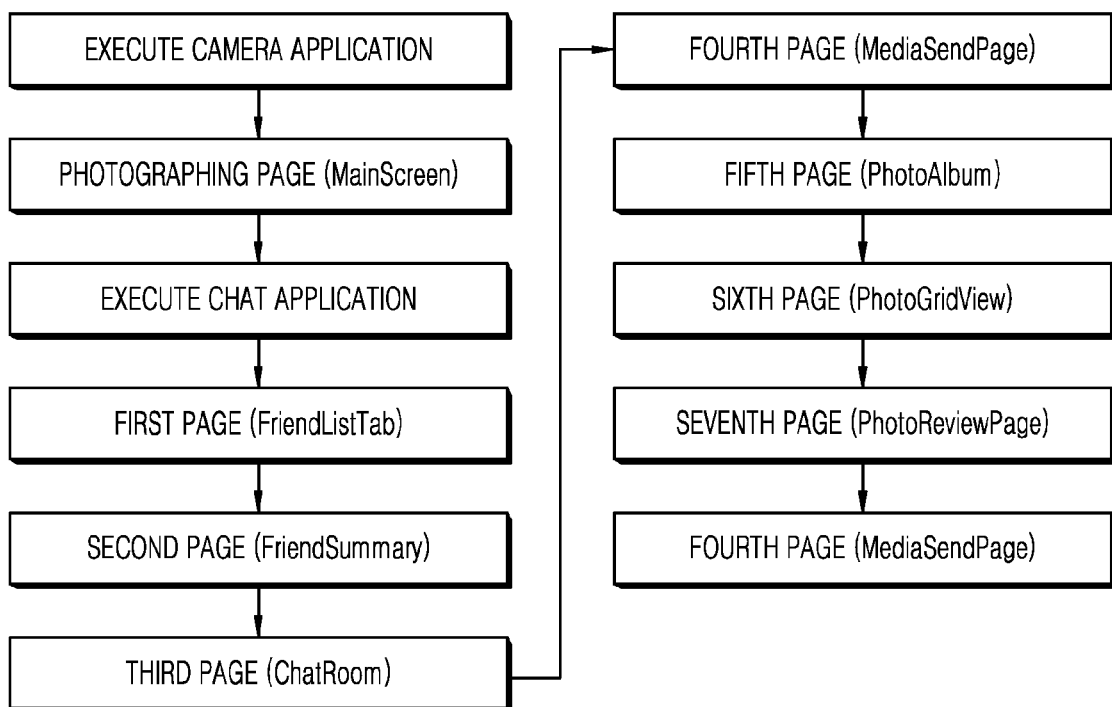

FIG. 26C
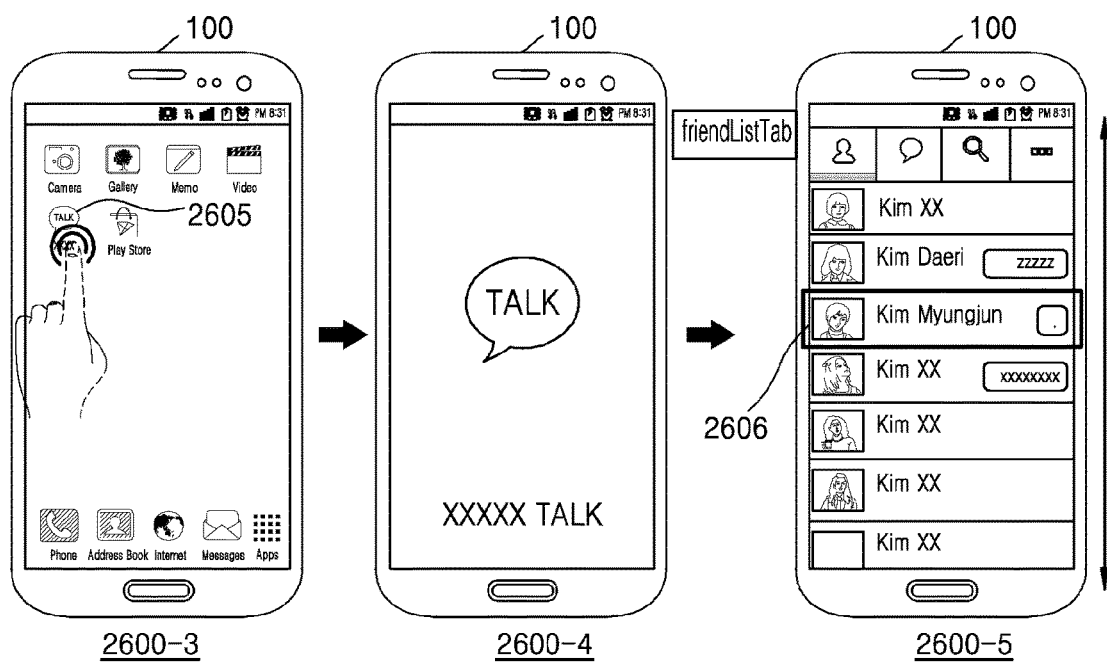
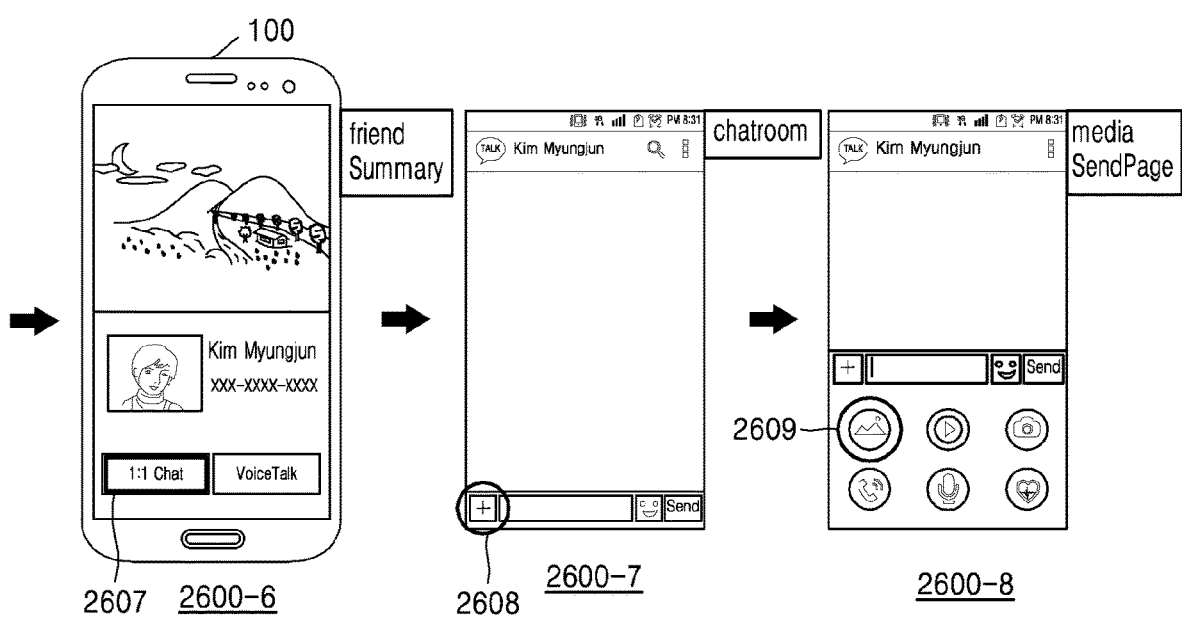

FIG. 26D
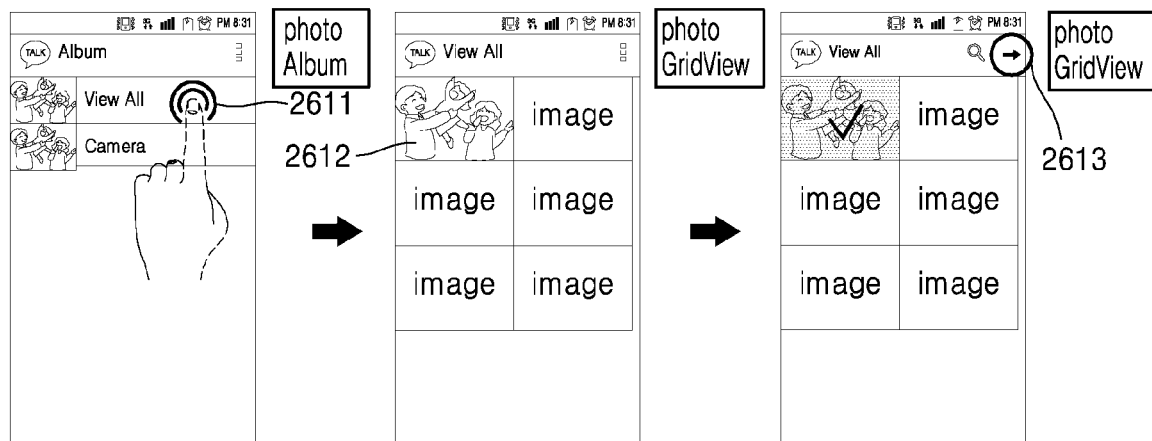
2600-9    2600-10    2600-11
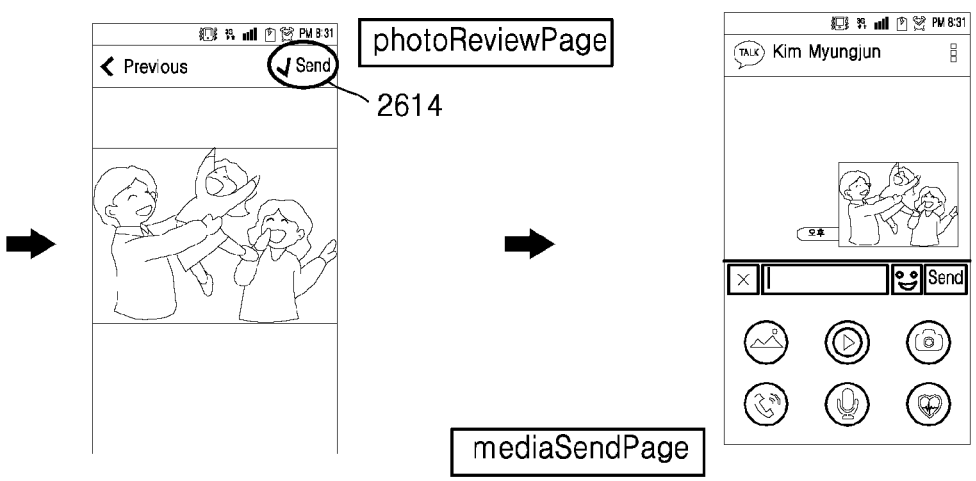
2600-12    2600-13

FIG. 27A
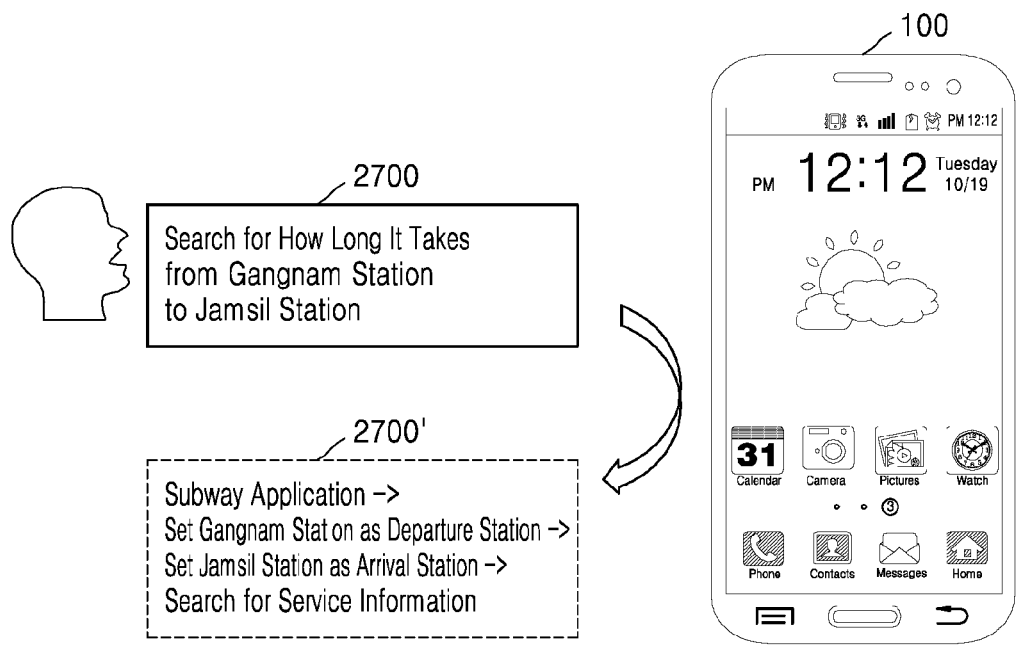
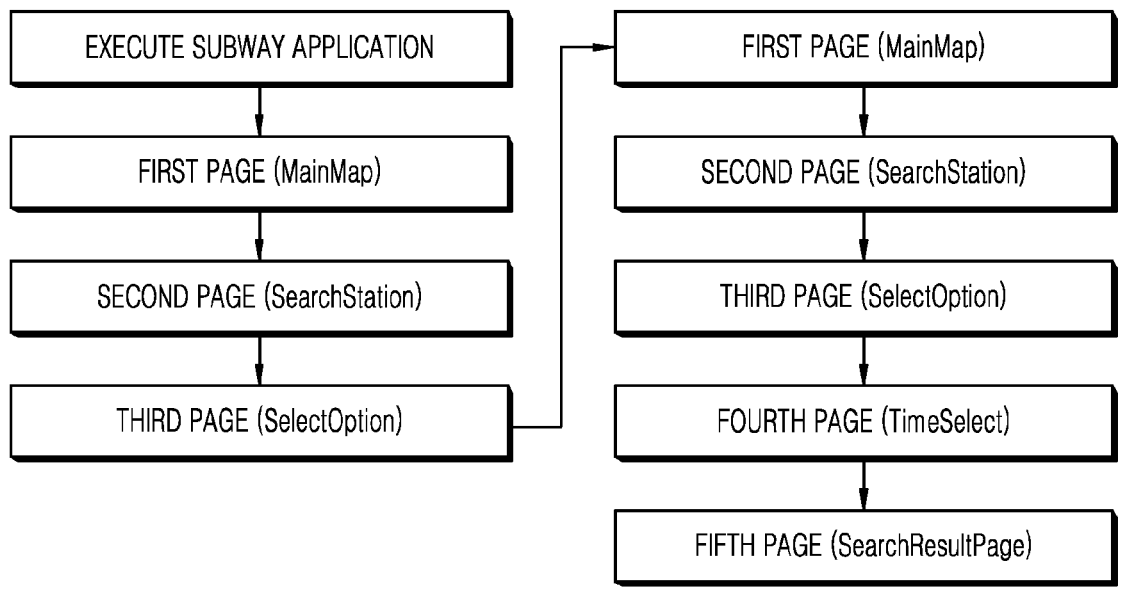

FIG. 27B
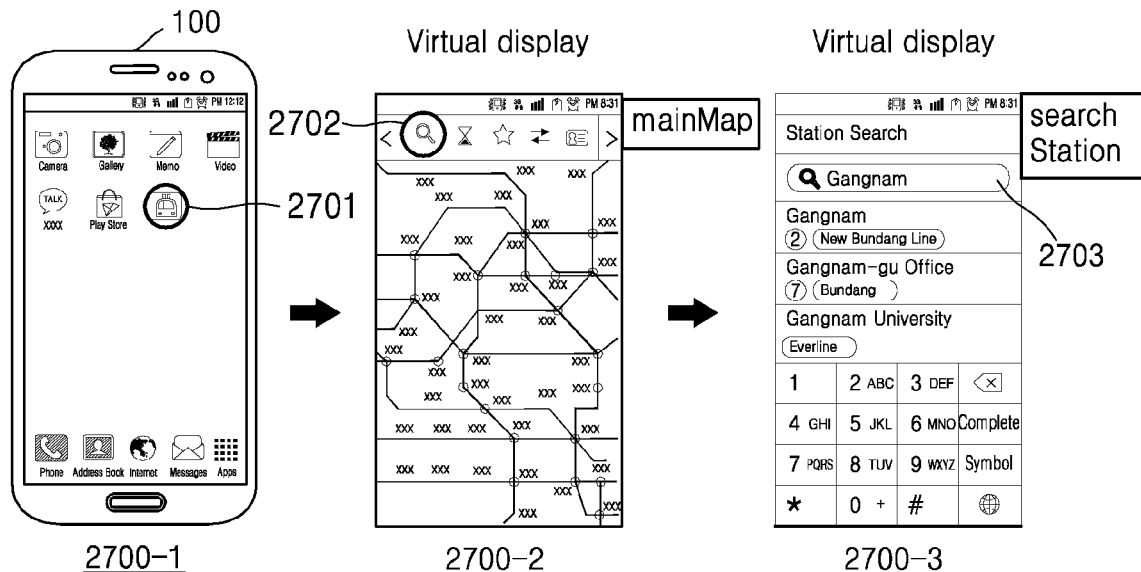
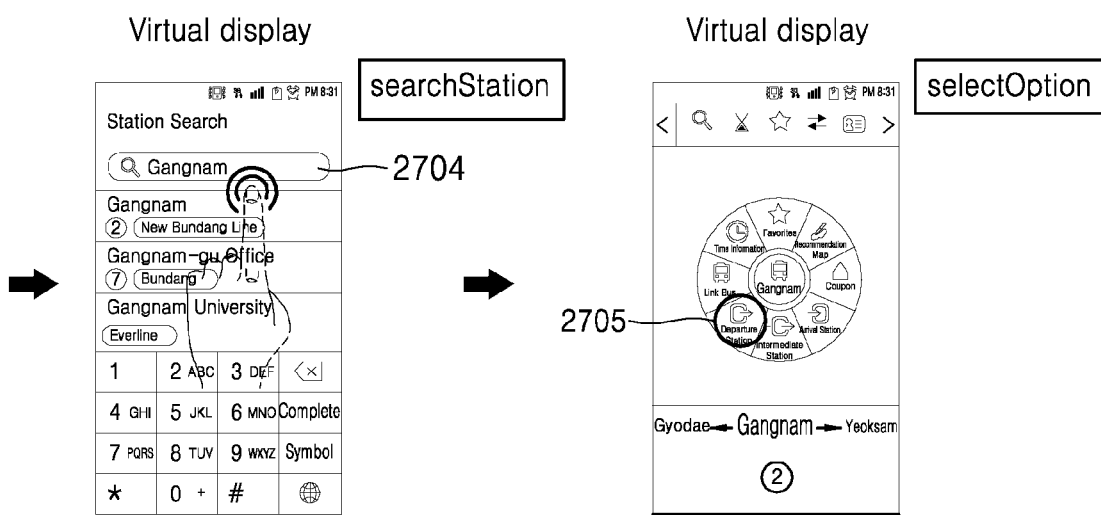

FIG. 27C
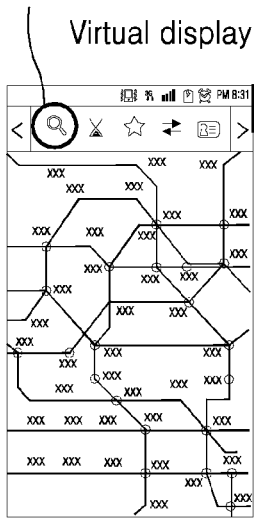
2700-6
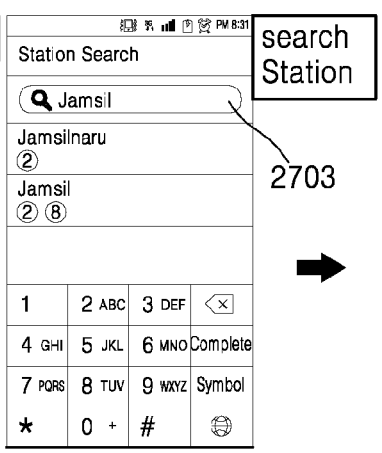
2700-7
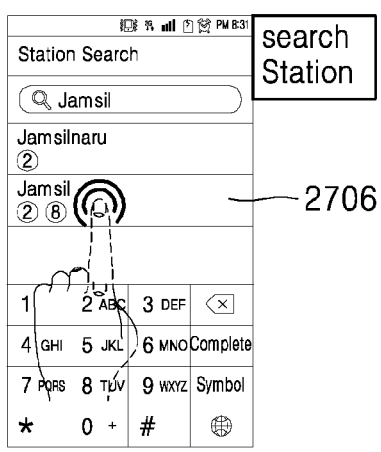
2700-8
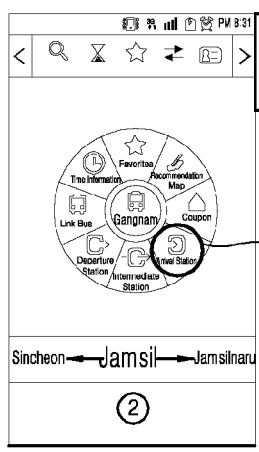
2700-9
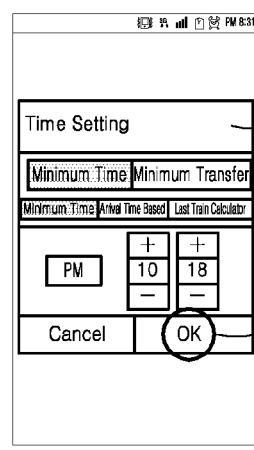
2700-10
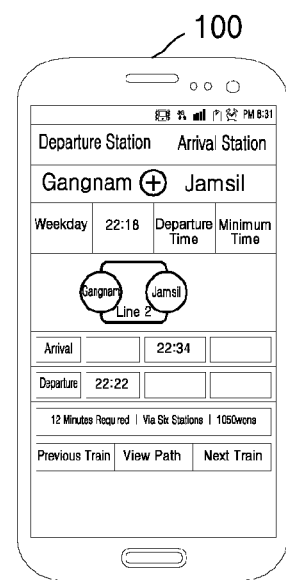
2700-11

FIG. 30A
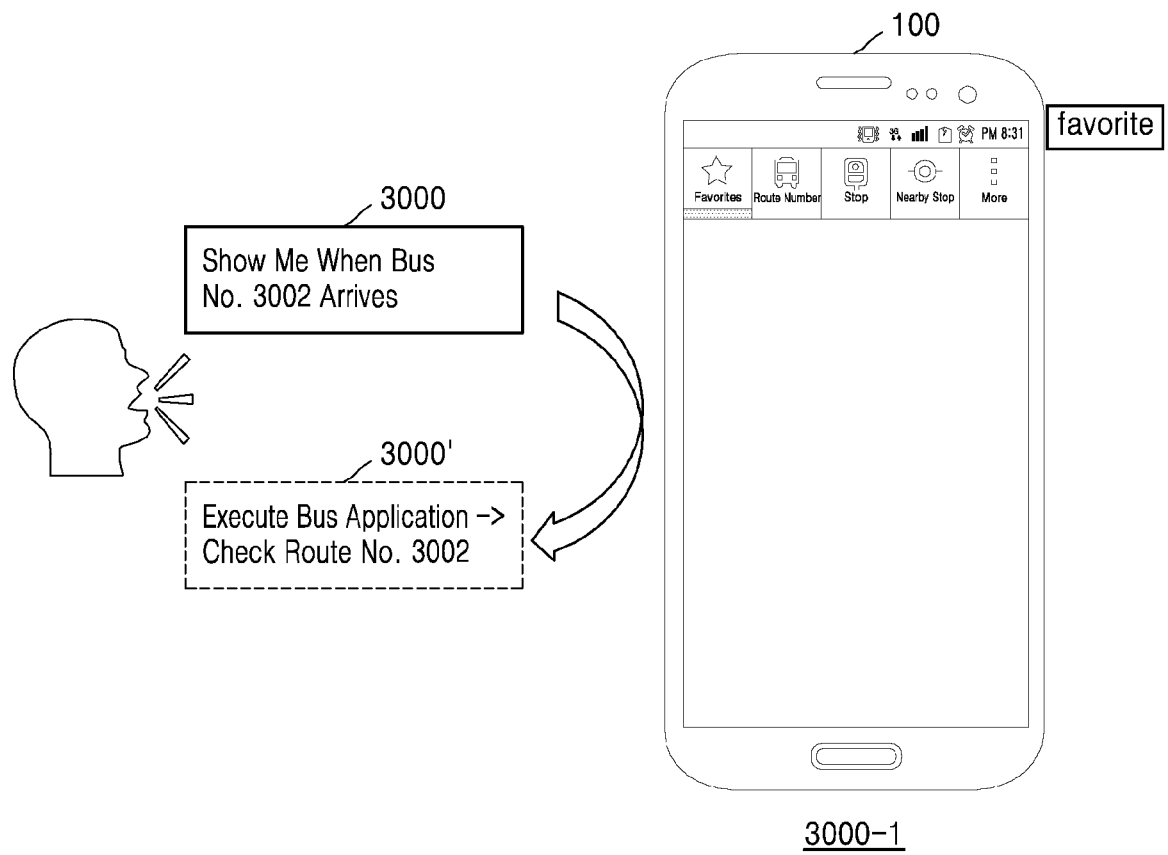
<PAGE TRANSITION PATH>
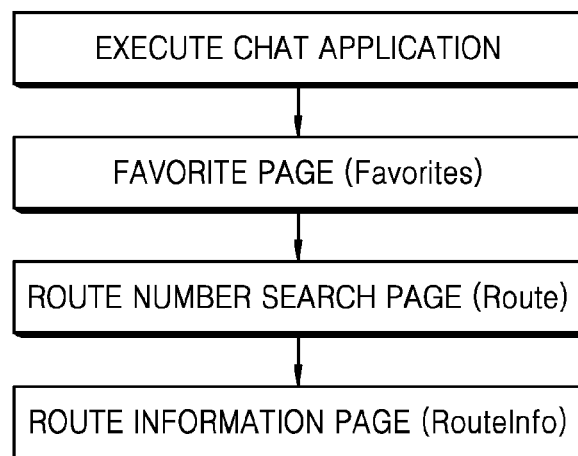

FIG. 38A
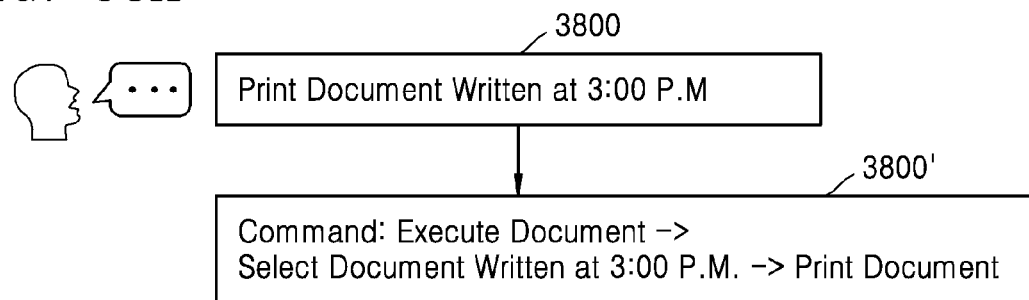
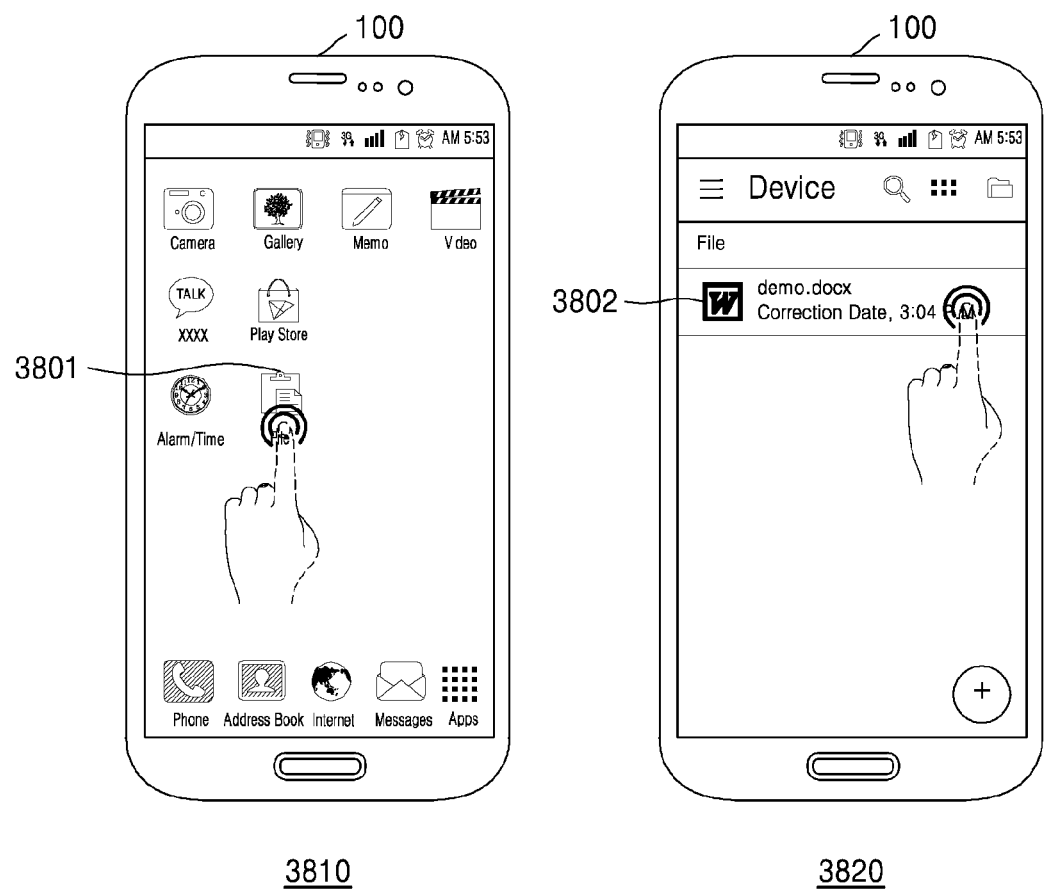

FIG. 39B

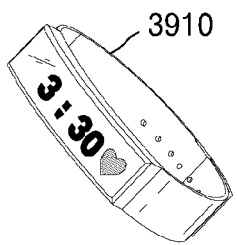
3910

```
DeviceID: 2798E016-E646-47B5-B988-C22D933C19D4
DeviceName: Hanmin's Band
DeviceProductName: SmartBand
DeviceVersion: 1.0.1.2
DeviceType: Wearable Watch | Wearable Band
DeviceData:
{
    {
        DataName: electrocardiogram
        DataUnit: binary
        IsRaw: true
        Version: 1.2.3.1
        ...
    },
    {
        DataName: electrocardiogram
        DataUnit: time
        IsRaw: true
        Version: 1.0.0.1
        ...
    },
    ...
}
Operation:
{
    {
        OperationName: time setting
        InputParameter:
        {
            ParameterName: current time
            ParameterType: time
            Required: true
            ...
        }
    },
    ...
}
```

DEVICE AND METHOD FOR PERFORMING FUNCTIONS

CROSS-REFERENCE TO RELATED APPLICATIONS

This application is a Continuation Application of U.S. application Ser. No. 16/127,943, filed on Sep. 11, 2018, which is a continuation of U.S. patent application Ser. No. 14/813,959, filed Jul. 30, 2015, was issued U.S. Pat. No. 10,127,011 on Nov. 13, 2018, which claims priority from Korean Patent Application No. 10-2014-0098627, filed on Jul. 31, 2014, Korean Patent Application No. 10-2014-0159183, filed on Nov. 14, 2014, and Korean Patent Application No. 10-2015-0025234, filed on Feb. 23, 2015, in the Korean Intellectual Property Office, the disclosures of which are incorporated by reference herein in their entireties.

BACKGROUND

1. Field

Apparatuses and methods consistent with exemplary embodiments relate to devices and methods for performing user-requested functions by using installed applications.

2. Description of Related Art

Mobile terminals may be configured to perform various functions. Examples of the various functions may include a data and voice communication function, a function of taking still pictures or moving pictures with a camera, a voice recording function, a function of playing music files through a speaker system, and a function of displaying images or videos.

Some mobile terminals may include additional functions for playing games and some may be embodied as multimedia devices. In addition, due to the increasing popularity of smart phones and tablets, various applications have been developed and used. Therefore, there is a need for systems that enable users to easily and conveniently operate applications.

SUMMARY

One or more exemplary embodiments relate to devices and methods for performing user-requested functions by using screen component information of installed applications.

Additional aspects will be set forth in part in the description which follows and, in part, will be apparent from the description, or may be learned by practice of the exemplary embodiments.

According to an aspect of an exemplary embodiment, there is provided a device including: a display configured to display at least one screen page of an application; an audio inputter configured to receive audio of a user that includes a first voice command related to a first application and a second voice command related to a second application; and a controller configured to: perform a first operation corresponding to the first voice command by using first screen page transition information for transitioning between screen pages of the first application, which is obtained from information about user interface (UI) elements included in the screen pages of the first application corresponding to the first voice command, provide the second application with performance result data of the first operation as input data of the second application corresponding to the second voice command, and perform a second operation corresponding to the second voice command by using second screen page transition information for transitioning between screen pages of the second application, which is obtained from information about UI elements included in the screen pages of the second application corresponding to the second voice command, wherein each of the UI elements is configured to perform a predetermined function in response to being selected by the user.

The memory may be configured to store the performance result data of the first operation.

The controller may be further configured to receive the performance result data of the first operation from the memory as the input data of the second application.

The controller may be further configured to determine a first transition path between the screen pages of the first application corresponding to the first voice command by using the first screen page transition information, and determine a second transition path between the screen pages of the second application corresponding to the second voice command by using the second screen page transition information.

The controller may be further configured to display the screen pages of the first application and the screen pages of the second application on the display sequentially based on the first transition path and the second transition path.

The controller may be further configured to generate an input event for controlling at least one UI element connecting the screen pages of the first application and the screen pages of the second application, to sequentially display the screen pages of the first application and the screen pages of the second application.

The information about the UI elements may include at least one of identification information of the UI elements, type information of input events for controlling the UI elements, application screen information connected with the UI elements, and function information connected with the UI elements.

The controller may be further configured to generate the information about the UI elements included in the screen pages of the first application by using information acquired to render the screen pages of the first application.

The controller may be further configured to identify a current page displayed on the display based on at least one of the information about the UI elements included in the screen pages of the first application and the information about the UI elements included in the screen pages of the second application.

The first screen page transition information may include at least one of identification information of the UI elements connecting the screen pages of the first application and input event information for controlling the UI elements connecting the screen pages of the first application, and the second screen page transition information may include at least one of identification information of the UI elements connecting the screen pages of the second application and input event information for controlling the UI elements connecting the screen pages of the second application.

The audio inputter may provide the audio to a server and receive analysis results of the audio from the server.

According to an aspect of another exemplary embodiment, there is provided a method for performing a function by a device including: receiving an audio of a user that includes a first voice command related to a first application and a second voice command related to a second application; performing a first operation corresponding to the first voice command by using first screen page transition information for transitioning between screen pages of the first application, which is obtained from information about user interface (UI) elements included in the screen pages of the first application corresponding to the first voice command; providing the second application with performance result data of the first operation as input data of the second application corresponding to the second voice command; and performing a second operation corresponding to the second voice command by using second screen page transition information for transitioning between screen pages of the second application, which is obtained from information about UI elements included in the screen pages of the second application corresponding to the second voice command, wherein each of the UI elements performs a predetermined function in response to being selected by the user.

The performing the first operation corresponding to the first voice command may include storing the performance result data of the first operation in a memory.

The performing the second operation corresponding to the second voice command may include receiving the performance result data of the first operation from the memory as the input data of the second application.

The performing the first operation corresponding to the first voice command may include determining a first transition path between the screen pages of the first application corresponding to the first voice command by using the first screen page transition information, and the performing the second operation corresponding to the second voice command may include determining a second transition path between the screen pages of the second application corresponding to the second voice command by using the second screen page transition information.

The method may include displaying the screen pages of the first application and the screen pages of the second application sequentially based on the first transition path and the second transition path.

The displaying of the screen pages of the first application and the screen pages of the second application sequentially based on the first transition path and the second transition path may include generating an input event for controlling at least one UI element connecting the screen pages of the first application and the screen pages of the second application.

The method may include generating the information about the UI elements included in the screen pages of the first application by using information acquired for rendering the screen pages of the first application.

The receiving the audio may include providing the audio to a server; and receiving analysis results of the audio from the server.

The method may be performed using a non-transitory computer-readable recording medium having recorded thereon a program executable by a computer.

According to an aspect of another exemplary embodiment, there is provided a method of performing a function by a device, the method including: receiving a user input for requesting performance of at least one function; comparing information about user interface (UI) elements included in a current page to information about UI elements of screen component information of at least one application; and determining a path for transitioning from the current page to a target page, which is a page for providing the at least one function, based on the comparison; transitioning to the target page according to the determined path; and performing the at least one function through the target page.

The at least one function may include at least one of a message transmission function, an alarm function, a phone call function, a content upload function, an image capture function, a sound recording function, and an information search function.

The user input may include at least one of a voice input, a gesture input, a motion input, a bending input, a key input, an eye input, and a combination input.

The transitioning to the target page may include generating an input event for displaying the target page.

The method may further include at least one intermediate page, and the determined path may include the current page, the at least one intermediate page, and the target page.

BRIEF DESCRIPTION OF THE DRAWINGS

These and/or other aspects will become apparent and more readily appreciated from the following description of the exemplary embodiments, taken in conjunction with the accompanying drawings in which:

FIGS. 8A and 8B are diagrams illustrating an example of information of UI elements included in screen pages of an application, according to an exemplary embodiment;

FIGS. 14A and 14B are diagrams illustrating an example of transition information between screen pages;

FIG. 15 is a diagram illustrating an example of extensible markup language (XML)-type screen component information, according to an exemplary embodiment;

FIGS. 16A to 16C are diagrams illustrating an example of screen component information of an application, according to an exemplary embodiment;

FIGS. 19A and 19B are diagrams illustrating screen component information of applications stored in the device, according to an exemplary embodiment;

FIG. 21 is a diagram illustrating an example of determining a path for transfer from a current page to a target page by the device, according to an exemplary embodiment;

FIGS. 22A to 22E are diagrams illustrating an example of performing a function corresponding to a voice input of a user by the device by using screen component information (UI description) of an application, according to an exemplary embodiment;

FIGS. 26A to 26D are diagrams illustrating an example of performing a function corresponding to a voice input of the user by the device through applications, according to an exemplary embodiment;

FIGS. 27A to 27C are diagrams illustrating an example of displaying intermediate pages on a virtual display by the device, according to an exemplary embodiment;

FIGS. 30A and 30B are diagrams illustrating an example of performing a function corresponding to a voice input of the user by the device by using screen component information (UI description) of an application that is being executed, according to an exemplary embodiment;

FIGS. 38A to 38C are diagrams illustrating an example of controlling a printer by the device according to a user voice input, according to an exemplary embodiment;

FIGS. 39A and 39B are diagrams illustrating a system for performing a predetermined function in an Internet of Things (IoT) environment, according to an exemplary embodiment;

DETAILED DESCRIPTION

Figure 1A:
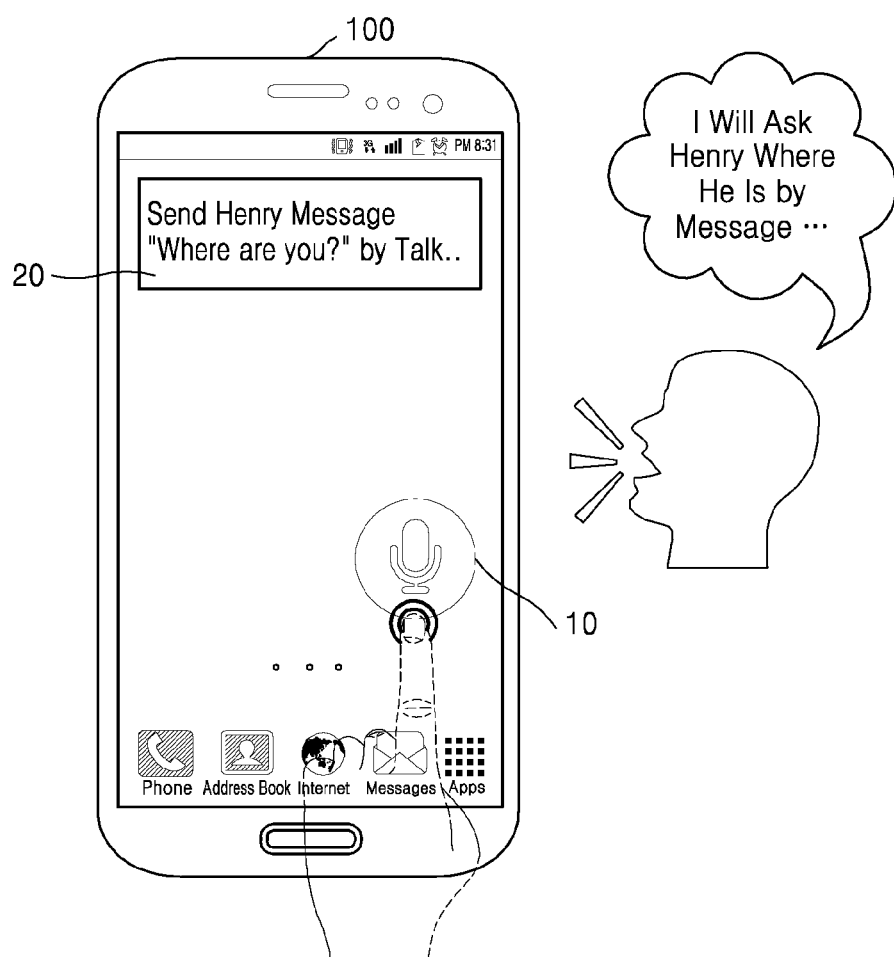
FIGS. 1A to 1F are diagrams illustrating a system for performing a predetermined function by using an application, according to an exemplary embodiment.

Reference will now be made in detail to exemplary embodiments, examples of which are illustrated in the accompanying drawings, wherein like reference numerals will be understood to refer to like elements throughout. In this regard, the exemplary embodiments may have different forms and should not be construed as being limited to the descriptions set forth herein. Accordingly, one or more exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used herein may be general terms currently used in the art in consideration of functions in regard to exemplary embodiments, but the terms may vary according to the intentions of those of ordinary skill in the art, precedents, or new technology in the art. Also, terms may be selected by the applicant. Thus, the terms used herein should be understood based on the meaning of the terms and the overall description of one or more exemplary embodiments.

When something "includes" a component, another component may be further included unless specified otherwise. Also, the terms "units" and "modules" used herein refer to units that perform at least one function or operation, and the units may be implemented as hardware or software or a combination of hardware and software.

Throughout the specification, an "application" may refer to a set of computer programs designed to perform a predetermined operation. Applications described herein may vary according to one or more exemplary embodiments. For example, the applications may include, but are not limited to, Web browser applications, camera applications, dictionary applications, translation applications, data transmission applications, music player applications, video player applications, message applications, social communicator applications, social media applications, map applications, picture folder applications, broadcast applications, game applications, exercise support applications, payment applications, memo applications, calendar applications, and phone book applications.

Hereinafter, exemplary embodiments will be described in detail with reference to the accompanying drawings. However, the exemplary embodiments may have different forms and should not be construed as being limited to the descriptions set forth herein. In addition, portions irrelevant to the description of the exemplary embodiments may be omitted in the drawings if it would lead to a clearer description of the exemplary embodiments, and like reference numerals will denote like elements throughout the specification.

FIG. 1A is a diagram illustrating a system for performing a predetermined function by using an application, according to an exemplary embodiment.

As illustrated in FIG. 1A, the system for performing a predetermined function by using an application, according to an exemplary embodiment, may include a device 100. However, the system may include more components than the illustrated components. For example, the system may further include a server in addition to the device 100. Also, the system may include Internet of Things (IoT) devices in addition to the device 100. In the specification, an IoT device may refer to a device that collects data through a sensor embedded therein and shares the collected data with other IoT devices through a network interface. An example in which the system includes IoT devices will be described below in detail with reference to FIGS. 39 to 44.

The device 100, according to an exemplary embodiment, may be any device that may execute an application and perform a predetermined function through the application. The device 100 according to an exemplary embodiment may be implemented in various forms. For example, the devices 100 described herein may include, but are not limited to, desktop computers, portable phones, smart phones, laptop computers, tablet personal computers (PCs), e-book terminals, digital broadcasting terminals, personal digital assistants (PDAs), portable multimedia players (PMPs), navigation devices, MP3 players, digital cameras, Internet protocol televisions (IPTVs), digital televisions (DTVs), and consumer electronics (CE) devices (e.g., air conditioners and refrigerators with display devices).

The device 100 described herein may be any wearable device that a user may wear. For example, the devices 100 according to exemplary embodiments may include wristwatches, spectacles, rings, wristlets, and necklaces.

According to an exemplary embodiment, the device 100 may include a microphone for receiving a voice of the user for requesting performance of a predetermined function. In this case, the device 100 may perform a predetermined function corresponding to the voice received through the microphone. For example, the device 100 may execute an application and perform a function by using screen component information of the application.

The screen component information of the application may refer to information about at least one screen component provided by the application through the device 100. According to an exemplary embodiment, the screen component information of the application may be stored in the form of an extensible markup language (XML) or a table; however, the inventive concept is not limited thereto. According to an exemplary embodiment, the screen component information of the application may be used by the device 100 to automatically perform a user-requested function through the application. Hereinafter, for convenience of description, the screen component information of the application may also be referred to as user interface (UI) description.

According to an exemplary embodiment, the screen component information of the application may include information about UI elements included in screen pages provided by the application, function information of the UI elements, transition information between the screen pages, and action information defining an action (e.g., message transmission, mobile Internet phone connection, and image capture) corresponding to a combination of screen pages or a combination of UI elements. For example, the UI elements may be objects (e.g., texts, images, buttons, icons, and menus) shown to the user and may include objects that may be operated by the user and objects that may provide information to the user. Also, the UI elements may include, but are not limited to, graphical user interface (GUI) objects and character user interface (CUI) objects. Hereinafter, for convenience of description, the UI elements may also be referred to as controls or UI objects.

The screen page may be a set of UI elements that may be viewed by the user through the screen. According to an exemplary embodiment, the screen page may perform a function of receiving an input from the user or transmitting information to the user. According to an exemplary embodiment, one screen page may include, but is not limited to, one or more layouts, views, and/or events.

The application may include one or more screen pages, and a screen page may occur according to the generation of an input event (e.g., execution, transition, and call) in the application. The screen component information of the application will be described below in more detail, and an example of using the screen component information in the device 100 will be described below.

According to an exemplary embodiment, as illustrated in FIG. 1A, the user may ask a friend 'Henry' where he is by message. For example, the user may execute a messenger application, search for 'Henry' from a friend list of the messenger application, open a chat window for chatting with Henry, input a text thereto, and press a Send button.

However, instead of manually operating the device 100, the user may input a voice for requesting a message transmission to the device 100. For example, the user may execute a voice recognition widget 10 and input a voice command (e.g., 'Send Henry Message "Where are you?" by Talk . . . ') 20 through the voice recognition widget 10. The voice recognition widget 10 may execute when a predetermined event is generated. For example, the device 100 may provide the voice recognition widget 10 when a predetermined hardware key or touch key on the device 100 is pressed for at least a predetermined amount of time.

Herein, a widget may refer to a mini application (e.g., application program or software) that is a type of GUI (which represents a graphic-based operation environment) that may support the interaction between the user and an application program operating system (OS).

According to an exemplary embodiment, when the voice command 20 is received, the device 100 may generate an event of executing a messenger application automatically by using prestored screen component information of the messenger application, searching for 'Henry' from a friend list of the messenger application, opening a chat window for chatting with Henry, inputting a text, and sending the message, as if the user operates the messenger application.

According to an exemplary embodiment, since the device 100 automatically generates a realistic user input event in each page from the current page to the target page by using the prestored screen component information of the application, the device 100 may provide the user with a realistic experience similar to directly operating the device 100 by hand.

A method for performing a predetermined function by the device 100 by using the screen component information of the application will be described below in detail with reference to FIG. 20.

Also, according to an exemplary embodiment, the device 100 may perform a predetermined function through an open application program interface (API) that may support a voice command for a predetermined function. In this case, the device 100 may perform only some functions supported by the open API. For example, the device 100 may not perform an application function that is not provided by the open API.

However, according to an exemplary embodiment, the device 100 may also perform other functions in addition to functions supported by the open API by using the screen component information of the application. A service module 12, which is included in the device 100 to perform a user-requested function by using the screen component information of the application, will be described below in detail with reference to FIGS. 1B to 1F.

Figure 1B:
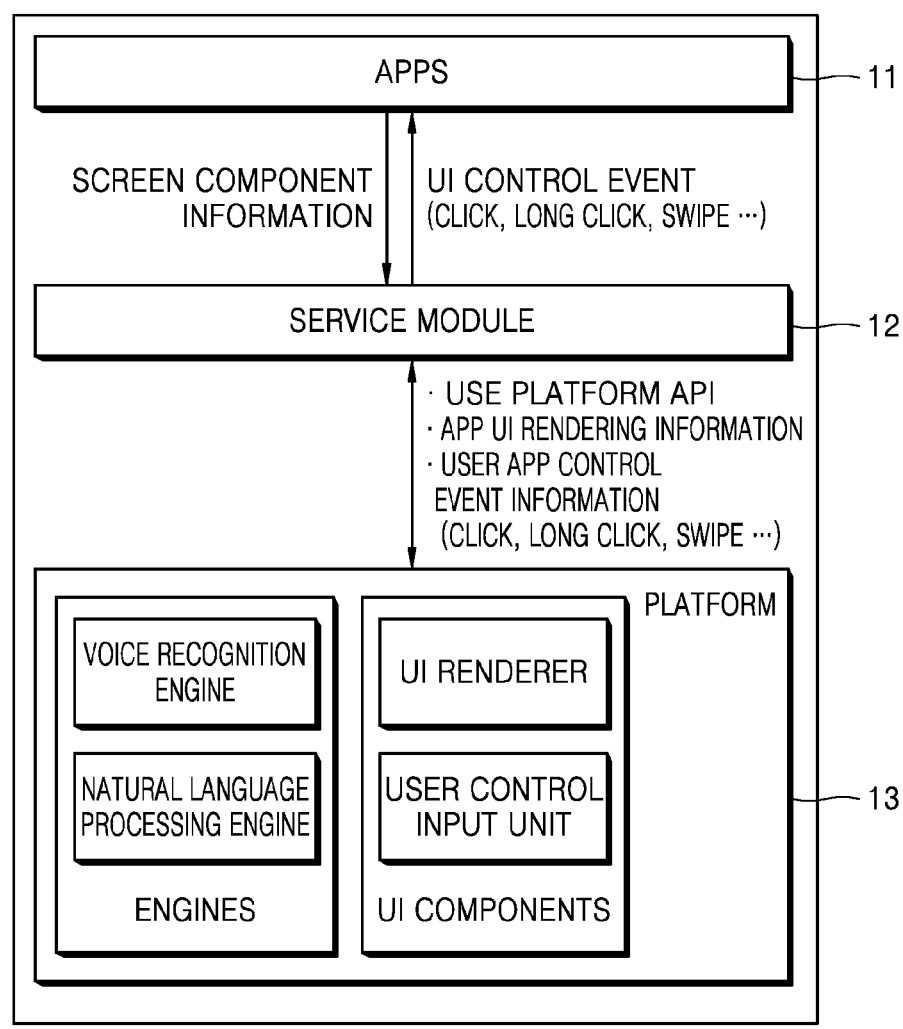

Referring to FIG. 1B, according to an exemplary embodiment, the service module 12 of the device 100 may generate screen component information by acquiring, from a platform 13, information acquired in the process of rendering screen pages of applications 11 (e.g., identification information of UI elements included in the screen pages, attribute information of the UI elements, and information about whether the UI elements may be controlled; hereinafter referred to as 'rendering information') and input event information of the UI elements included in the screen pages (e.g., type information of input events and identification information of pages called by the input events).

Also, according to an exemplary embodiment, the service module 12 of the device 100 may acquire screen component information of each of the applications 11 from the applications 11 (e.g., 3rd party application).

When a voice command is received from the user, the service module 12 of the device 100 may perform the received voice command by automatically generating input events for the UI elements by using the generated or acquired screen component information. For example, the service module 12 may identify the current page by using the rendering information received from the platform 13. Also, the service module 12 may determine an input event corresponding to a predetermined function by using the generated or acquired screen component information.

Thus, the service module 12 of the device 100, according to an exemplary embodiment, may perform all the functions corresponding to the UI elements in response to the voice command of the user without using an API. According to an exemplary embodiment, the service module 12 of the device 100 may be implemented as at least one of software and hardware.

For example, according to an exemplary embodiment, the service module 12 may be implemented as middleware between the applications 11 and the platform 13. In this case, the service module 12 may receive the rendering information or the input event information of the UI elements from the platform 13 and transmit a command for generating an input event corresponding to a predetermined function (e.g., a UI control event execution command) to the applications 11.

Figure 1C:
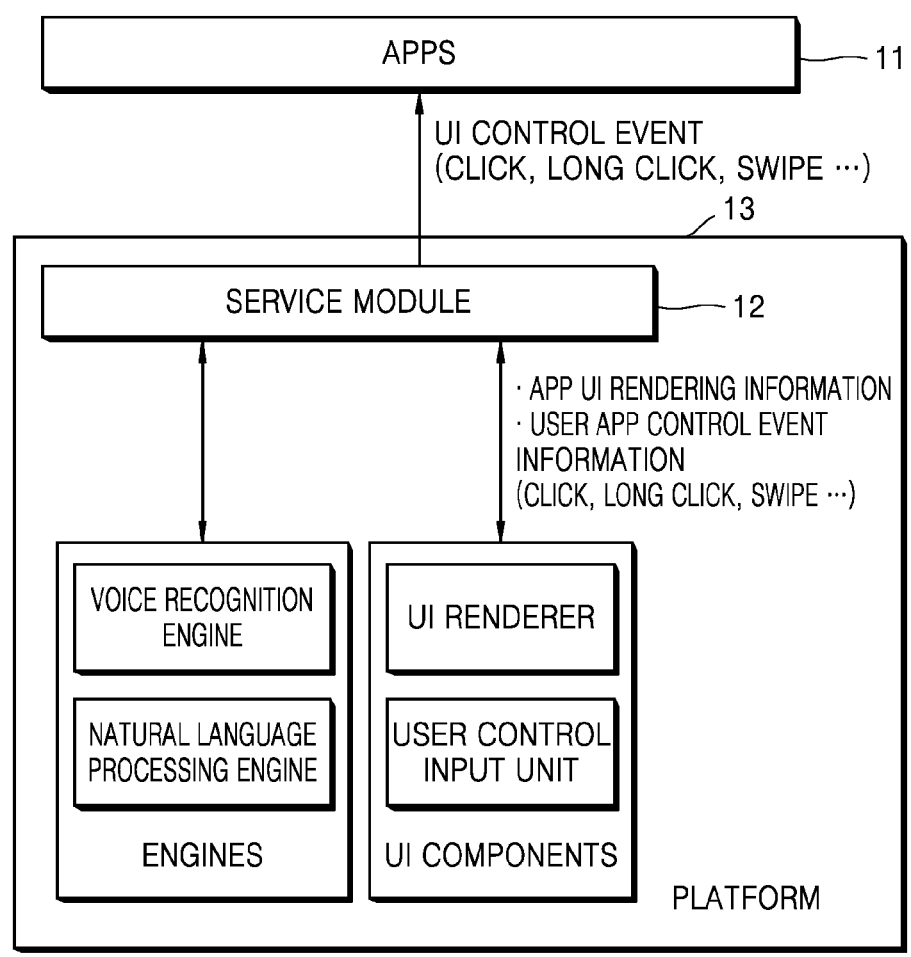

Referring to FIG. 1C, according to an exemplary embodiment, the service module 12 may be implemented as a module operating in the platform 13. In this case, the service module 12 may collect rendering information from a UI renderer in the platform 13. Also, the service module 12 may collect input event information (e.g., type information of input events and identification information of pages called by the input events) from a user control input unit in the platform 13.

The service module 12 may determine an input event corresponding to a predetermined function (e.g., a UI control event such as click, long click, or swipe) by using the screen component information. Then, the service module 12 may transmit a command for generating the determined input event (e.g., a UI control event execution command) to the applications 11. In this case, the applications 11 may recognize that the command for generating the input event is received from the platform 13.

Figure 1D:
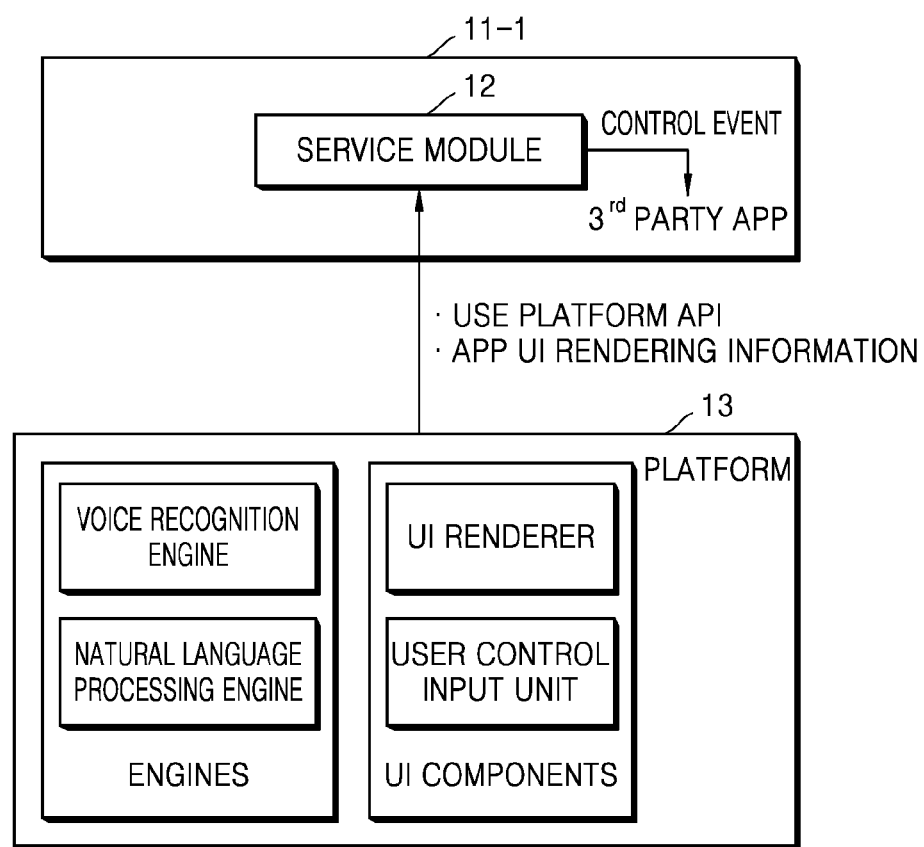

Referring to FIG. 1D, according to an exemplary embodiment, the service module 12 may be implemented in the applications 11 using the API of the platform 13. For example, the service module 12 may be located in a 3rd party application 11-1. In this case, the service module 12 may collect rendering information from the platform 13. The service module 12 may identify the current page displayed on the device 100 by using the rendering information.

Also, according to an exemplary embodiment, the service module 12 may generate screen component information of the 3rd party application 11-1 by using the rendering information collected from the platform 13 or may acquire screen component information provided from the 3rd party application 11-1. In this case, the service module 12 may determine an input event corresponding to a predetermined function (e.g., a UI control event such as click, long click, or swipe) by using the screen component information of the 3rd party application 11-1.

Then, the service module 12 may transmit a command for generating the determined input event (e.g., a UI control event execution command) to a control module of the 3rd party application 11-1 through an internal interface. According to an exemplary embodiment, the service module 12 may execute the UI control event execution command in the 3rd party application 11-1.

Figure 1E:
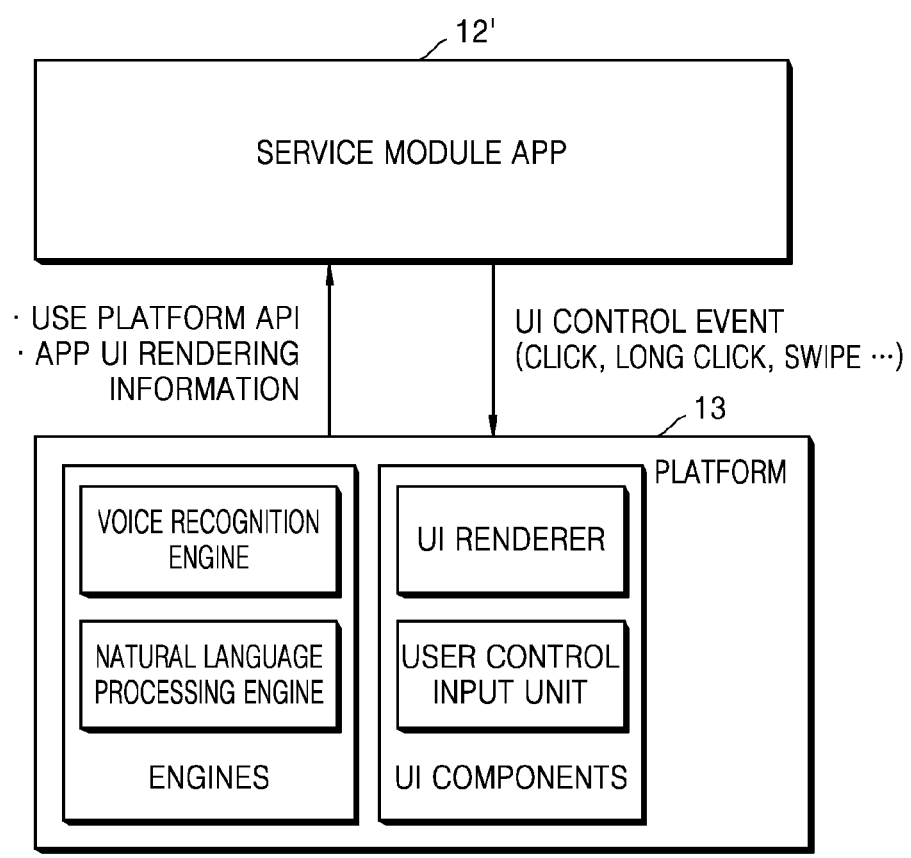

Referring to FIG. 1E, the service module 12 may be implemented as a separate application type (e.g., a service module application 12'). In this case, the service module application 12' may use the API of the platform 13 and may collect rendering information and input event information of UI elements (e.g., type information of input events and identification information of pages called by the input events) from the platform 13.

The service module application 12' may generate screen component information of other applications 11 (e.g., 3rd party application) by using the rendering information and the input event information of the UI elements or may acquire screen component information from other applications 11.

The service module application 12' may determine an input event corresponding to a predetermined function (e.g., a UI control event such as click, long click, or swipe) by using the screen component information. Then, the service module application 12' may transmit information about the determined input event (e.g., a request for generating a UI control event) to the platform 13. In this case, the platform 13 may process the UI control event based on the information about the input event that is received from the service module application 12'. For example, the platform 13 may generate an event for clicking a predetermined UI element of a predetermined application.

According to an exemplary embodiment, the service module application 12' may directly transmit a command for generating an input event (e.g., a UI control event such as click, long click, or swipe) to the applications 11 without using the platform 13.

The UI renderer and the user input controller included in the platform 13 in FIGS. 1B to 1E may be stored in a memory of the device 100. Also, a voice recognition engine and a natural language processing engine included in the platform 13 in FIGS. 1B to 1E may be stored in the memory of the device 100 or in a server.

Although FIGS. 1B to 1E illustrate an exemplary case in which the service module 12 is provided in the device 100, the service module 12 may also be provided in a server. The case in which the service module 12 is provided in the server will be described with reference to FIG. 1F.

Figure 1F:
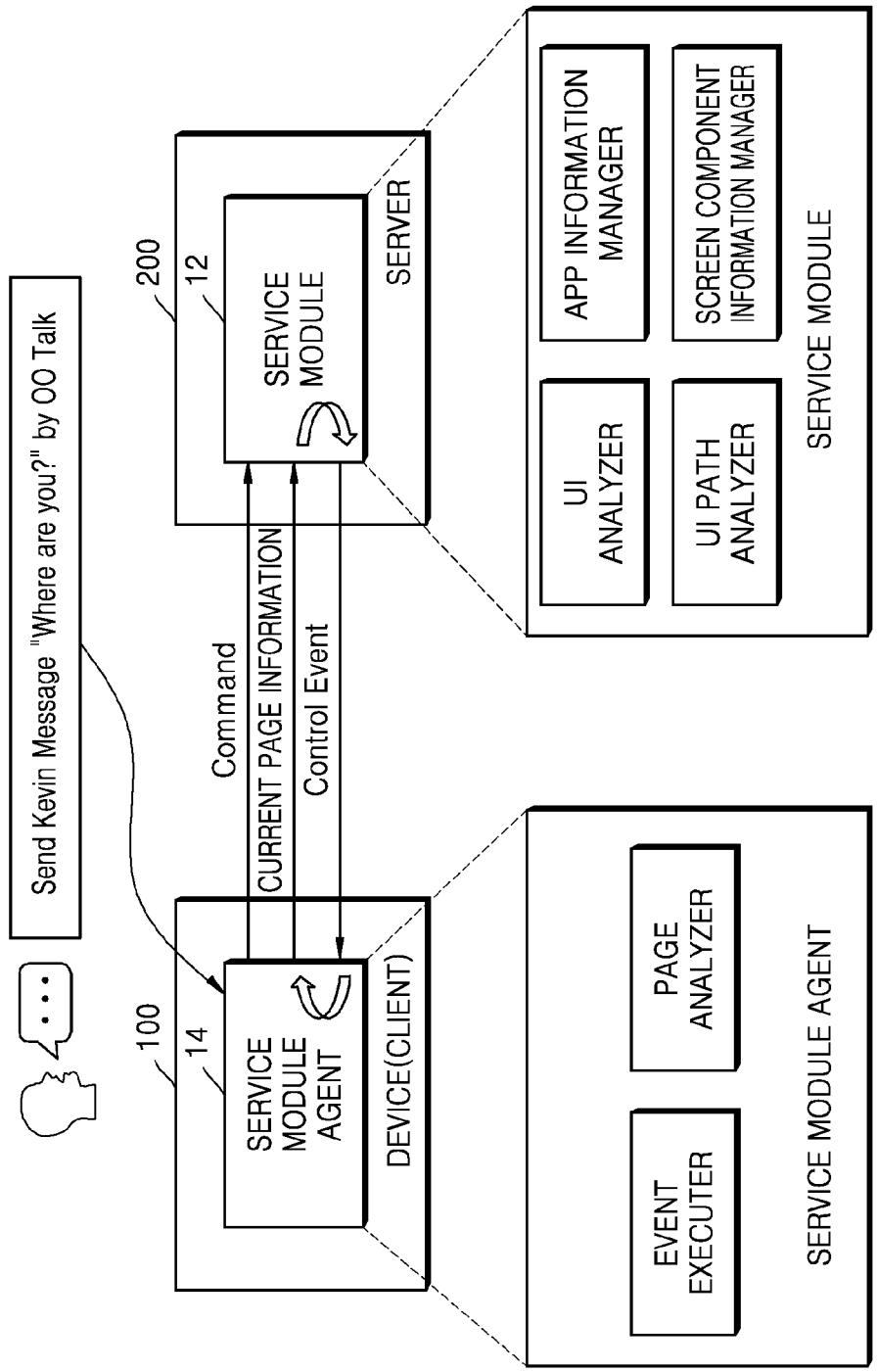

Referring to FIG. 1F, according to an exemplary embodiment, a service module agent 14 of the device 100 may receive a voice command (e.g., 'Send Kevin Message "Where are you?" by OO Talk') from the user. In this case, the service module agent 14 of the device 100 may transmit the received voice command data to the service module 12 of a server 200.

Also, the service module agent 14 of the device 100 may analyze current page information by using a page analyzer. For example, the service module agent 14 may collect information about the current page, which is identified by the page analyzer by using the rendering information, from the page analyzer. In this case, the service module agent 14 may transmit the information about the current page to the service module 12 of the server 200.

The service module 12 of the server 200 may include a UI analyzer, an application information manager, a UI path analyzer, and a screen component information manager. The service module 12 may determine a target page by analyzing the voice command data. Also, the UI path analyzer of the service module 12 may determine a UI path from the current page to the target page by using the screen component information and the information about the current page. Then, the service module 12 may determine a control event may be used for moving along the UI path and transmit information about the control event to the service module agent 14.

Therefore, by generating the control event through an event executer, the service module agent 14 may perform the voice command (e.g., 'Send Kevin Message "Where are you?" by OO Talk') that is input by the user.

According to an exemplary embodiment, a case of performing a predetermined function by the device 100 by using the screen component information will be described with reference to FIG. 2.

Figure 2:
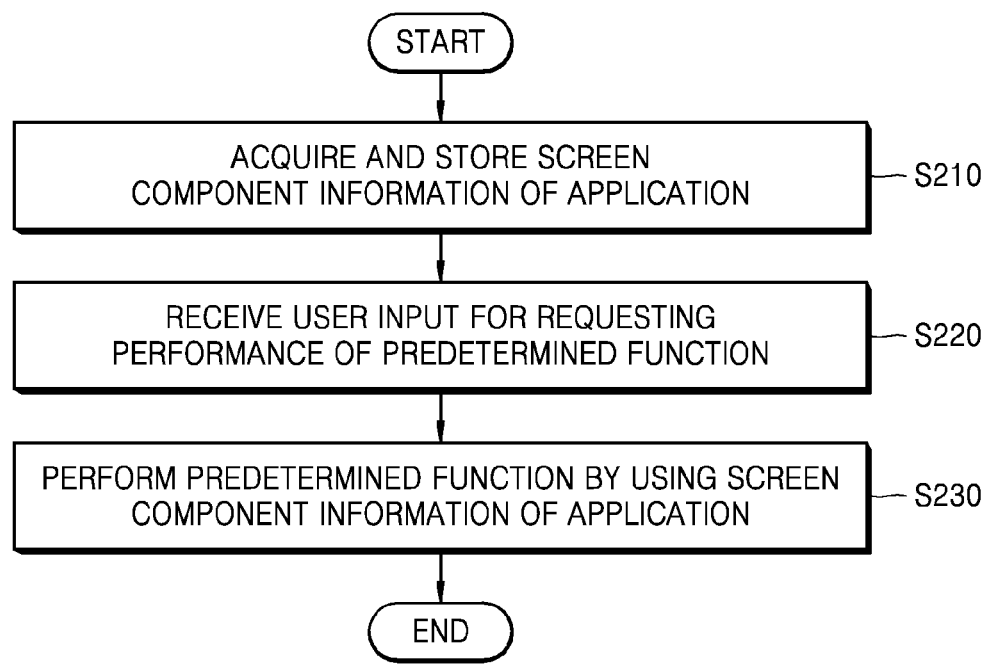
FIG. 2 is a flowchart illustrating a method for performing a predetermined function by a device by using screen component information of an application, according to an exemplary embodiment.

FIG. 2 is a flowchart illustrating a method for performing a predetermined function by a device by using screen component information of an application, according to an exemplary embodiment.

Referring to FIG. 2, in operation S210, the device 100 may acquire and store screen component information of each application. For example, the device 100 may acquire the screen component information of an application from the server during the installation of the application or may directly generate the screen component information of the application by analyzing an application use mode of the user.

According to an exemplary embodiment, the device 100 may map the screen component information of the application to identification information of the application and store the mapping result in a storage (e.g., memory). For example, the device 100 may store the screen component information of the application in a nonvolatile memory (e.g., flash disks). According to an exemplary embodiment, since the screen component information of the application may be updated, the device 100 may store version information about the screen component information of the application in the storage together with the screen component information of the application.

In operation S220, the device 100 may receive a user input for requesting performance of a predetermined function. For example, the device 100 may receive a voice input for requesting performance of a predetermined function. Herein, the predetermined function may be at least one of the functions provided by the installed application. The predetermined function may include, but is not limited to, a message transmission function, an information search function, a call connection function, an external device control function, an operation mode switch function, a translation function, a picture transmission function, a data backup function, an image capture function, a sound recording function, a content play function, and a text input function.

In operation S230, the device 100 may perform a predetermined function by using the screen component information of the application. For example, the device 100 may select the application providing a predetermined function based on a user input for requesting performance of a predetermined function. Then, the device 100 may read the screen component information of the selected application from the storage. The device 100 may determine at least one screen page providing a predetermined function by using the read screen component information of the selected application. For example, the device 100 may select the screen pages including the UI element corresponding to a predetermined function by using the function information of the UI elements defined in the screen component information. Then, the device 100 may perform a predetermined function by sequentially calling the selected screen pages by using the transition information between the screen pages defined in the screen component information.

According to another exemplary embodiment, the device 100 may select an action matched to a predetermined function. In this case, the action may be a combination of commands (or instructions). For example, the action may be defined as a set of commands for searching for a friend, calling a chat page, inputting a text message, and transmitting the text message. The device 100 may select the screen pages matched to the selected action by using the action information defined in the screen component information. The device 100 may perform a predetermined function by sequentially calling the selected screen pages.

According to an exemplary embodiment, when the device 100 uses the screen component information of the application, the device 100 may perform all the functions provided by the application according to the voice command. Thus, the device 100 may perform various functions that are not supported by the API.

Also, a blind person, who has difficulty in using the device 100, or a user, who is driving, may perform a simple input (e.g., a voice input) instead of manually having to perform a function requiring multistage operations, via the device 100 using the screen component information (UI description) of the application. An exemplary operation of acquiring the screen component information of the application by the device 100 will be described with reference to FIG. 3, and a method for performing a predetermined function by the device 100 by using the screen component information of the application will be described below in detail.

Although FIGS. 1A to 2 illustrate an exemplary case in which the user input for requesting performance of a predetermined function is a voice input, the exemplary embodiments are not limited thereto. The user input for requesting performance of a predetermined function may also include various other user inputs besides voice input. For example, the user input may include a key input, a gesture input (e.g., a touch input and an air gesture input), a motion input, a bending input, and/or a multiple combination input, etc.

Throughout the specification, the term "touch input" may refer to a gesture that is performed by the user on a touchscreen to control the device 100. For example, the touch input may include a Tap, Touch & Hold, Double Tap, Drag, Panning, Flick, and Drag & Drop, etc.

According to an exemplary embodiment, "Tap" may refer to a user's operation of touching the screen with a finger or a touch tool (e.g., an electronic pen or stylus) and then immediately lifting it from the screen without moving the finger or the touch tool directionally on the screen.

According to an exemplary embodiment, "Touch & Hold" may refer to a user's operation of touching the screen with a finger or a touch tool (e.g., an electronic pen) and then holding the touch input for a critical time (e.g., two seconds). For example, "Touch & Hold" may correspond to the case in which a time difference between a Touch-In time and a Touch-Out time is equal to or greater than the critical time (e.g., two seconds). When the touch input is held for the critical time or more, a visual, auditory, or tactile feedback signal may be provided so that the user may recognize whether the touch input is "Tap" or "Touch & Hold". The critical time may vary according to one or more exemplary embodiments. According to an exemplary embodiment, the critical time may be predetermined or it may be set by a user.

According to an exemplary embodiment, "Double Tap" may refer to a user's operation of touching the screen with a finger or a touch tool (e.g., an electronic pen) successively two times within a critical time period. According to an exemplary embodiment, the critical time period may be predetermined or it may be set by a user.

According to an exemplary embodiment, "Drag" may refer to a user's operation of touching the screen with a finger or a touch tool and then shifting or sliding the finger or the touch tool to another position on the screen while maintaining the touch. With a drag operation, an object is shifted, or a panning operation described below is performed.

According to an exemplary embodiment, "Panning" may refer to the case in which the user performs a drag operation without selecting an object. Since "Panning" does not select an object, a page shifts within the screen or an object group shifts within the page, instead of the object being shifted within the page.

According to an exemplary embodiment, "Flick" may refer to a user's operation of dragging at a critical speed (e.g., 100 pixel/s) or more with a finger or a touch tool. "Drag (or Panning)" may be differentiated from "Flick" based on whether the shift speed of the finger or the touch tool is higher than the critical speed (e.g., 100 pixel/s).

According to an exemplary embodiment, "Drag & Drop" may refer to a user's operation of dragging and dropping an object to a predetermined position on the screen with a finger or a touch tool.

According to an exemplary embodiment, "Pinch" may refer to a user's operation of shifting or sliding two fingers in different directions while touching the screen with both fingers. "Pinch" may be a gesture for magnifying (Pinch Open) or demagnifying (Pinch Close) an object or a page, and a magnification value or a demagnification value may be determined according to the distance between the two fingers.

According to an exemplary embodiment, "Swipe" may refer to a user's operation of shifting a finger or a touch tool by a predetermined distance in a horizontal or vertical direction while touching an object on the screen with the finger or the touch tool. A diagonal shift might not be recognized as a swipe event.

Throughout the specification, the term "air gesture input" may refer to a gesture that is performed on the device 100 in the air by a predetermined distance above the device 100 to control the device 100. According to an exemplary embodiment, the device 100 may detect a noncontact gesture of the user by using a camera and/or one or more types of sensors.

Throughout the specification, the term "motion input" may refer to a motion that the user applies to the device 100 to control the device 100. For example, the motion input may include a user input for rotating the device 100, tilting the device 100, or moving the device 100 vertically and horizontally. The device 100 may use an acceleration sensor, a tilt sensor, a gyro sensor, and/or a 3-axis magnetic sensor to detect a motion input preset by the user.

Throughout the specification, the term "bending input" may refer to a user input for bending all or some region of the device 100 to control the device 100 (e.g., if the device 100 is a flexible display device). According to an exemplary embodiment, the device 100 may use a bending sensor to detect a bending position (coordinate values), a bending direction, a bending angle, a bending speed, a bending frequency, a bending operation generation time, and/or a bending operation hold time.

Throughout the specification, the term "key input" may refer to a user input for controlling the device 100 by using a physical key attached or connected to the device 100.

Throughout the specification, the term "eye input" may refer to a user input for adjusting an eye blink, a gaze point, and/or an eye movement speed to control the device 100.

Throughout the specification, the term "multiple input" may refer to a combination of two or more input modes. For example, the device 100 may receive a touch input and a motion input of the user or may receive a touch input and a voice input of the user. Also, the device 100 may receive a touch input and an eye input of the user. According to one or more exemplary embodiments, many combinations can be used.

Hereinafter, for convenience of description, the case in which the user input for requesting performance of a predetermined function is a voice input will be mainly described, but this is merely an example an example.

Figure 3:
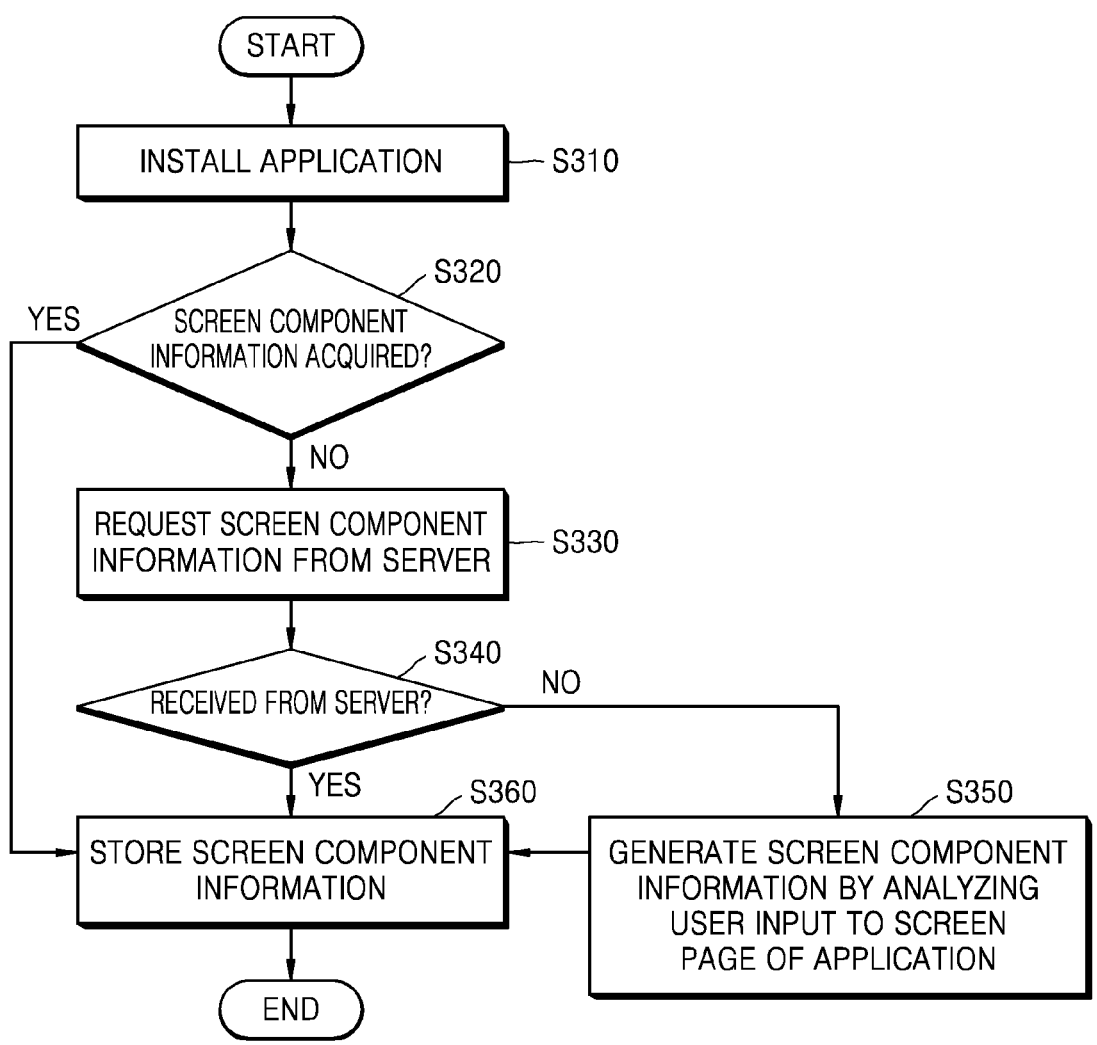
FIG. 3 is a flowchart illustrating a method for acquiring screen component information of an application by the device, according to an exemplary embodiment.

FIG. 3 is a flowchart illustrating a method for acquiring screen component information of an application by the device, according to an exemplary embodiment.

Referring to FIG. 3, in operation S310, the device 100 may install an application. For example, the device 100 may receive information for installation of the application from the server 200 and install the application based on the received information.

In operation S320, the device 100 may determine whether screen component information of the application is acquired during the installation of the application. For example, when receiving the screen component information of the application generated together with the application by an application developer (or provider), the device 100 may determine that the screen component information of the application is acquired.

According to an exemplary embodiment, the screen component information of the application generated together with the application by the application developer (or provider) may be included in an application file or an application installation file.

Also, when the application developer (or provider) also registers the screen component information of the application in the server 200 together with the application file, the device 100 may also download the screen component information of the application from the server 200 together with the application file.

In operation S330, when the screen component information of the application is not acquired during the installation of the application, the device 100 may request the screen component information (UI description) of the installed application from the server 200. In response to the request, the server 200 may identify the screen component information (UI description) of the application.

According to an exemplary embodiment, when the screen component information (UI description) of the application exists in the server 200, the server 200 may transmit the screen component information (UI description) of the application to the device 100.

The server 200 may identify version information of the application installed in the device 100 and transmit the screen component information corresponding to the version of the application. When there are pieces of screen component information corresponding to the version of the application, the server 200 may transmit the latest version of screen component information among the pieces of screen component information corresponding to the version of the application to the device 100.

According to another exemplary embodiment, when the screen component information (UI description) of the application does not exist in the server 200, the server 200 may generate the screen component information (UI description) of the application by using a simulator. For example, the server 200 may extract the UI elements, which may be controllable (e.g., clickable) by the user, from among the UI elements included in the screen pages of the application. Assuming that a user input is generated for each of the extracted UI elements, the server 200 may generate the screen component information by analyzing the screen page transition of the application according to the user input.

According to an exemplary embodiment, when the screen component information (UI description) of the application does not exist in the server 200, the server 200 may transmit information indicating the nonexistence of the screen component information (UI description) to the device 100.

In operation S340, the device 100 may determine whether the screen component information (UI description) of the application is received from the server 200. When the screen component information (UI description) of the application is not received from the server 200 for a predetermined time, the device 100 may determine that the screen component information (UI description) of the application does not exist in the server 200. Also, the device 100 may receive the information indicating the nonexistence of the screen component information (UI description) from the server 200.

In operation S350, when the screen component information (UI description) of the application is not received from the server 200, the device 100 may directly generate the screen component information (UI description) of the application by analyzing the user inputs to the screen pages of the application. For example, the device 100 may generate the screen component information of the application based on the identification information of at least one UI element selected by the user in the first screen page of the application and the information about at least one second screen page resulting from transition by the selection.

According to an exemplary embodiment, the device 100 may generate the screen component information including the information of the UI elements included in the screen pages, the function information of the UI elements, and the transition information between the screen pages.

The device 100 may determine the function (e.g., Chat) of the first UI element by analyzing the text (e.g., 1:1 Chat) about the first UI element selected by the user. Also, the device 100 may determine the function of the first UI element or the function of the second screen page by using the character recognition results about the first UI element and the information about the second screen page (e.g., the identification information of the second UI elements included in the second screen page, the types of the second UI elements, and the attributes of the second UI elements).

The device 100 may generate information for transitioning from the first screen page to the second screen page. For example, the device 100 may generate the transition information between the first screen page and the second screen page (e.g., information indicating transition from the first screen page to the second screen page if the first UI element is clicked) by using the identification information of the first UI element and the type of an input for controlling the first UI element (e.g., Click).

According to another exemplary embodiment, the device 100 may generate the screen component information including at least one piece of action information. For example, the device 100 may define the identification information of one or more screen pages, which are sequentially displayed by transitions according to user inputs, as a predetermined action.

For example, when the user clicks the first button in the first page, clicks the second button in the second page displayed by the click of the first button, inputs a message in the third page displayed by the click of the second button, and clicks the third button included in the third page in order to send a text message to a friend, the device 100 may define a set of inputs for clicking the first button in the first page, clicking the second button in the second page, and clicking the third button included in the third page, as one action.

According to an exemplary embodiment, by analyzing the function of the first button (e.g., Friend Name), the function of the second button (e.g., 1:1 Chat), and the function of the third button (e.g., Send), the device 100 may determine that the user desires to perform an action 'Send Text Message to Friend'. Then, the device 100 may match the identification information of the first page, the identification information of the first button, the identification information of the second page, the identification information of the second button, the identification information of the third page, and the identification information of the third button to the action 'Send Text Message to Friend' and add the matching information to the screen component information.

An operation of directly generating the screen component information (UI description) of the application by the device 100 will be described below in detail with reference to FIG. 5.

In operation S360, the device 100 may store the screen component information (UI description) received from the server 200 or the screen component information (UI description) generated by the device 100 in a memory (e.g., a nonvolatile memory). The screen component information (UI description) of the application may be stored as a file. Also, the screen component information (UI description) of the application may be stored after being mapped to the identification information of the application. In this case, the device 100 may manage the screen component information corresponding to each application based on the identification information of the application.

Figure 4:
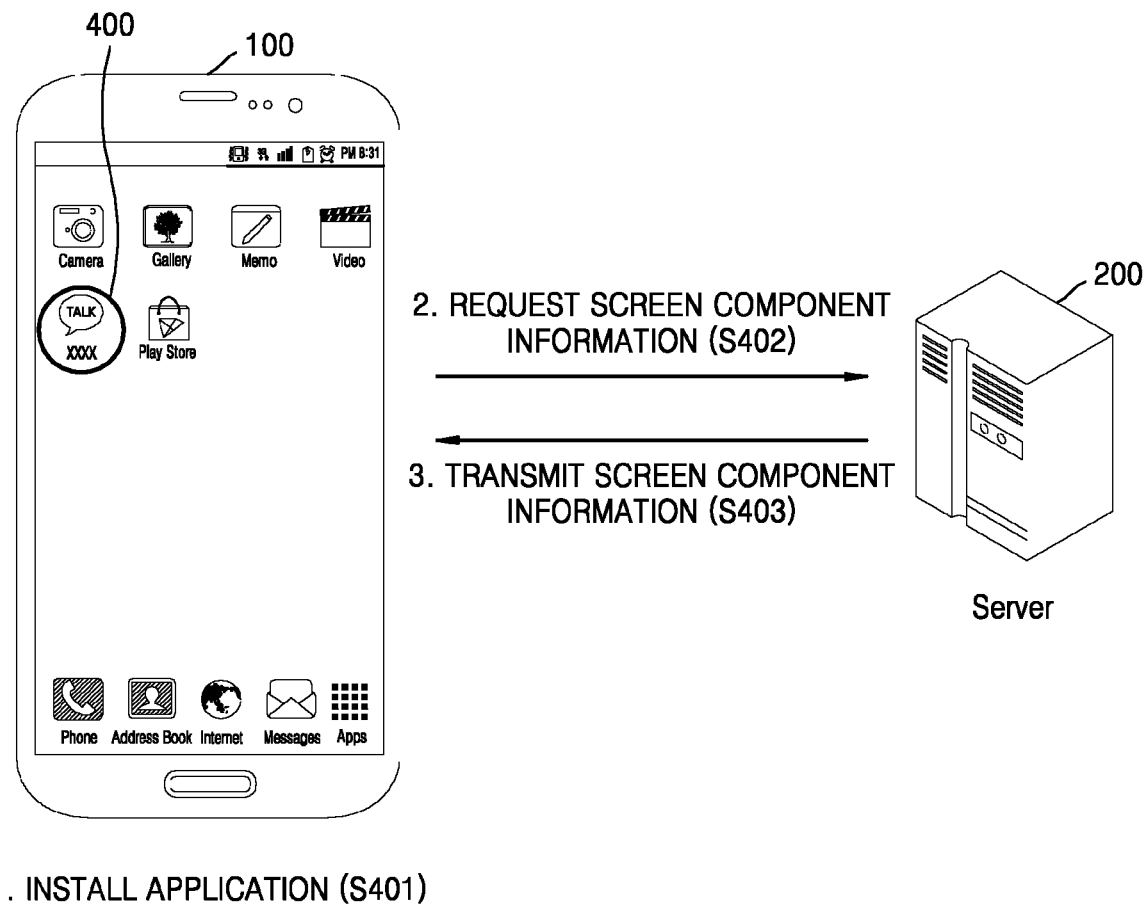
FIG. 4 is a diagram illustrating an example of receiving screen component information of an application from a server by the device.

FIG. 4 is a diagram illustrating an example of receiving screen component information of an application from the server by the device, according to an exemplary embodiment.

Referring to FIG. 4, the device 100 may receive installation information from the server 200 and install a chat application 400 (S401). During or after the installation of the chat application 400, the device 100 may determine whether the screen component information (UI description) of the chat application 400 is stored in the device 100.

As a result of the determination, when the screen component information (UI description) of the chat application 400 is not stored in the device 100, the device 100 may request the screen component information (UI description) of the chat application 400 from the server 200 (S402). For example, the device 100 may request the screen component information (UI description) of the chat application 400 from the server 200 while transmitting the identification information of the chat application 400 to the server 200.

The server 200 may read the screen component information (UI description) of the chat application 400 from a database based on the identification information of the chat application 400.

Also, the device 100 may generate the screen component information of the chat application 400 based on the simulation results obtained by application of a virtual input event to the chat application 400.

The server 200 may transmit the screen component information (UI description) of the chat application 400 to the device 100 (S403). The device 100 may map the screen component information (UI description) of the chat application 400 received from the server 200 to the identification information of the chat application 400 and store the mapping result in the memory of the device 100.

Figure 5:
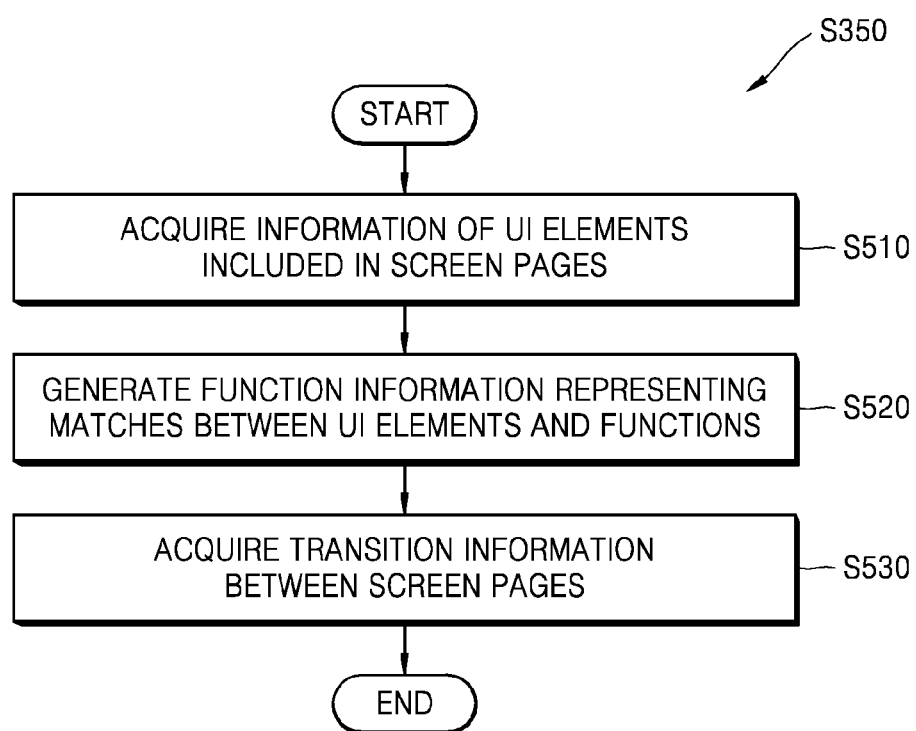
FIG. 5 is a flowchart illustrating a method for generating screen component information of an application by the device, according to an exemplary embodiment.

FIG. 5 is a flowchart illustrating a method for generating screen component information of an application by the device, according to an exemplary embodiment. Operation S350 of FIG. 3 (the operation of generating the screen component information by the device 100) will be described in more detail with reference to FIG. 5.

Referring to FIG. 5, in operation S510, the device 100 may acquire the information of the UI elements included in the screen pages of the application. As described above, the UI elements may be objects (e.g., texts, images, buttons, icons, and menus) that may be shown to or controlled by the user. Also, the information of the UI elements may include the identification information of the UI elements and the attribute information of the UI elements. For example, the information of the UI elements may include types of the UI elements, features of the UI elements (e.g., text features or image features), identification values of the UI elements (e.g., resource IDs), positions of the UI elements (e.g., coordinate values), sizes of the UI elements, information about whether the UI elements may be controlled by the user, types of input events for controlling the UI elements, and texts representing the UI elements, etc.

According to an exemplary embodiment, the device 100 may acquire the information of the UI elements included in the screen pages by using information acquired in a rendering process for displaying the screen pages (e.g., execution screens) on a display (hereinafter referred to as 'rendering information'). Herein, the rendering may refer to a final image processing process for generating a complete image in two-dimensional (2D) graphics, and may refer to a process for imaging model data, which is stored in a computer, on a display in three-dimensional (3D) graphics.

The information acquired in the rendering process (i.e., rendering information) may include types of the UI elements, features of the UI elements (e.g., text features or image features), identification values of the UI elements (e.g., resource IDs), positions of the UI elements (e.g., coordinate values), sizes of the UI elements, information about whether the UI elements may be controlled by the user, types of input events for controlling the UI elements, and texts representing the UI elements.

Thus, according to an exemplary embodiment, the device 100 may define information acquired to render the first UI element included in the first screen page, as information about the first UI element.

According to an exemplary embodiment, when the first screen page including the first button is displayed, the device 100 may collect information about the position of the first button, the resource ID of the first button, the input event for selecting the first button (e.g., Click), and the text representing the first button (e.g., Call) by using the rendering information acquired in the process of rendering the first screen page. Then, the device 100 may define the collected information of the first button in the screen component information (UI description) of the application.

In operation S520, the device 100 may generate function information representing matches between the functions and the UI elements included in the screen pages. According to an exemplary embodiment, the functions may be defined as 'features in the screen component information of the application.

According to an exemplary embodiment, the device 100 may generate the function information of the UI elements by analyzing at least one of the text information representing the UI elements, the character recognition result information about the UI elements, and the information about the screen pages that are newly displayed according to the inputs for selecting the UI elements.

According to an exemplary embodiment, the device 100 may generate the function information by using the information of the UI elements acquired in operation S510.

For example, the device 100 may extract the text information representing the first UI element from the information of the UI elements. The device 100 may define the function of the first UI element by analyzing the extracted text information.

According to an exemplary embodiment, when the text information representing the first UI element may not be extracted from the information of the UI elements, the device 100 may define the function of the first UI element by performing character recognition on the first UI element or by using the machine learning algorithm of the server 200. An operation of generating the function information by the device 100 will be described below in more detail with reference to FIG. 6.

According to an exemplary embodiment, the device 100 may map the function of the UI element to a predetermined command when generating the function information. Thus, the function information of the application may include, but is not limited to, identification information of the screen pages, identification information of the UI elements, function names, and commands.

In operation S530, the device 100 may acquire transition information between the screen pages of the application. For example, in the case of transition from the first screen page to the second screen page according to a user input, the device 100 may analyze the user input (e.g., click and button selection) to acquire the transition information between the screen pages including the input event information for transition from the first screen page to the second screen page (e.g., clicking the first button included in the first screen page). Operation S530 will be described below in more detail with reference to FIG. 13.

According to an exemplary embodiment, the device 100 may generate the screen component information of the application by using the information of the UI elements included in the screen pages, the function information representing the matches between the UI elements included in the screen pages and the functions provided by the application, and the transition information between the screen pages.

Also, according to an exemplary embodiment, the device 100 may further include application information (e.g., application name, application version, and application identification code) and screen component information version in the screen component information of the application.

Figure 6:
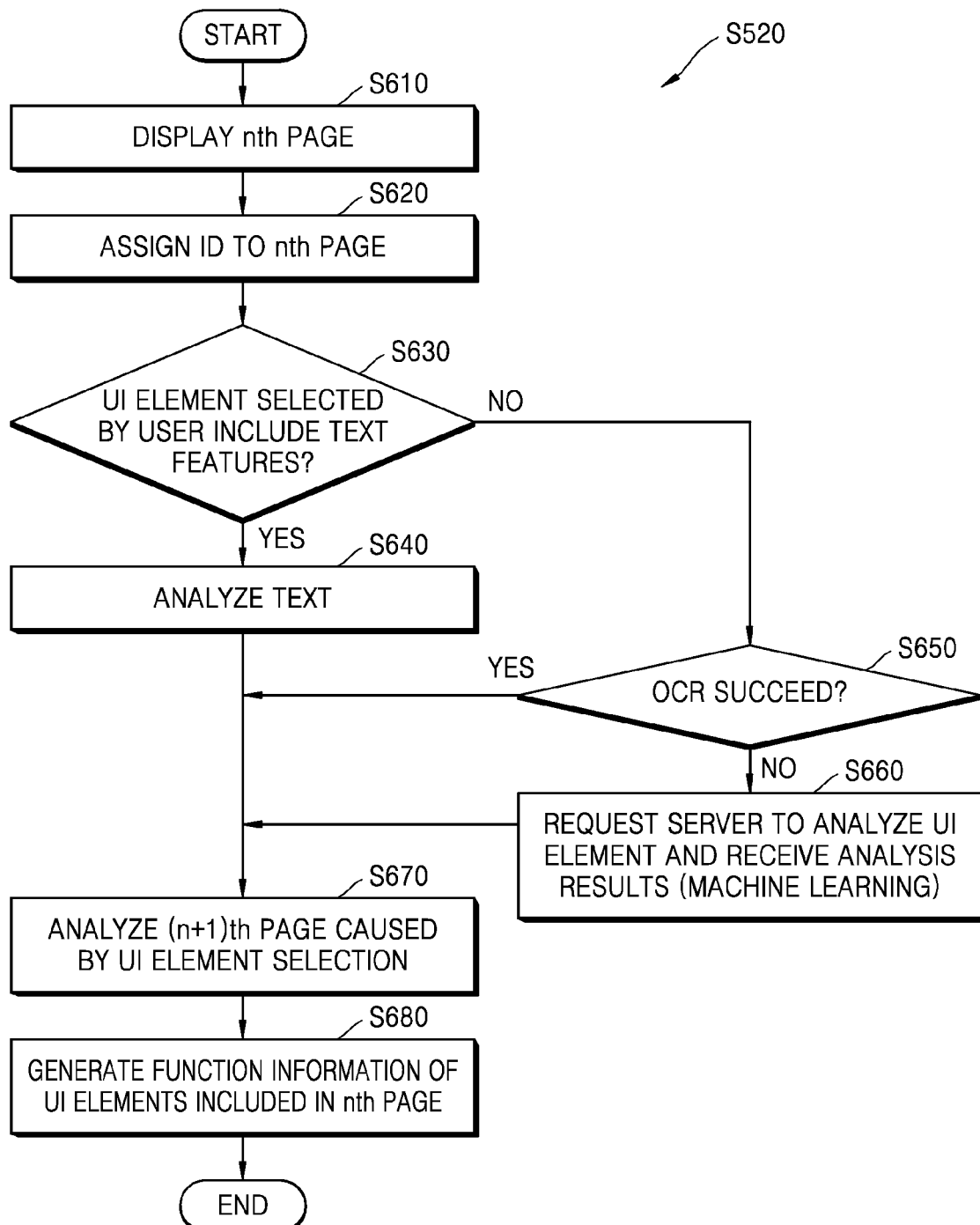
FIG. 6 is a flowchart illustrating a method for acquiring function information and information of user interface (UI) elements included in screen pages by the device, according to an exemplary embodiment.

FIG. 6 is a flowchart illustrating a method of acquiring function information and information of UI elements included in screen pages in the device, according to an exemplary embodiment.

Referring to FIG. 6, in operation S610, the device 100 may display the nth page of the application. For example, the device 100 may receive an application execution request and execute the application. In this case, the nth page among the screen pages constituting the application may be displayed on the screen.

In operation S620, the device 100 may assign an identifier (ID) to the nth page. For example, the device 100 may assign a predetermined ID to the nth page displayed on the current screen. According to an exemplary embodiment, the ID assigned to the nth page may be texts, numerals, symbols, or may be any combination of texts, numerals, and symbols; however, exemplary embodiments are not limited to this.

According to an exemplary embodiment, the device 100 may assign an ID to each screen page provided by the application. In this case, the device 100 may automatically assign an ID to each screen page or may assign an ID to the screen page based on a user input. For example, the device 100 may automatically assign an ID to each screen page according to a predetermined rule. Also, the device 100 may assign the screen page an ID designated by the user.

In operation S630, the device 100 may determine whether the UI element selected in the nth page by the user has text features. For example, when the UI element selected by the user is a news text or a user profile, the UI element may have text features.

According to an exemplary embodiment, the device 100 may determine whether the UI element has text features, based on information exchanged between the application and a platform (or OS) for driving the application. For example, the application may request the display of the current page (the nth page) while transmitting information about the UI elements included in the nth page to a rendering unit (e.g., UI renderer). In this case, the device 100 may match the information about the UI elements included in the rendering unit (e.g., UI renderer) to the ID of the nth page and define the same as the information of the nth page. Then, the device 100 may extract the text information representing the UI element selected by the user, from among the information about the UI elements.

In operation S640, the device 100 may analyze the text representing the UI element selected by the user. For example, when the text information representing the UI element selected by the user is extracted from the information about the UI elements, the device 100 may analyze the extracted text information. In this case, the device 100 may define the text representing the UI element as the function of the UI element. For example, when the text representing the first button is 'Send,' the device 100 may define the function of the first button as 'Send'. The type of the UI element having text features may be defined as 'TextView' in the screen component information (UI description) of the application.

In operation S650, when the UI element selected by the user has image features, the device 100 may perform character recognition (e.g., optical character recognition (OCR)) on the UI element. For example, when the text information representing the UI element selected by the user is not extracted from the information about the UI elements, the device 100 may perform OCR on the UI element.

The OCR may refer to a technology that converts Korean characters, English characters, and numeral fonts included in an image document into character codes that may be edited in the device 100.

When OCR is successful on the UI element, the device 100 may define the function of the UI element by using the OCR result. For example, when the OCR result about the second button is 'VoiceTalk', the device 100 may define the function of the second button as 'VoiceTalk'.

When the first UI element has image features, the type of the first UI element may be defined as 'ImageView' in the screen component information (UI description) of the application.

In operation S660, when the OCR is unsuccessful on the UI element selected by the user, the device 100 may request the server 200 to analyze the UI element selected by the user. For example, the device 100 may generate a capture image by capturing the UI element selected by the user and transmit the generated capture image to the server 200.

In this case, the server 200 may use a machine learning algorithm to analyze the UI element having image features. For example, the server 200 may compare a prestored image template with the UI element included in the capture image. In this case, the server 200 may identify an image, which is most similar to the UI element selected by the user among the images included in the image template, as the UI element selected by the user.

For example, when the first UI element included in the capture image is a human-shaped icon and the human-shaped icon is defined as Contact Tab in an image template list, the server 200 may recognize the first UI element as 'Contact Tab'. Also, when the first UI element included in the capture image is an ellipsis ( . . . ) and the ellipsis is defined as More Tab in an image template list, the server 200 may recognize the first UI element as 'More Tab'.

According to an exemplary embodiment, the server 200 may transmit analysis information about the UI element having image features to the device 100. In this case, the device 100 may define the function of the UI element based on the information received from the server 200. For example, the device 100 may define the function of the human-shaped third button as 'Contact Search'.

In operation S670, in the case of transition from the nth page to the (n+1)th page by selection of the UI element, the device 100 may analyze the (n+1)th page. For example, the device 100 may analyze the number, types, attributes, and positions of the UI elements included in the (n+1)th page by using the information acquired to render the (n+1)th page.

The device 100 may define the function of the UI element by using information about the (n+1)th page and information about the UI element selected by the user in the nth page. For example, when a chat room page including a message input window is displayed based on an input for selecting a 1:1 Chat button, the device 100 may define the function of the 1:1 Chat button as 'Text Chat' by using information about the 1:1 Chat button and information about the chat room page.

In operation S680, the device 100 may generate function information of the UI element by using at least one of text information representing the UI element, OCR result information about the UI element, analysis result information of the server 200 about the UI element, and information about the page that is newly displayed by selection of the UI element.

By repeating operations S610 to S680, the device 100 may define all the information about the UI elements included in each screen page provided by the application, in the screen component information of the application.

Figure 7A:
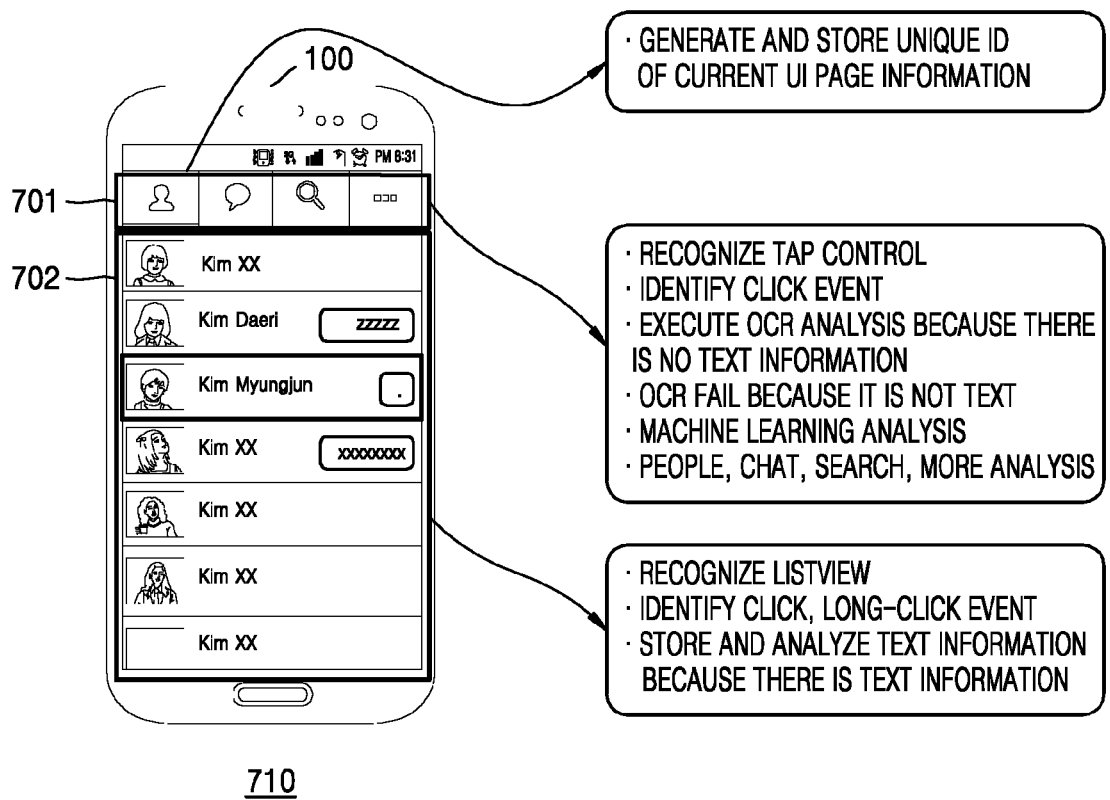
FIGS. 7A to 7C are diagrams illustrating an example of analyzing UI elements included in each screen page of an application by the device, according to an exemplary embodiment.
Figure 7B:
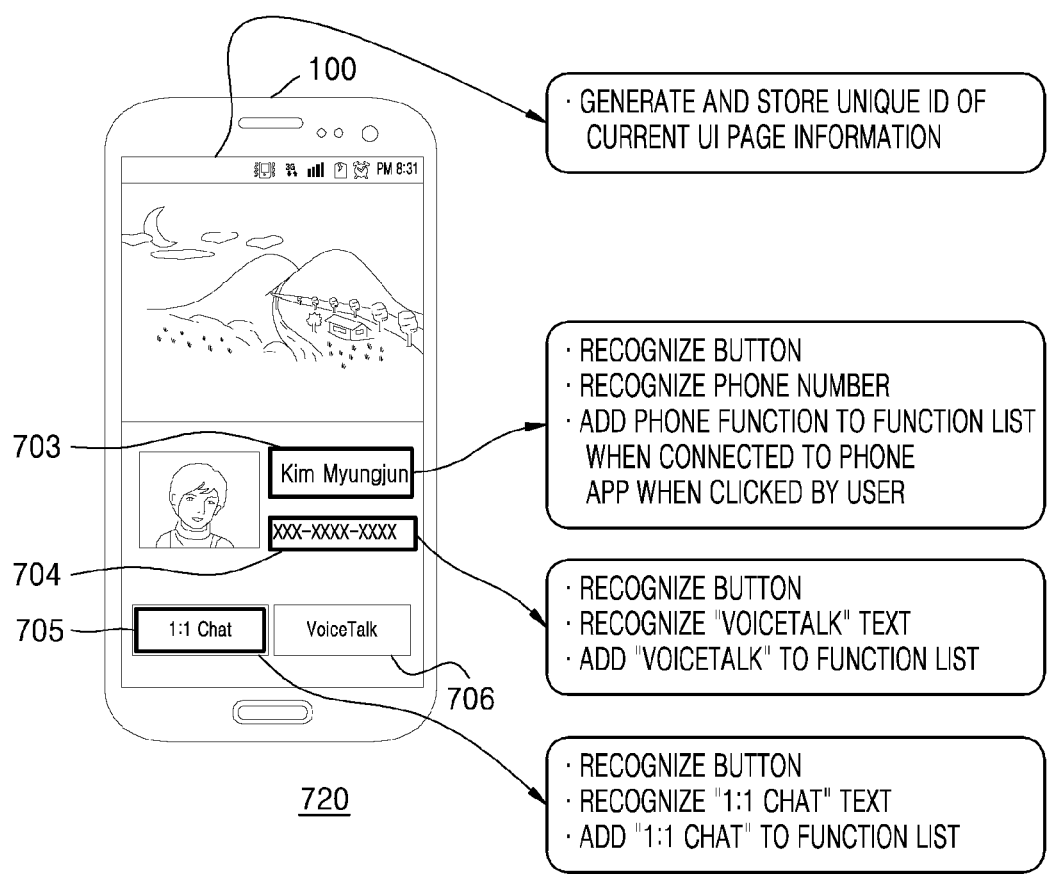
Figure 7C:
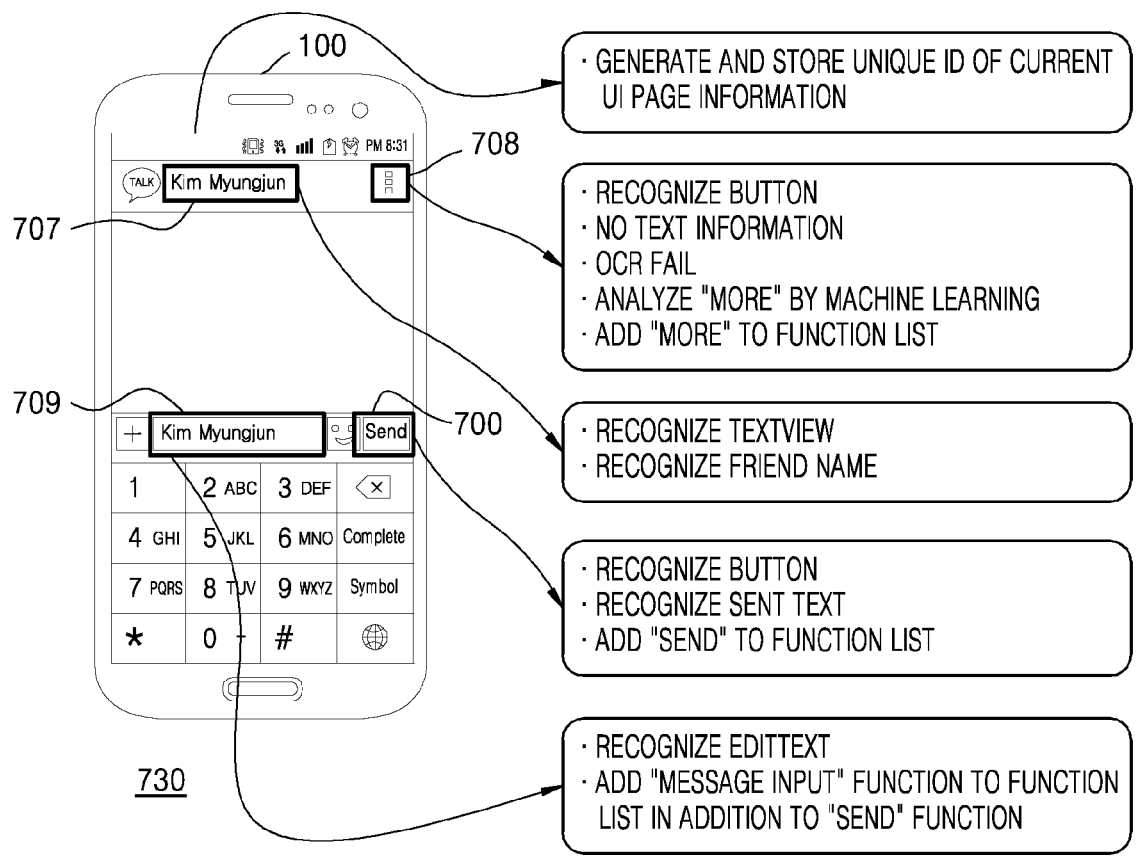

FIGS. 7A to 7C are diagrams illustrating an example of analyzing UI elements included in each screen page of an application by the device, according to one or more exemplary embodiments.

Referring to FIG. 7A, the device 100 may create a unique ID of a first page 710 and store information about the first page 710. For example, the device 100 may define the unique ID of the first page 710 as 'FriendListTab'.

According to an exemplary embodiment, the device 100 may analyze UI elements (UI objects) included in the first page 710. For example, the device 100 may analyze UI elements included in a first region 701 and UI elements included in a second region 702.

Since the UI elements included in the first region 701 have image features, the device 100 may perform OCR on the UI elements included in the first region 701. In this case, since the UI elements included in the first region 701 do not include texts, the OCR performed on the UI elements included in the first region 701 may fail.

When the OCR is unsuccessful, the device 100 may image capture the UI elements included in the first region 701. Then, while transmitting the captured UI elements to the server 200, the device 100 may request the server 200 to analyze the captured UI elements.

The server 200 may analyze the UI elements included in the first region 701 based on a machine learning algorithm. For example, the server 200 may detect that the UI elements included in the first region 701 represent 'People', 'Chat', 'Search', and 'More' respectively. The server 200 may transmit the analysis information ('People', 'Chat', 'Search', and 'More') about the UI elements included in the first region 701 to the device 100.

In this case, the device 100 may acquire the analysis information ('People', 'Chat', 'Search', and 'More') about the UI elements included in the first region 701. The device 100 may detect that the UI elements included in the first region 701 are controlled by a Click event by using the rendering information.

The device 100 may recognize a list of the UI elements included in the second region 702. Since the UI elements included in the second region 702 have text features, the device 100 may analyze the text corresponding to each of the UI elements included in the second region 702. Also, based on the use mode of the user, the device 100 may detect that Click and/or Long-Click exists as an input event corresponding to each of the UI elements included in the second region 702.

According to an exemplary embodiment, information about the UI elements included in the first page 710 may be defined as information about controls of a first page (FriendListTab) of FIG. 16A that will be described below.

Referring to FIG. 7B, the device 100 may create a unique ID of a second page 720 and store information about the second page 720. For example, the device 100 may define the unique ID of the second page 720 as 'FriendSummary'.

According to an exemplary embodiment, the device 100 may analyze UI elements included in the second page 720. For example, the device 100 may recognize buttons (e.g., touch areas) among the UI elements included in the second page 720.

The device 100 may recognize a first button 703 represented by a name and a second button 704 represented by a phone number. Since the first button 703 and the second button 704 have text features, the device 100 may analyze the meanings of texts displayed on the first button 703 and the second button 704. In this case, the device 100 may match the first button 703 to 'FriendName (Kim Myungjun)' and store the matching result. Also, the device 100 may define the function of the second button 704 as 'Call (Phone Number)'. When a phone application is connected in the second page 720 when the user selects the second button 704, the device 100 may add 'Phone Call' to function information about the second page 720.

Also, the device 100 may recognize a 1:1 Chat button 705 and a VoiceTalk button 706. Since the 1:1 Chat button 705 and the VoiceTalk button 706 include texts, the device 100 may perform OCR on the texts displayed on the 1:1 Chat button 705 and the VoiceTalk button 706. For example, the device 100 may define the function of the 1:1 Chat button 705 as 'Chat' and define the function of the VoiceTalk button 706 as 'VoiceTalk'. Also, the device 100 may add '1:1 Chat' and 'VoiceTalk' to the function information about the second page 720.

According to an exemplary embodiment, information about the UI elements included in the second page 720 may be defined as information about controls of a fifth page (FriendSummary) of FIG. 16C.

Referring to FIG. 7C, the device 100 may create a unique ID of a third page 730 and store information about the third page 730. For example, the device 100 may define the unique ID of the third page 730 as 'ChatRoom'.

According to an exemplary embodiment, the device 100 may analyze UI elements included in the third page 730. For example, the device 100 may recognize a text object 707 as representing a name of a friend. Since the text object 707 has text features, the device 100 may analyze the meaning of a text displayed on the text object 707. The device 100 may match the text object 707 to 'FriendName (Kim Myungjun)' and store the matching result.

According to an exemplary embodiment, the device 100 may recognize an icon object 708. Since the icon object 708 has image features, the device 100 may attempt to perform OCR on the icon object 708. In this case, since the icon object 708 does not include characters, the OCR performed on the icon object 708 may fail.

When the OCR is unsuccessful, the device 100 may image capture the icon object 708. Then, while transmitting the captured icon object 708 to the server 200, the device 100 may request the server 200 to analyze the icon object 708.

The server 200 may analyze the icon object 708 based on a machine learning algorithm. For example, the server 200 may detect that the icon object 708 represents 'More'. The server 200 may transmit the analysis information (More') about the icon object 708 to the device 100.

In this case, the device 100 may acquire the analysis information (More') about the icon object 708. Also, the device 100 may define the function of the icon object 708 as 'More' and add 'More' to function information about the third page 730.

Also, the device 100 may recognize an Edit window 709. For example, the device 100 may detect that the user inputs a text to the Edit window 709, and recognize the Edit window 709 as a text input window. In this case, the device 100 may define the function of the Edit window 709 as 'Text Input' and add "Message Input Function" to the function information about the third page 730.

Also, the device 100 may recognize a Send button 700. Since the Send button 700 includes a text, the device 100 may analyze the meaning of the text included in the Send button 700. In this case, the device 100 may define the function of the Send button 700 as 'Send'. Also, the device 100 may add 'Send Function' to the function information about the third page 730.

According to an exemplary embodiment, information about the UI elements included in the third page 730 may be defined as information about controls of a sixth page (ChatRoom) of FIG. 16C.

Figure 8A:
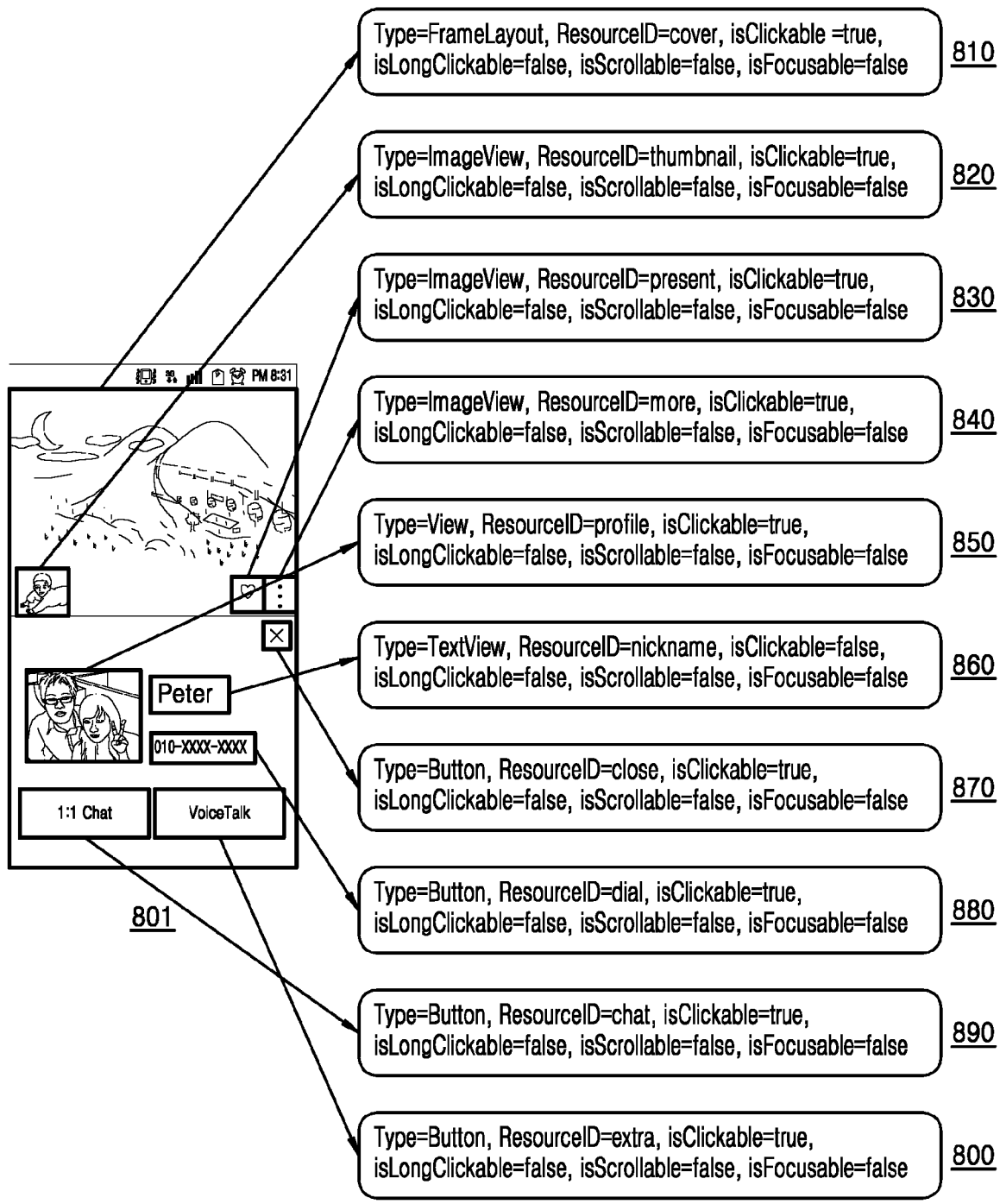

FIGS. 8A and 8B are diagrams illustrating an example of information of UI elements included in screen pages of an application, according to an exemplary embodiment.

Referring to FIG. 8A, when a first page 801 of a chat application is displayed, the device 100 may identify each of first to tenth UI elements 810 to 800 included in the first page 801 and define information about each of the first to tenth UI elements 810 to 800 in screen component information.

For example, since the first UI element 810 is a frame layout, information of the first UI element 810 may be defined as 'Type=FrameLayout, ResourceID=cover, isClickable=true'. Since the second UI element 820 is a thumbnail image, information of the second UI element 820 may be defined as 'Type=ImageView, ResourceID=thumbnail, isClickable=true'. Since the third UI element 830 is a button for providing a present, information of the third UI element 830 may be defined as 'Type=ImageView, ResourceID=present, isClickable=true'.

Since the fourth UI element 840 is an image object for providing an additional menu, information of the fourth UI element 840 may be defined as 'Type=ImageView, ResourceID=more, isClickable=true'. Since the fifth UI element 850 is a friend's profile image, information of the fifth UI element 850 may be defined as 'Type=View, ResourceID=profile, isClickable=true'.

Since the sixth UI element 860 is a text representing a friend's name, information of the sixth UI element 860 may be defined as 'Type=TextView, ResourceID=nickname, isClickable=false, isLongClickable=false, isScrollable=false, isFocusable=false'. Since the seventh UI element 870 is a button for closing the first page 801, information of the seventh UI element 870 may be defined as 'Type=Button, ResourceID=close, isClickable=true'.

Since the eighth UI element 880 is a button for dialing a friend, information of the eighth UI element 880 may be defined as 'Type=Button, ResourceID=dial, isClickable=true'. Since the ninth UI element 890 is a button for chatting with a friend, information of the ninth UI element 890 may be defined as 'Type=Button, ResourceID=chat, isClickable=true'. Since the tenth UI element 800 is a button for providing a mobile Voice over Internet Protocol (mVoIP) connection function in addition to a chat function, information of the tenth UI element 800 may be defined as 'Type=Button, ResourceID=extra, isClickable=true'.

Referring to FIG. 8B, the device 100 may generate the information of the UI elements 810, 820, 830, 840, 850, 860, 870, 880, 890, and 800 included in the first page 801 (e.g. page pageID="friendSummary") as an XML type 802.

Figure 9A:
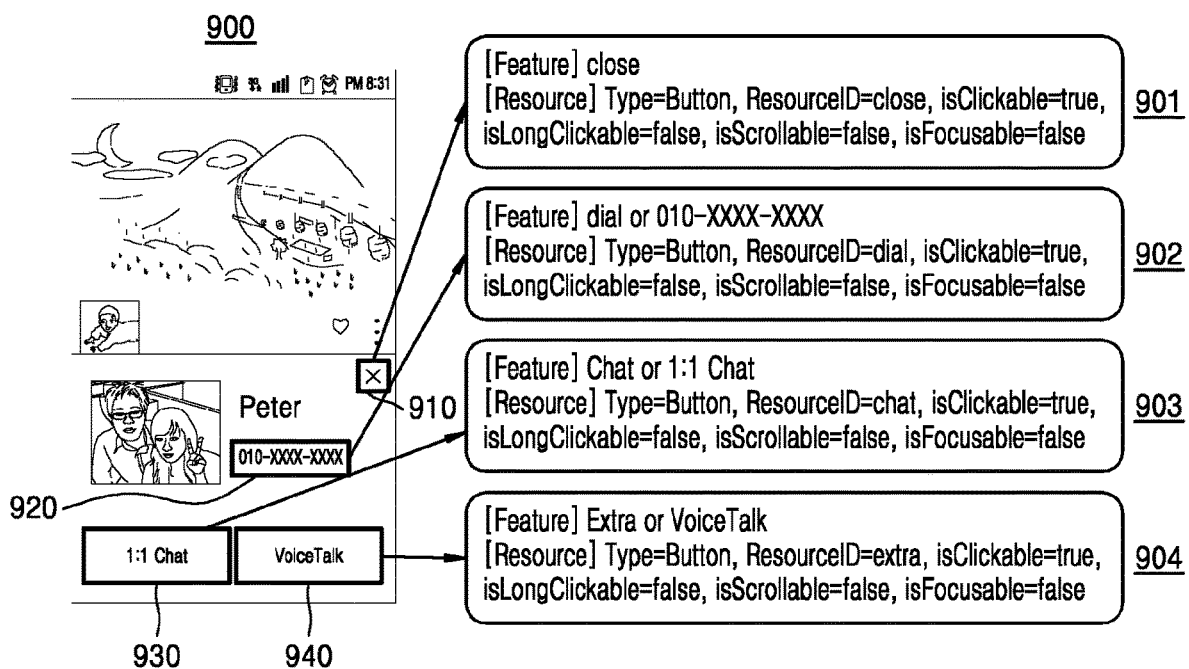
FIGS. 9A and 9B are diagrams illustrating an example of function information representing matches between UI elements included in screen pages of an application and functions provided by the application, according to an exemplary embodiment.
Figure 9B:

FIGS. 9A and 9B are diagrams illustrating an example of function information representing matches between UI elements included in screen pages of an application and functions provided by the application, according to an exemplary embodiment.

Referring to FIG. 9A, when a first page 900 of a chat application is displayed, the device 100 may extract each of first to fourth UI elements 910 to 940 included in the first page 900 and match each of the first to fourth UI elements 910 to 940 to a predetermined function provided by the application.

For example, since the first UI element 910 is a button for providing a function of closing the first page 900, the device 100 may define function information 901 about the first UI element 910 as '[Feature] Close'. For example, the device 100 may define the function information 901 of the first UI element 910 as 'Close' based on text information extracted from rendering information for rendering the first UI element 910.

Since the second UI element 920 is a button for dialing a friend, the device 100 may define function information 902 about the second UI element 920 as '[Feature] Dial or 010-XXXX-XXXX'. For example, the device 100 may define the function information 902 as '010-XXXX-XXXX' by using the character recognition result about the second UI element 920. Also, the device 100 may define the function information 902 of the second UI element 920 as 'Dial' based on information of a call connection page that is newly displayed according to selection of the second UI element 920.

Since the third UI element 930 is a button for chatting with a friend, the device 100 may define function information 903 about the third UI element 930 as '[Feature] Chat or 1:1 Chat'. For example, the device 100 may define the function information 903 of the third UI element 930 as '1:1 Chat' based on the character recognition result about the third UI element 930. Also, the device 100 may define the function information 903 of the third UI element 930 as 'Chat' based on information of a chat room page that is newly displayed according to selection of the third UI element 930.

Since the fourth UI element 940 is a button for providing an mVoIP connection function in addition to a chat function, the device 100 may define function information 904 about the fourth UI element 940 as '[Feature] Extra or VoiceTalk'. For example, the device 100 may define the function information 904 of the fourth UI element 940 as 'Extra' based on text information extracted from rendering information for rendering the fourth UI element 940. Also, the device 100 may define the function information 904 of the fourth UI element 940 as 'VoiceTalk' based on the character recognition result about the fourth UI element 940.

Referring to FIG. 9B, the device 100 may change the predefined function information based on a user input. For example, while the function information 903 about the third UI element 930 is predefined as '[Feature] Chat or 1:1 Chat', when the user changes the function name from 'Chat or 1:1 Chat' to 'Chat Window Open', the device 100 may redefine the function information 903 about the third UI element 930 as '[Feature] 'Chat Window Open' 905.

Figure 10A:
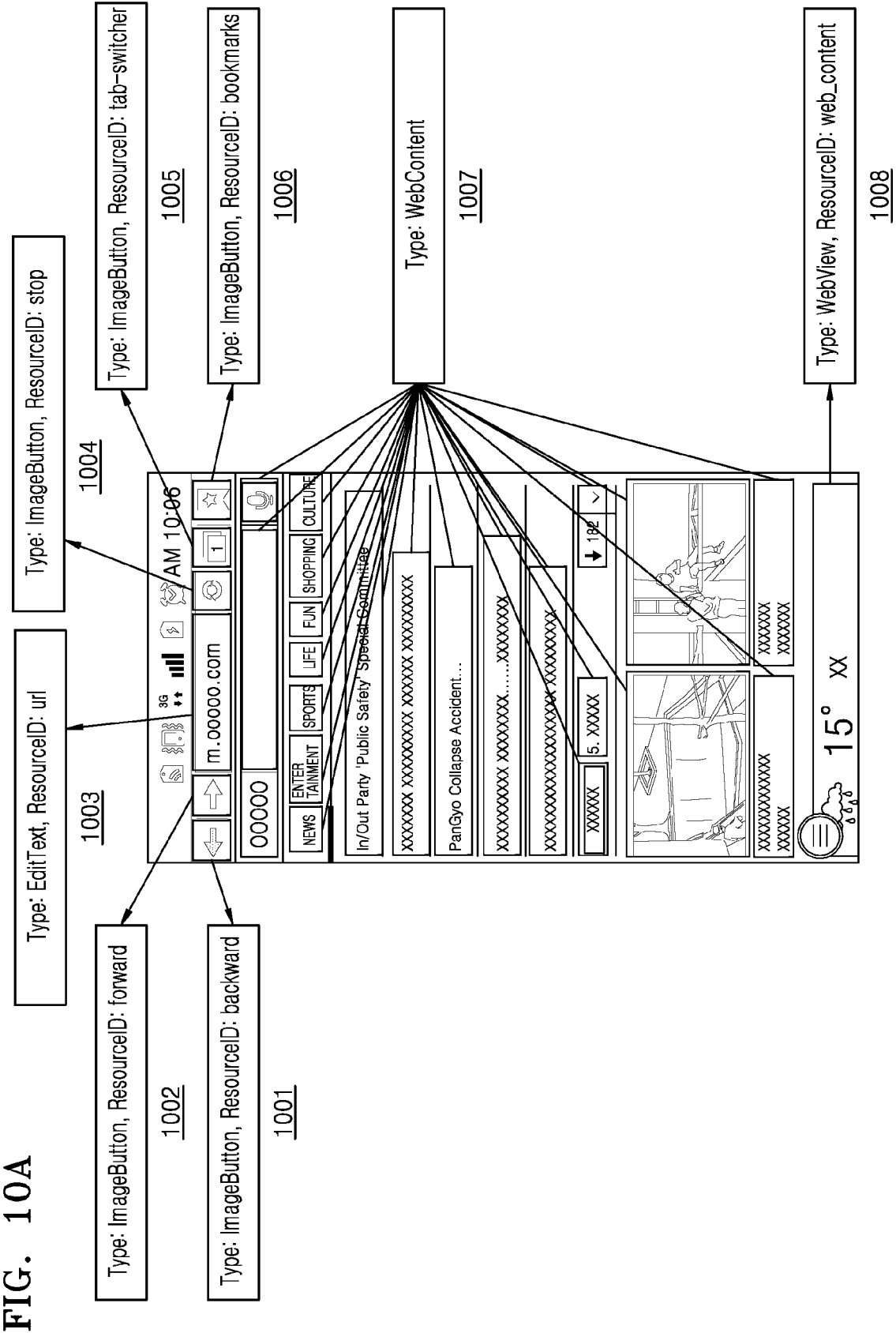
FIGS. 10A and 10B are diagrams illustrating function information of UI elements included in a Web browser application according to an exemplary embodiment.
Figure 10B:
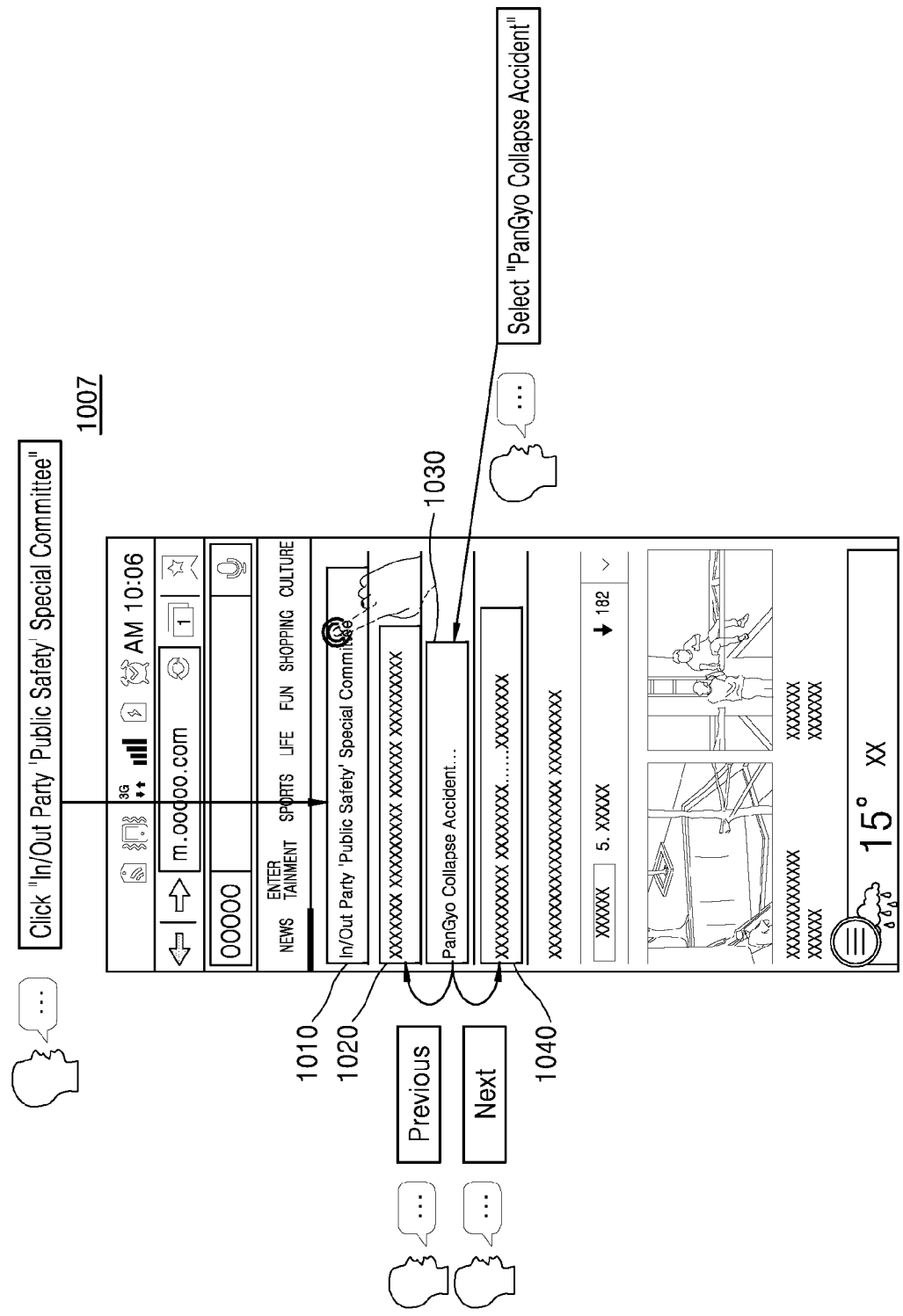

FIGS. 10A and 10B are diagrams illustrating function information of UI elements included in a Web browser application according to an exemplary embodiment.

Referring to FIG. 10A, the Web browser application may include UI elements 1001, 1002, 1003, 1004, 1005, and 1006 that are fixedly included in a screen page and UI elements 1007 and 1008 that are periodically or aperiodically changed in the screen page. The device 100 may define function information of the UI elements 1001, 1002, 1003, 1004, 1005, and 1006, which are fixedly included in the screen page, in screen component information of the Web browser. For example, the device 100 may define the function information of the first UI element 1001 as 'Transfer to Previous Page', define the function information of the second UI element 1002 as 'Transfer to Next Page', define the function information of the third UI element 1003 as 'Input URL', define the function information of the fourth UI element 1004 as 'Stop', define the function information of the fifth UI element 1005 as 'Display Web Pages', and define the function information of the sixth UI element 1006 as 'Bookmark'.

Referring to FIG. 10B, the device 100 may define a command (or an instruction) for controlling the content included in the Web page, in the screen component information. For example, the device 100 may define 'Click' as a command for clicking a content title to view all the content, define 'Select' as a command for locating a focus on a selected content title, define 'Previous' as a command for transferring a focus to a previous content title, and define 'Next' as a command for transferring a focus to a next content title.

Thus, when the user utters a voice command 'Click' to a first article title 1010 (e.g., click the first article or click "In/Out Party 'Public Safety' Special Committee"), the device 100 may click the first article title 1010 and display all contents of the first article title 1010.

When the user utters a voice command 'Select' to a third article title 1030 (e.g., select "PanGyo Collapse Accident"), the device 100 may locate a focus on the third article title 1030. In this case, when the user utters a voice command 'Previous', the focus may transfer from the third article title 1030 to a second article title 1020; and when the user utters a voice command 'Next', the focus may transfer from the third article title 1030 to a fourth article title 1040.

Figure 11:
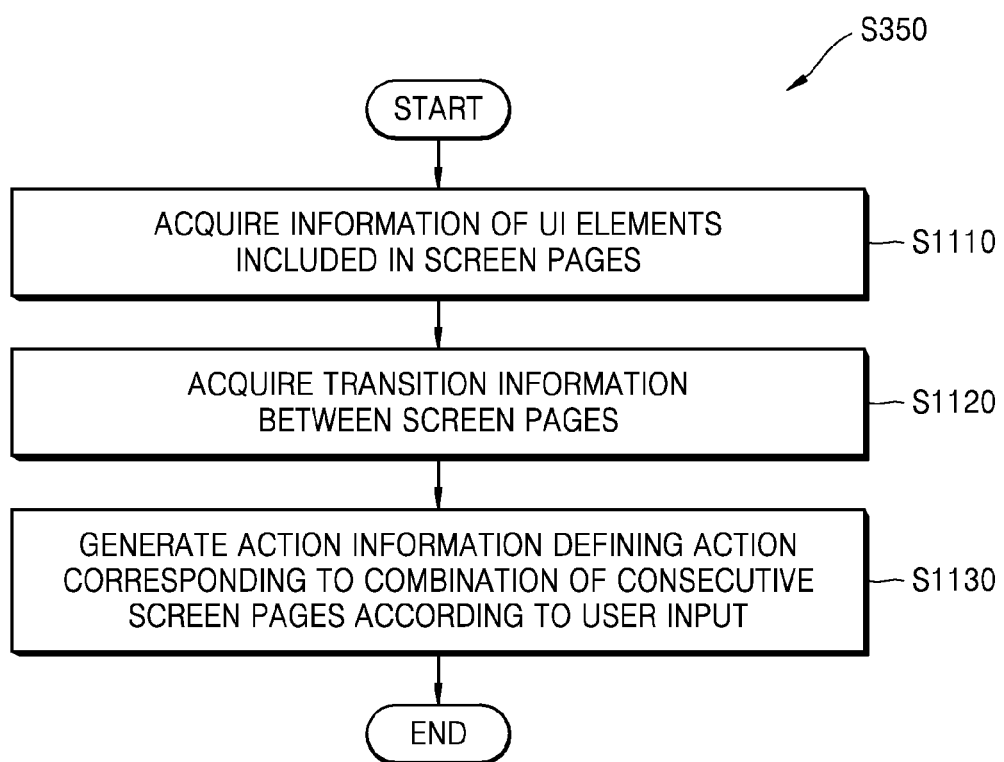
FIG. 11 is a flowchart illustrating a method for generating screen component information of an application by the device according to another exemplary embodiment.

FIG. 11 is a flowchart illustrating a method for generating screen component information of an application by the device according to another exemplary embodiment. Operation S350 of FIG. 3 (the operation of generating the screen component information by the device 100) will be described in more detail with reference to FIG. 11.

Referring to FIG. 11, in operation S1110, the device 100 may acquire the information of the UI elements included in the screen pages of the application. As described above, the UI elements may be objects (e.g., texts, images, buttons, icons, and menus) that may be shown to or controlled by the user.

According to an exemplary embodiment, the device 100 may acquire the information of the UI elements included in the screen pages by using information acquired in a rendering process for displaying the screen pages (execution screens) on a display (hereinafter referred to as 'rendering information'). For example, when the first screen page including the first button is displayed, the device 100 may collect information about the position of the first button, the resource ID of the first button, the input event for selecting the first button (e.g., Click), and the text representing the first button (e.g., Call) by using the rendering information acquired in the process of rendering the first screen page. Then, the device 100 may define the collected information of the first button in the screen component information (UI description) of the application.

In operation S1120, the device 100 may acquire transition information between the screen pages of the application. For example, in the case of transition from the first screen page to the second screen page according to a user input, the device 100 may analyze the user input (e.g., click and button selection) to generate transition information from the first screen page to the second screen page. In this case, the transition information from the first screen page to the second screen page may include input event information (e.g., clicking the first button included in the first screen page). Operation S1120 will be described below in more detail with reference to FIG. 13.

In operation S1130, the device 100 may generate action information defining an action corresponding to a combination of screen pages that are sequentially displayed by transitions according to user inputs. For example, in the case of transition from the first screen page to the second screen page according to the user input for selecting the first UI element included in the first screen page and transition from the second screen page to the third screen page according to the user input for selecting the second UI element included in the second screen page, the device 100 may determine the action requested by the user by using the function information of the first UI element and the function information of the second UI element.

Also, the device 100 may determine the action requested by the user based on the information of the second screen page and the information of the third screen page in addition to the function information of the first UI element and the function information of the second UI element. The device 100 may match the identification information of the first screen page, the identification information of the second screen page, and the identification information of the third screen page to the determined action.

For example, when the user clicks the first button in the first page, clicks the second button in the second page displayed by the click of the first button, inputs a message in the third page displayed by the click of the second button, and clicks the third button included in the third page in order to send a text message to a friend, the device 100 may determine that the action requested by the user is 'Send Message to Friend', by using the function of the first button, the function of the second button, and the function of the third button. In this case, the device 100 may match the identification information of the first page, the identification information of the first button, the identification information of the second page, the identification information of the second button, the identification information of the third page, and the identification information of the third button to the action 'Send Message to Friend' and store the matching information therein. The action information will be described in more detail with reference to FIG. 12.

Figure 12:
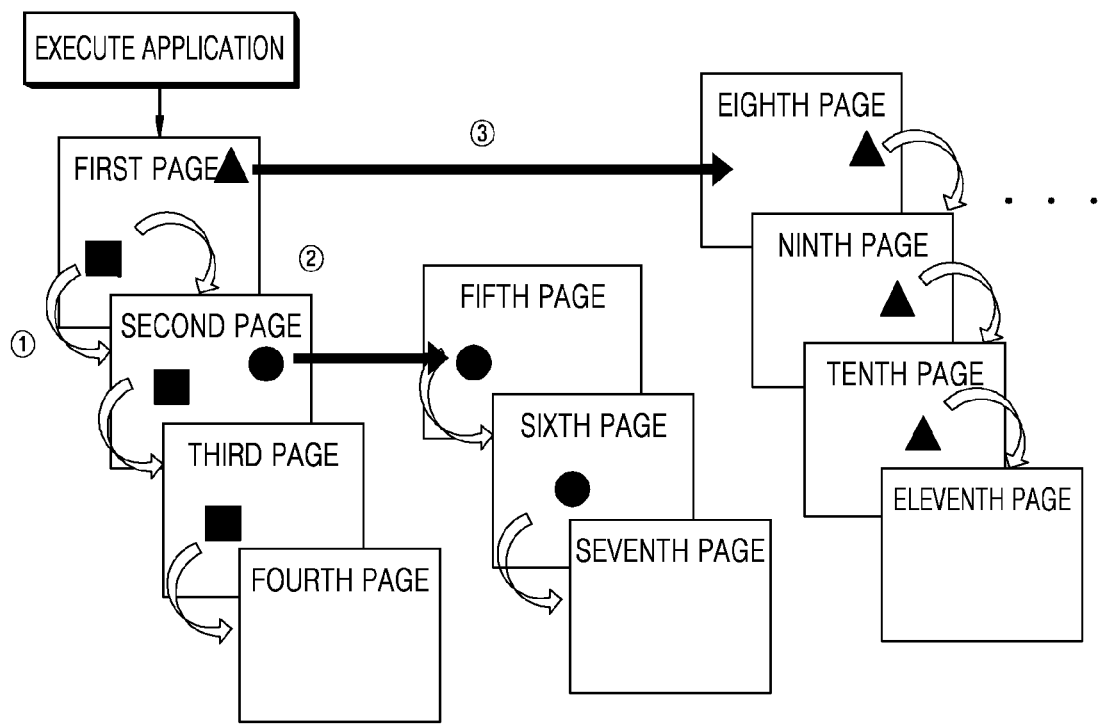
FIG. 12 is a diagram illustrating an example of action information defined in screen component information, according to an exemplary embodiment.

FIG. 12 is a diagram illustrating an example of action information defined in screen component information.

Referring to FIG. 12, according to an exemplary embodiment, the device 100 may define the identification information of one or more screen pages, which are sequentially displayed by transitions according to user inputs, as a predetermined action.

For example, when the user sequentially clicks the first button of the first page, the second button of the second page, and the third button of the third page, the device 100 may sequentially display the first page, the second page, the third page, and the fourth page. Then, the device 100 may generate first action information by matching the identification information of the first page, the identification information of the first button, the identification information of the second page, the identification information of the second button, the identification information of the third page, the identification information of the third button, and the identification information of the fourth page to a first action 1210.

Also, when the user sequentially clicks the first button of the first page, the fourth button of the second page, the fifth button of the fifth page, and the sixth button of the sixth page, the device 100 may sequentially display the first page, the second page, the fifth page, the sixth page, and the seventh page. Then, the device 100 may generate second action information by matching the identification information of the first page, the identification information of the first button, the identification information of the second page, the identification information of the fourth button, the identification information of the fifth page, the identification information of the fifth button, the identification information of the sixth page, and the identification information of the sixth button to a second action 1220.

Also, when the user sequentially clicks the seventh button of the first page, the eighth button of the eighth page, the ninth button of the ninth page, and the tenth button of the tenth page, the device 100 may sequentially display the first page, the sixth page, the ninth page, the tenth page, and the eleventh page. Then, the device 100 may generate third action information by matching the identification information of the first page, the identification information of the seventh button, the identification information of the eighth page, the identification information of the eighth button, the identification information of the ninth page, the identification information of the ninth button, the identification information of the tenth page, the identification information of the tenth button, and the identification information of the eleventh page to a third action 1230.

According to an exemplary embodiment, various actions may be defined in the screen component information of the application according to the page transition paths.

When a voice command representing the first action 1210 is received, the device 100 may extract the first action information. Then, the device 100 may identify the identification information of the first page, the identification information of the first button, the identification information of the second page, the identification information of the second button, the identification information of the third page, the identification information of the third button, and the identification information of the fourth page that are matched to the first action 1210. Based on the first action information, the device 100 may display the first page, display the second page by generating an event for clicking the first button in the first page, display the third page by generating an event for clicking the second button in the second page, display the fourth page by generating an event for clicking the third button in the third page, and perform a predetermined function included in the voice command through the fourth page.

Figure 13:
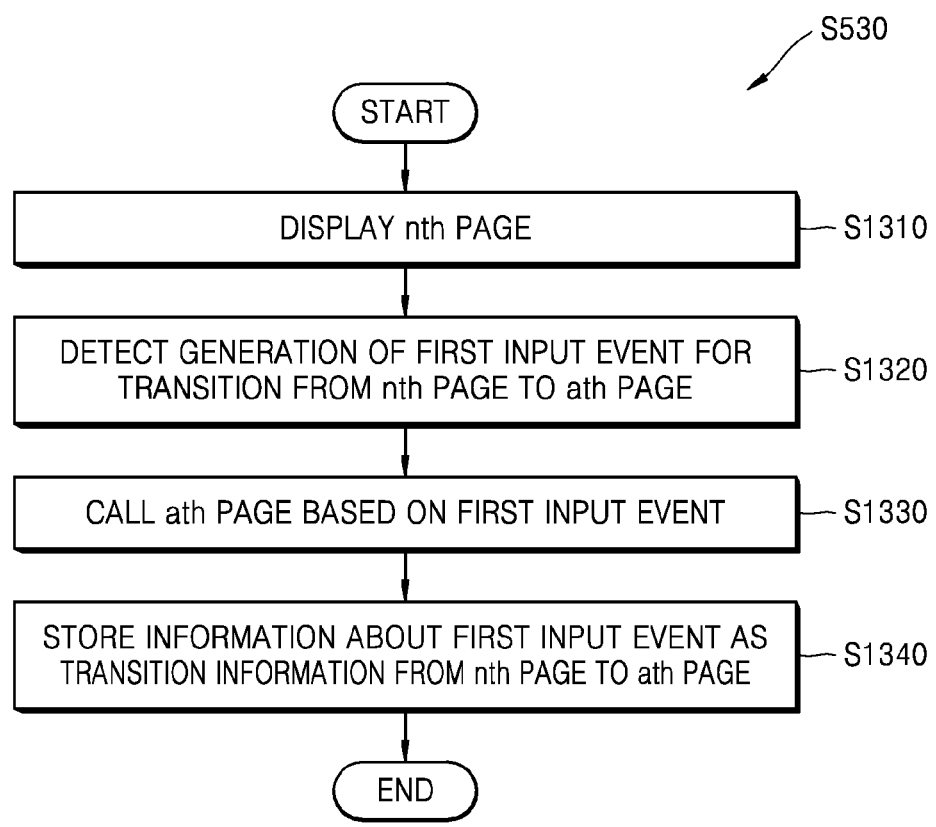
FIG. 13 is a flowchart illustrating a method for generating transition information between screen pages of an application by the device according to an exemplary embodiment.

FIG. 13 is a flowchart illustrating a method for generating transition information between screen pages of an application by the device, according to an exemplary embodiment.

Referring to FIG. 13, in operation S1310, the device 100 may display the nth page of the application. In this case, the nth page may be one of the screen pages constituting the application.

In operation S1320, the device 100 may detect the generation of a first input event for transition from the nth page to the ath page. In this case, the ath page may be one of the screen pages constituting the application, and may be different from the nth page.

In operation S1330, the device 100 may call the ath page based on the first input event. Then, the device 100 may display the ath page through the display.

In operation S1340, the device 100 may store information about the first input event as transition information from the nth page to the ath page. For example, when the ath page is called based on an event for touching the first button included in the nth page, the device 100 may store the touch to the first button as the transition information from the nth page to the ath page.

According to an exemplary embodiment, the device 100 may acquire the transition information between all the screen pages constituting the application by repeating operations S1310 to S1340. An exemplary embodiment for acquiring the transition information between the screen pages by the device 100 will be described in more detail with reference to FIGS. 14A and 14B.

Figure 14A:
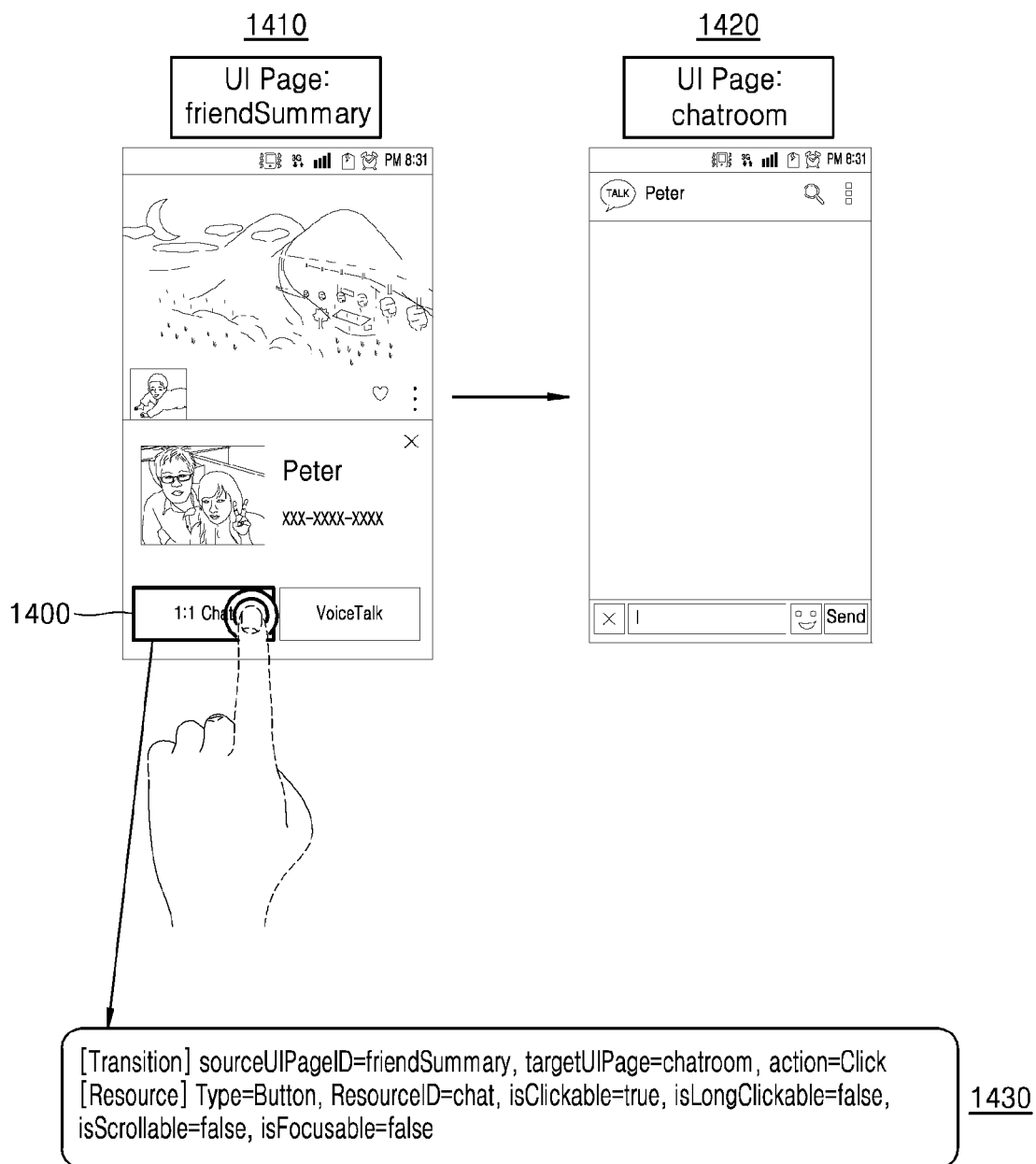

FIGS. 14A and 14B are diagrams illustrating an example of transition information between screen pages, according to an exemplary embodiment.

Referring to FIG. 14A, in order to chat with a friend, the user may execute a chat application in the device 100 and call and display a first page (e.g., FriendSummary) 1410 including summary information about the friend. Then, the user may click a 1:1 Chat button 1400 included in the first page 1410. The device 100 may display a second page (e.g., ChatRoom) 1420 in response to the user's input for clicking the 1:1 Chat button 1400.

In this case, the device 100 may store input event information for clicking the 1:1 Chat button 1400 of the first page 1410 as transition information from the first page (e.g., FriendSummary) 1410 to the second page (e.g., ChatRoom) 1420. For example, the device 100 may generate the transition information from the first page (e.g., FriendSummary) 1410 to the second page (e.g., ChatRoom) 1420 as '[Transition] sourceUIPageID=friendSummary, targetUIPage=chatroom, action=Click/[Resource]Type=Button, ResourceID=chat, isClickable=true' (1430).

Referring to FIG. 14B, the device 100 may generate the transition information from the first page (e.g., FriendSummary) 1410 to the second page (e.g., ChatRoom) 1420 as an XML type 1440; however, the exemplary embodiments are not limited thereto.

FIG. 15 is a diagram illustrating an example of XML-type screen component information, according to an exemplary embodiment.

Referring to FIG. 15, the device 100 may generate screen component information (UI description) 1500 of the application based on the information about the UI elements (UI objects) of each page analyzed in FIGS. 7A to 7C. In this case, the device 100 may generate the screen component information (UI description) 1500 of the application as an XML type.

The XML-type screen component information (UI description) 1500 may include the version of the screen component information (e.g., xml version="1.0"), the name of the application (e.g., OOO Talk), the unique ID of the application (e.g., PackageName=com.XXXXX.talk) and may also include the unique ID of each page provided by the application (e.g., <UIPage ID="uniqueID1">, <UIPage ID="uniqueID2">).

Also, the XML-type screen component information (UI description) 1500 may include information about the UI elements (UI objects) included in each page (e.g., Resource ID, Type, and Trigger Information). For example, the XML-type screen component information 1500 may include information of the UI elements included in the first page (uniqueID1) (e.g., <Control resourceID="friendName" type="Textview" isClickable=false/>, <Control resourceID="chat" type="Button" isClickable=true/>) and information of the UI elements included in the second page (uniqueID2) (e.g., <Control resourceID="voicetalk" type="button" isClickable=true/>, <Control resourceID="call" type="Button" isClickable=true . . . />)

According to an exemplary embodiment, the XML-type screen component information 1500 may also include transition information between the pages (e.g., State Machine). For example, the XML-type screen component information 1500 may include information indicating that a click event on a Chat button has to be generated to call the second page (uniqueID2) in the first page (uniqueID1) (e.g., transition action="Click" source="uniqueID1" target="uniqueID2" resourceID="chat").

According to an exemplary embodiment, the XML-type screen component information 1500 may also include function information (e.g., Feature Manager). For example, the XML-type screen component information 1500 may include information indicating that the second page (uniqueID2) provides a VoiceTalk function (e.g., <app Feature name="VoiceTalk" UIPage="uniqueID2" resourceID="voicetalk" action="Click"/>) and information indicating that the third page (uniqueID3) provides a message transmission function (e.g., <app Feature name="SendMessage" UIPage="uniqueID3" resourceID="send" action="Click"/>).

According to an exemplary embodiment, the screen component information 1500 may include at least one description. Herein, the description may represent all or some of the screen component information 1500 corresponding to the application, and may include, for example, all or some of the XML texts corresponding to the screen component information. Hereinafter, for convenience of description, some of the screen component information 1500 may be represented as a first description, a second description, and a third description.

Although FIG. 15 illustrates an exemplary case in which the screen component information of the application is generated as an XML type, the screen component information of the application may also be generated as other types in addition to the XML type. For example, the screen component information of the application may be generated as a JavaScript Object Notation (JSON) type or as a database type. Also, as illustrated in FIGS. 16A to 16C, the screen component information of the application may be generated as a table type.

FIGS. 16A to 16C are diagrams illustrating an example of screen component information of an application, according to an exemplary embodiment.

As illustrated in FIGS. 16A to 16C, according to an exemplary embodiment, screen component information 1600 of the application may include information of the UI elements (UI objects) included in each page provided by the application. For example, the screen component information 1600 of the application may include page identification information 1610, UI element (UI object) information 1620 (e.g., Controls), page transition information (i.e., transition information between pages) 1630, and function information 1640 (e.g., Features). In this case the UI element (UI object) information 1620 may include UI element (UI object) type information and resource ID information. The UI element (UI object) types may include, but are not limited to, TextView, ImageView, TabHost, TabWidget, ViewPager, FrameLayout, and EditText.

For example, the chat application may provide a first page (FriendListTab), a second page (ChatListTab), a third page (SearchFriendTab), a fourth page (MoreTab), a fifth page (FriendSummary), and a sixth page (ChatRoom). Based on the function information 1640 in the screen component information 1600, the device 100 may detect that the first page (FriendListTab) may provide a friend information identification function, the fifth page (FriendSummary) may provide a chat window open function, a phone call function, and a VoiceTalk function, and the sixth page (ChatRoom) may provide a message transmission function and a picture transmission function.

As for the UI element (UI object) information 1620, the first page (FriendListTab) may include a first UI object (type="TextView" resourceID="global_header_title_text"), a second UI object (type="TabHost" resourceID="tabhost"), a third UI object (type="TabWidget" resourceID="tabs"), a fourth UI object (type="TextView" resourceID="badge"), and a fifth UI object (type="ViewPager" resourceID="viewpager"), etc.

According to an exemplary embodiment, the device 100 may identify the current page based on the resource ID information and the type information of the UI element (UI object) included in the screen component information (UI description) of the application. Also, the device 100 may verify an intermediate page and update the intermediate page based on the resource ID information and the type information of the UI element (UI object) included in the screen component information (UI description) of the application. In this case, the intermediate page may be defined as an intermediate target page for transferring to a final target page. An operation of verifying the intermediate page by the device 100 will be described below in detail with reference to FIG. 23.

Based on the page transition information 1630, the device 100 may detect that a 'Click' event may be used to transfer from the first page (FriendListTab) to the second page (ChatListTab), transfer from the first page (FriendListTab) to the third page (SearchFriendTab), transfer from the first page (FriendListTab) to the fourth page (MoreTab), or transfer from the first page (FriendListTab) to the fifth page (FriendSummary). Also, the device 100 may detect that a key event for selecting 'BackKey' may be used to transfer from the first page (FriendListTab) to the home screen.

According to an exemplary embodiment, a resource filter included in the page transition information 1630 may be used to search for resources (e.g., UI elements). The resource filter will be described in detail with reference to FIG. 17.

Figure 17:
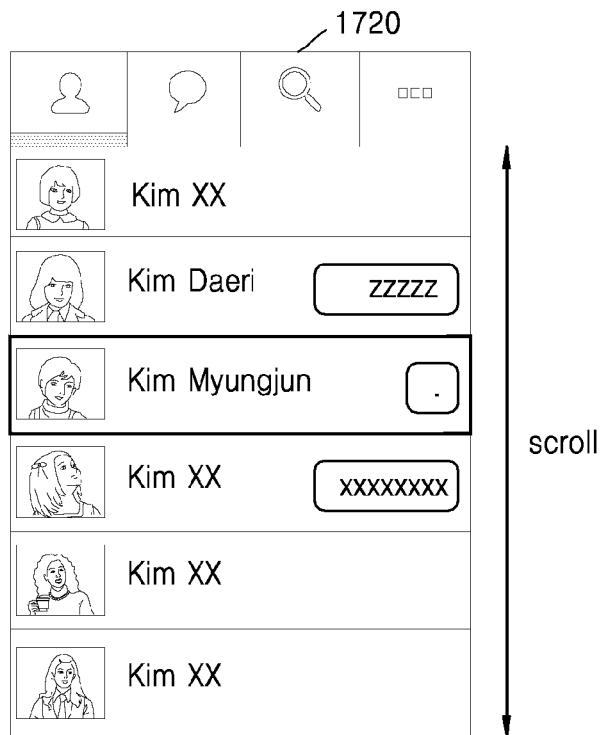
FIG. 17 is a diagram illustrating a resource filter included in screen component information, according to an exemplary embodiment.

FIG. 17 is a diagram illustrating a resource filter included in screen component information. FIG. 17 illustrates an exemplary case in which the application is a chat application.

Referring to FIG. 17, according to an exemplary embodiment, screen component information (UI description) of the chat application may include a resource filter 1710 for searching for a friend name in a first page (FriendListTab) 1720 including a friend list. Since the screen component information of the chat application does not include a unique resource ID for each friend name included in the friend list, the resource filter 1710 may be used to search for the friend name.

According to an exemplary embodiment, the resource filter 1710 may be an XML type, and the resource filter 1710 may include a filter type (e.g., filterClassType="TextView"), a filter resource ID, and information indicating that filtering is performed according to arguments input by the user (e.g., FilterByUserArgument).

By using the resource filter 1710, the device 100 may search for a user-desired friend name (e.g., 'Kim Myungjun') by scrolling the friend list included in the first page (FriendListTab) 1720.

Figure 18:
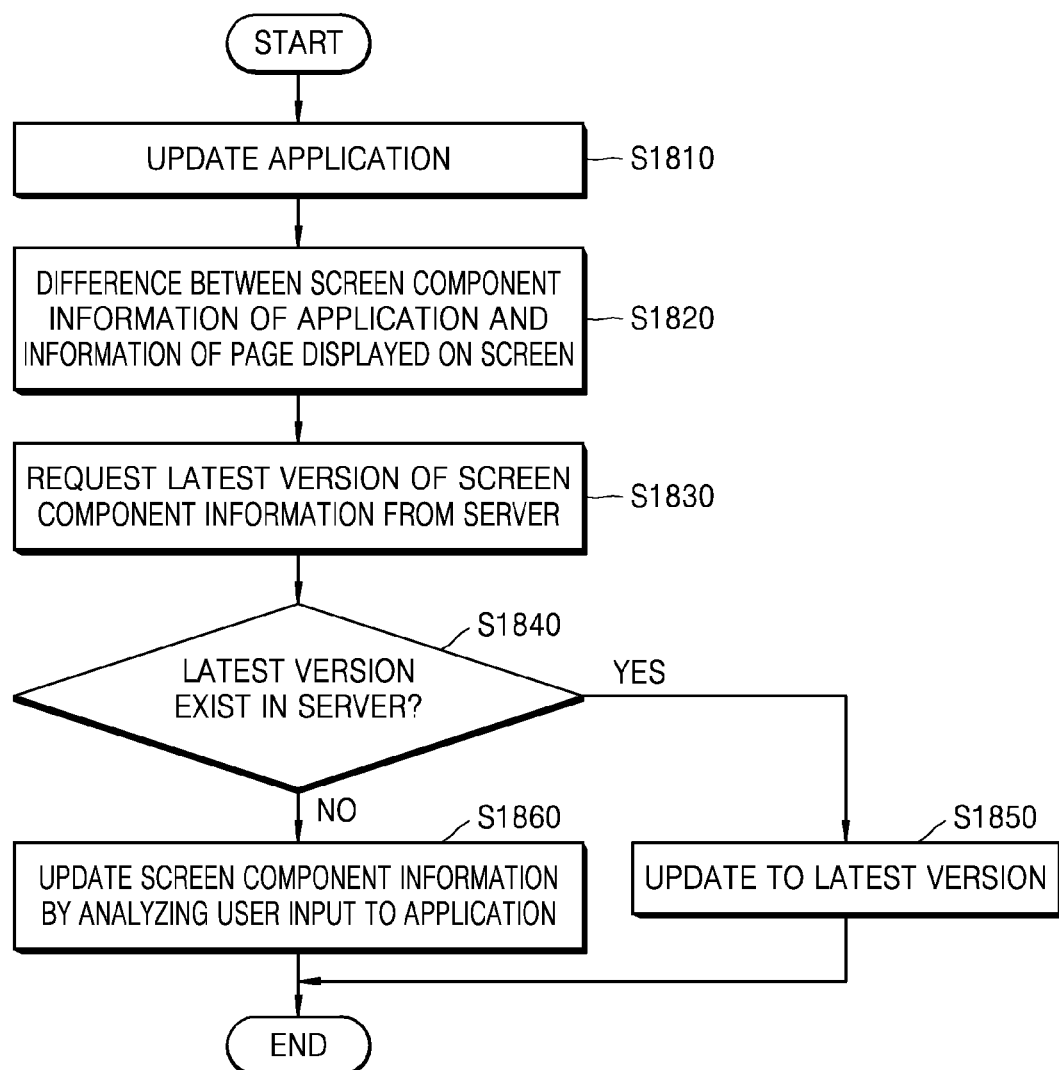
FIG. 18 is a flowchart illustrating a method for updating screen component information of an application by the device, according to an exemplary embodiment.

FIG. 18 is a flowchart illustrating a method of updating screen component information of an application in the device, according to an exemplary embodiment.

Referring to FIG. 18, in operation S1810, the device 100 may update an installed application. For example, the device 100 may receive update information of the application from the server 200 and update the application based on the update information. In this case, the screen component information of the application may also be updated.

In operations S1820 and S1830, when the information of page displayed on the screen of the device 100 is different from the screen component information of the application, the device 100 may request the latest version of the screen component information from the server 200.

For example, while transmitting the version information of the updated application and the version information of the prestored screen component information (UI description) to the server 200, the device 100 may request that the server 200 update the prestored screen component information (UI description) to the screen component information (UI description) of the latest version.

According to an exemplary embodiment, the server 200 may identify the version information about the prestored screen component information (UI description) of the application and transmit the screen component information (UI description) of the latest version to the device 100 when the screen component information (UI description) of the latest version exists.

According to another exemplary embodiment, in order to improve speed of the processing and reduce power consumption, instead of transmitting the screen component information (UI description) of the latest version, the server 200 may transmit the difference information between the prestored screen component information (UI description) and the screen component information (UI description) of the latest version (e.g., information about an updated portion of the screen component information (UI description) of the latest version in comparison with the prestored screen component information to the device 100.

In operations S1840 and S1850, when the screen component information (UI description) of the latest version exists in the server 200, the device 100 may update the prestored screen component information (UI description) to the screen component information (UI description) of the latest version received from the server 200.

In operations S1840 and S1860, when the screen component information (UI description) of the latest version does not exist in the server 200, the device 100 may update the screen component information (UI description) by analyzing the user input to the application.

For example, when the displayed first page further includes the fifth UI object in comparison with the previous first page, the device 100 may perform analysis on the fifth UI object (e.g., analysis of input events, analysis of functions, and analysis of pages connected to the fifth UI object). Then, the device 100 may update the screen component information (UI description) of the application by adding the analysis information related to the fifth UI object to the screen component information (UI description) of the application.

FIGS. 19A and 19B are diagrams illustrating screen component information of applications stored in the device.

Referring to FIG. 19A, the device 100 may manage a list 1900 of screen component information corresponding to each of applications installed in the device 100.

The screen component information list 1900 may include application unique IDs (e.g., PackageName) 1910, application names 1920, application versions 1930, screen component information versions 1940, and usage information 1950. In this example, the usage information may include, but is not limited to, at least one of application usage information, screen page usage information, and function usage information.

Referring to FIG. 19B, the device 100 may manage the list 1900 of screen component information corresponding to each of the applications as an XML type.

Figure 20:
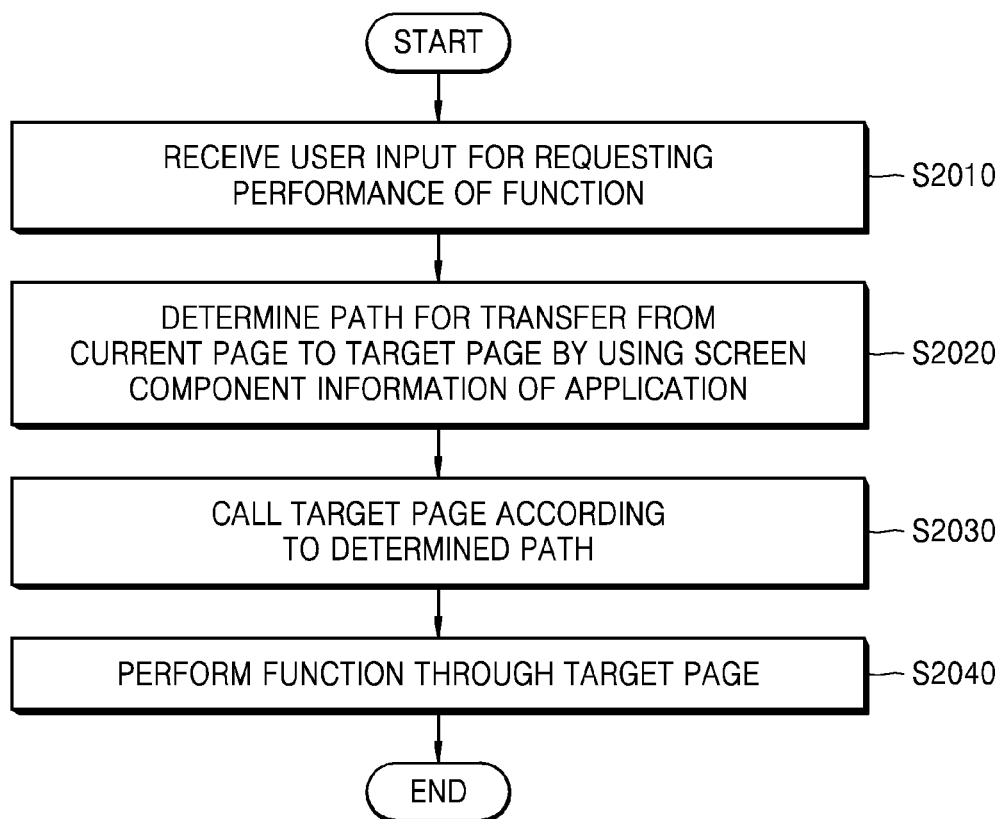
FIG. 20 is a flowchart illustrating a method for performing a function in the device, according to an exemplary embodiment.

FIG. 20 is a flowchart illustrating a method for performing a function by the device, according to an exemplary embodiment.

Referring to FIG. 20, in operation S2010, the device 100 may receive a user input for requesting performance of at least one function. According to an exemplary embodiment, the at least one function may be provided by a predetermined application. For example, the at least one function may include, but is not limited to, at least one of a message transmission/reception function, an alarm function, a phone call function, a content upload function, an image capture function, a sound recording function, and an information search function.

According to an exemplary embodiment, various user inputs may be used to request performance of at least one function. For example, the user input for requesting performance of at least one function may include, but is not limited to, at least one of a voice input, a gesture input (e.g., a touch input and an air gesture input), a motion input, a bending input, a key input, an eye input, and/or a multiple/combination input.

According to an exemplary embodiment, the device 100 may receive a user input for requesting performance of a function or may receive a user input for requesting performance of functions.

In operation S2020, by using the screen component information (UI description) of the application, the device 100 may determine a path for transfer from a current page to a page for providing a function requested by a user input (hereinafter referred to as a 'target page' for convenience of description).

According to an exemplary embodiment, the current page may refer to a page that is displayed on the screen at the time when the user input for requesting performance of at least one function is received. For example, the current page may include a home screen or a predetermined page provided by the application, and the home screen may include a screen of a launcher application in an Android OS (hereinafter referred to as 'launcher screen').

The target page may refer to a page of the application that provides at least one function requested by the user input.

According to an exemplary embodiment, the device 100 may determine the page providing at least one function requested by the user input, as the target page. For example, the device 100 may select the application providing the at least one function. Then, the device 100 may determine the first page for performing the at least one function among the pages provided by the selected application, as the target page. According to an exemplary embodiment, when the user input for requesting performance of at least one function is a voice input, the device 100 may determine the target page providing the at least one function by analyzing the voice data received through the microphone. For example, the device 100 may convert the received voice data into text data and extract the function information and the identification information of the application from the text data. In this case, the device 100 may detect the target page by using the function information and the identification information of the application.

According to an exemplary embodiment, when the user input for requesting performance of at least one function is a keyboard-based text input, the device 100 may extract the function information and the identification information of the application by using the received text data. In this case, the device 100 may detect the target page by using the function information and the identification information of the application.

According to an exemplary embodiment, when the user input includes at least one of a gesture input (e.g., a touch input and an air gesture input), an eye input, and a motion input, the device 100 may determine the page mapped to the user input as the target page. For example, the device 100 may match a touch input of a predetermined pattern to a page providing a predetermined function and store the matching information in memory. Thereafter, when the touch input of a predetermined pattern is received, the device 100 may extract the page information matched to the touch input of a predetermined pattern from the matching information and determine the page matched to the touch input of a predetermined pattern as the target page.

According to an exemplary embodiment, the device 100 may detect the target page by using the UI description corresponding to at least one application. For example, the device 100 may compare the function information included in the UI description and the function information requested by the user input. In this case, the device 100 may determine the page including the function information requested by the user input among the pages defined in the screen component information (UI description) of the application, as the target page.

According to an exemplary embodiment, the device 100 may identify the current page displayed on the screen by using the screen component information (UI description) of at least one application. For example, the device 100 may compare the information about the UI elements (UI objects) included in the current page with the information about the UI elements (UI objects) defined in the screen component information (UI description) of at least one application. In this case, the device 100 may extract the page, which includes the UI elements (UI objects) that are most similar to the UI elements (UI objects) included in the current page, from among the pages defined in the screen component information (UI description).

For example, when the current page includes the first object, the second object, the third object, and the fourth object and the first page among the pages provided by the messenger application also includes the first object, the second object, the third object, and the fourth object, the device 100 may identify that the current page is the first page provided by the messenger application.

According to an exemplary embodiment, the information about the UI elements (UI objects) included in the current page may be acquired from the information that is exchanged between the application and the platform for driving the application.

According to an exemplary embodiment, when the current page is the home screen (or the launcher screen), the device 100 may detect that the current page is the home screen even without using the screen component information (UI description) of the application.

According to an exemplary embodiment, the device 100 may determine one or more paths for transfer from the current page to the target page. Then, the device 100 may select the shortest path among the determined paths. For example, the device 100 may determine the paths for transfer from the current page to the target page based on the page transition information (i.e., the transition information between the pages) defined in the screen component information (UI description) of the application.

In the specification, the page transition information may represent information about an interface for transition (or transfer) between the pages provided by the application. For example, the page transition information may include identification information of other pages that may transition from the page and trigger information that may be used for transition from the page to another page. Herein, the trigger information may represent information about an input event (e.g., click, tap, or key selection) for generating the transition between pages. For example, transition information of 'Page A' may include information defining 'Page A→Page B: Transfer to Page B through OO Button Click Event of Page A'.

Also, according to an exemplary embodiment, the device 100 may determine the path for transfer from the current page through the first, second, and third pages to the fourth page that is the target page. In this example, the first, second, and third pages may be the intermediate target pages, and the fourth page may be the final target page. Hereinafter, for convenience of description, the intermediate target pages will be referred to as 'intermediate pages', and the final target page will be referred to as 'target page'.

In operation S2030, the device 100 may call the target page according to the determined path. Calling the page may represent fetching the page by using link information about the page. According to an exemplary embodiment, the device 100 may call the target page by generating an input event for displaying the target page. In this case, the device 100 may display the target page.

According to an exemplary embodiment, the device 100 may call at least one intermediate page and the target page sequentially according to the determined path. The intermediate page may represent at least one intermediate page on the path for transfer from the current page to the target page.

For example, when the determined path is the path for transfer from the current page through the first and second intermediate pages to the target page, the device 100 may sequentially call the first intermediate page, the second intermediate page, and the target page by generating a first input event for calling the first intermediate page in the current page, generating a second input event for calling the second intermediate page in the first intermediate page, and generating a third input event for calling the target page in the second intermediate page.

According to an exemplary embodiment, the device 100 may display all of the first intermediate page, the second intermediate page, and the target page sequentially on the screen. Also, according to another exemplary embodiment, the device 100 may display the first intermediate page and the second intermediate page on a virtual display and display only the target page on an actual screen. An operation of displaying the intermediate pages on the virtual display by the device 100 will be described below in detail with reference to FIGS. 27A to 27C.

In operation S2040, the device 100 may perform the at least one function through the target page.

According to an exemplary embodiment, by using the screen component information (UI description) of the application, the device 100 may generate an input event for performing a user-requested function. For example, when the user-requested function is a message transmission function, the device 100 may perform the message transmission function by generating an input event for touching a 'Send' button included in the target page.

FIG. 21 is a diagram illustrating an example of determining a path for transfer from a current page to a target page in the device. FIG. 21 illustrates an exemplary case in which the application is a chat application.

Referring to FIG. 21, based on the page transition information 1630 included in the screen component information (UI description) of the application, there may be various paths 2110 connecting the pages.

According to an exemplary embodiment, when the current page is the fifth page (FriendSummary) and the target page is the fourth page (MoreTab), the device 100 may determine paths for transfer from the current page to the target page by using the page transition information 1630 defined in the screen component information (UI description). For example, the device 100 may determine the first path ① for transfer from the fifth page (FriendSummary) through the first page (FriendListTab) to the fourth page (MoreTab) and the second path ② for transfer from the fifth page (FriendSummary) through the sixth page (ChatRoom) and the second page (ChatListTab) to the fourth page (MoreTab), and may also determine various other paths.

The device 100 may determine the shortest path based on the comparison result between the first path ① and the second path ②. For example, since the first path ① calls two pages (e.g., the first page and the fourth page) and the second path ② calls three pages (e.g., the sixth page, the second page, and the fourth page), the device 100 may determine the first path 1 as the shortest path.

According to the first path ①, the device 100 may generate an event for selecting a Back key (e.g., action="KeyEvent", Key="Back Key") as an input event for calling the first page (FriendListTab) in the fifth page (FriendSummary) displayed on the screen (see FIG. 16C). Then, the device 100 may generate an event for clicking a MoreTab icon (e.g., action="Click" resource ID="name") as an input event for calling the fourth page (MoreTab) in the first page (FriendListTab) called according to the first path ① (see FIG. 16A).

FIGS. 22A to 22E are diagrams illustrating an example of performing a function corresponding to a voice input of the user by the device by using screen component information (UI description) of an application. FIGS. 22A to 22E illustrate an exemplary case in which the application is a chat application.

Referring to FIG. 22A, the device 100 may receive a voice input for requesting performance of at least one function. For example, the device 100 may receive voice data 2200 'Send Kim Myungjun Message "Where are you?"'.

According to an exemplary embodiment, when receiving the voice data 2200, the device 100 may generate result data 2200' by analyzing the voice data 2200 based on natural language processing. For example, the device 100 may convert the received voice data 2200 into text data and analyze the text data based on natural language processing. For example, the device 100 may analyze the received voice data 2200 (e.g., 'Send Kim Myungjun Message "Where are you?"') to generate the result data 2200' including command data 'Execute Chat Application→Search for Kim Myungjun from Friend List→Execute 1:1 Chat→Input and Send Message "Where are you?"'. The device 100 may distinguish between functions (e.g., Execute Chat Application, Search for Friend, Input Message, and Send) and variables (also referred to as 'arguments') (e.g., Who: 'Kim Myungjun', and Message Contents: 'Where are you?') in the command data. Then, the device 100 may extract the screen page or the UI element corresponding to each function. When variables are required in the process of generating an input event on the extracted UI element, the device 100 may insert the variables.

According to an exemplary embodiment, while transmitting the voice data 2200 to the server 200, the device 100 may request the server 200 to analyze the voice data 2200. For example, when receiving the voice data 2200 'Send Kim Myungjun Message "Where are you?"'), the device 100 may transmit the received voice data 2200 to the server 200 and receive the result data 2200' (e.g., Execute Chat Application, Search for Kim Myungjun from Friend List, Execute 1:1 Chat, and Input and Send Message "Where are you?"), which is obtained by analyzing the voice data 2200, from the server 200. An operation of the device 100 for requesting the server 200 to analyze the voice data 2200 will be described below in detail with reference to FIGS. 24A and 24B.

According to an exemplary embodiment, the voice data 2200 may be analyzed based on natural language processing. The natural language processing may refer to artificial intelligence technology for understanding, generating, or analyzing human languages by using computer systems. For example, natural language understanding may refer to an operation of converting real-life languages by morphological analysis, semantic analysis, and dialog analysis to be processed by computer systems, and natural language generation may refer to an operation of generating results, which are processed by computer systems, into texts, voices, and graphics for human convenience.

When the analysis of the voice data 2200 is completed, the device 100 may determine the chat room page of the chat application as the target page in order to perform a message transmission function. Also, the device 100 may identify the current page as the home screen.

The device 100 may determine the path for transfer from the home screen to the chat room page by using the screen component information (UI description) of the chat application. For example, the device 100 may execute the chat application in the home screen and determine the path for transfer to the chat room page (e.g., ChatRoom) through the first page (e.g., friend list page (FriendListTab)) and the second page (e.g., friend information summary page (FriendSummary)) of the chat application, as the shortest path.

The device 100 may display the first page, the second page, and the target page sequentially according to the determined path by using the screen component information of the chat application.

For example, referring to FIG. 22B, according to an exemplary embodiment, the device 100 may execute the chat application by generating an event for clicking an icon 2202 of the chat application on a home screen (launcher screen) 2210 by using a first description 2201 defining global commands (e.g., Execute) that may be applied to all applications. In this case, the device 100 may display a first page 2230 (e.g., friend list page (FriendListTab)) thereon after a loading page 2220. Also, the device 100 may search for a friend name 'Kim Myungjun' 2203 in the first page 2230 (e.g., friend list page (FriendListTab)) by using a resource filter (<filter>) defined in the first description 2201.

Referring to FIG. 22C, according to an exemplary embodiment, the device 100 may call a second page 2240 (e.g., friend information summary page (FriendSummary)) by using a second description 2204 including transition information from the first page 2230 to the second page 2240. For example, the transition information (<stateMachine>) of the second description 2204 may include information defining that an event for clicking a friend name may be used to transition from the first page 2230 (FriendListTab) to the second page 2240 (FriendSummary) (e.g., <transition sourceUIPageID="friendListTab" targetUIPageID="friendSummary" action="Click">). In this case, the device 100 may call the second page 2240 by generating an event for clicking the friend name 'Kim Myungjun' 2203.

The second description 2204 may include function information (e.g., <appFeature name="Chat Window Open">) of a 1:1 Chat button 2205 included in the second page 2240.

Figure 22D:
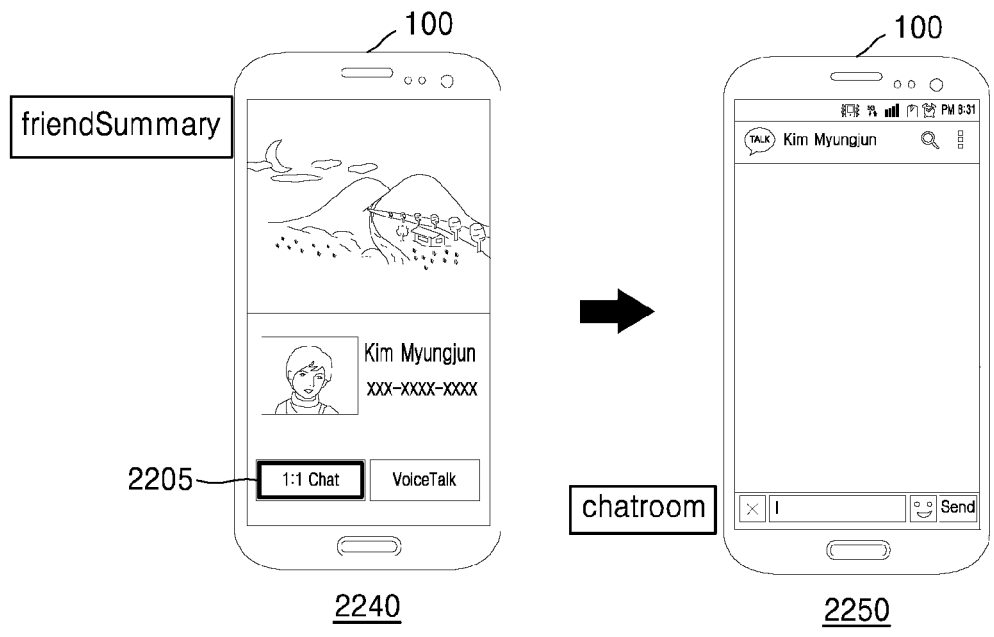

Referring to FIG. 22D, the device 100 may call a third page 2250 (e.g., ChatRoom) by using a third description 2206 including transition information from the second page 2240 to the third page 2250 that is the target page. For example, the transition information (<stateMachine>) of the third description 2206 may include information defining that an event for clicking the 1:1 Chat button 2205 may be used to transition from the second page 2240 to the third page 2250 (e.g., <transition sourceUIPageID="friendSummary" targetUIPageID="chatroom" action="Click"). In this case, the device 100 may call the third page 2250 (e.g., ChatRoom), which is the target page, by generating an event for clicking the 1:1 Chat button 2205 in the second page 2240 (FriendSummary).

Figure 22E:
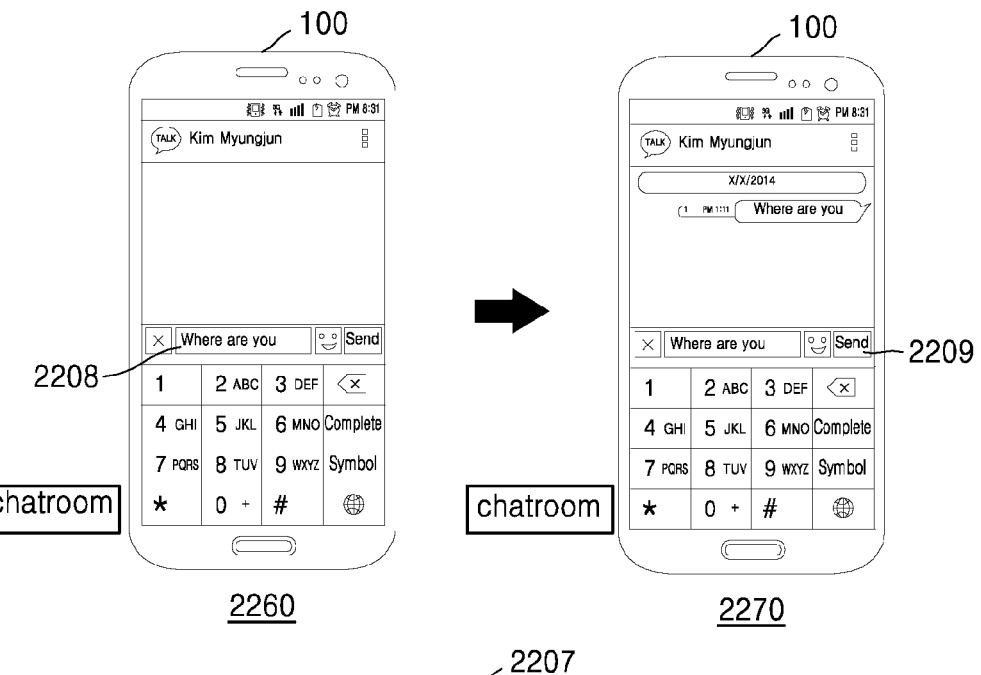

Referring to FIG. 22E, the device 100 may perform a message transmission function by using a fourth description 2207 including function information of UI elements constituting the third page 2250. For example, since the fourth description 2207 includes information defining that a message may be transmitted through an event for inputting a text to an Edit window 2208 (e.g., <featureEntrypageID="chatroom" resourceID="message_edit_text" action="InputText" isNeedUserArgument="true"/>) and clicking a Send button 2209 (e.g., <featureEntry pageID="chatroom" resourceID="send" action="Click"/>), the device 100 may generate an event for inputting a message (e.g., Where are you?) to the Edit window 2208 included in the chat room page (e.g., ChatRoom) (2260) and clicking the Send button 2209 (2270).

According to an exemplary embodiment, since the device 100 automatically generates a realistic user input event in each page from the current page to the target page by using the screen component information (UI description) of the application, the device 100 may provide the user with a realistic experience of directly operating the device 100 by hand.

Figure 23:
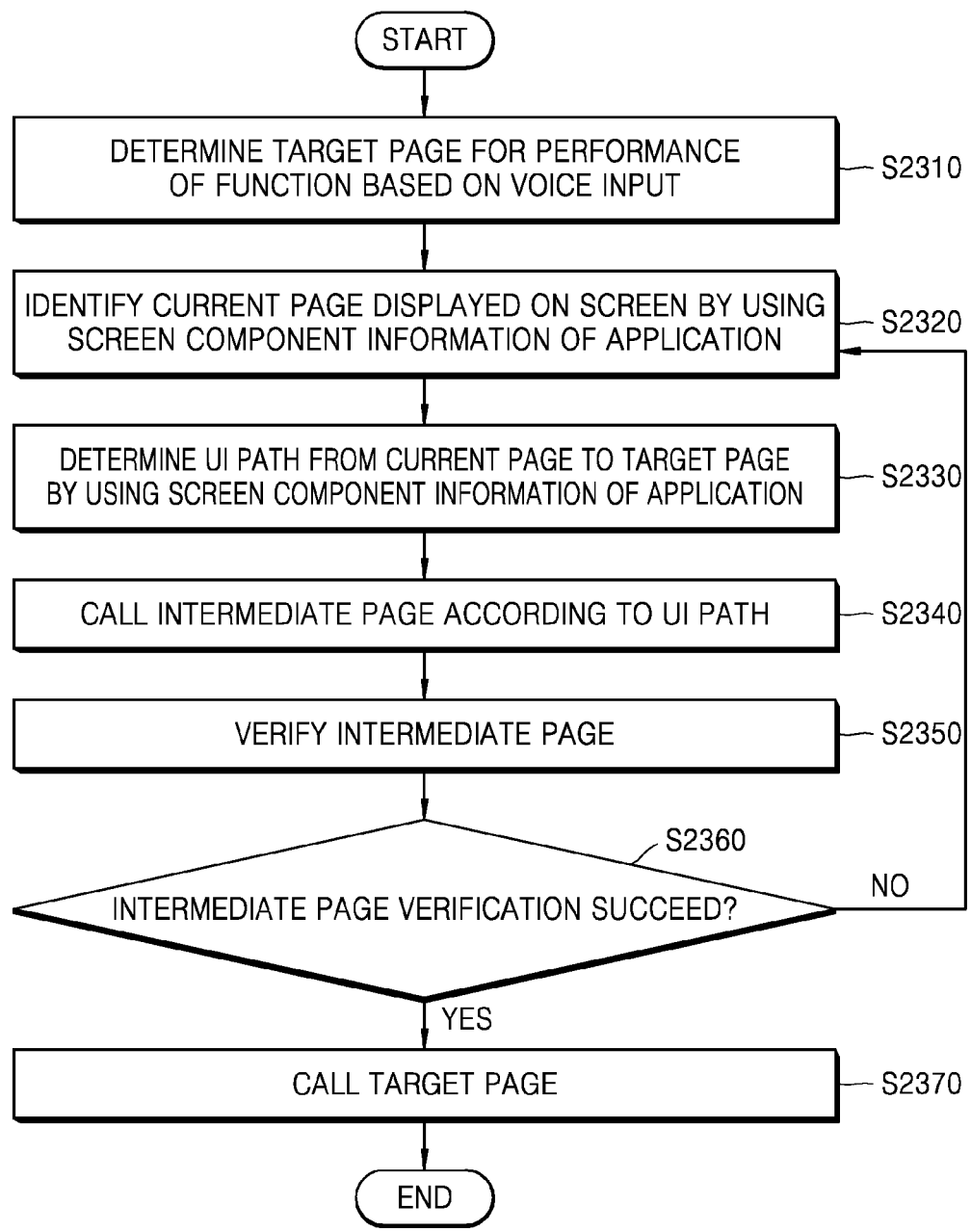
FIG. 23 is a flowchart illustrating a method for verifying an intermediate page by the device according to an exemplary embodiment.

FIG. 23 is a flowchart illustrating a method for verifying an intermediate page by the device, according to an exemplary embodiment.

Referring to FIG. 23, in operation S2310, the device 100 may determine the target page for performance of a function based on a voice input. For example, when receiving voice data for requesting performance of a predetermined function, the device 100 may analyze the voice data. Also, while transmitting the received voice data to the server 200, the device 100 may request the server 200 to analyze the voice data. An operation of the device 100 for requesting the server 200 to analyze the voice data will be described below in detail with reference to FIGS. 24A and 24B.

According to an exemplary embodiment, when the analysis of the voice data is completed, the device 100 may determine a predetermined page of the application providing a predetermined function as the target page, based on the analysis results.

In operation S2320, the device 100 may identify the current page displayed on the screen by using the screen component information (UI description) of the application.

According to an exemplary embodiment, the device 100 may compare the information about the UI elements (UI objects) included in the current page with the information about the UI elements (UI objects) defined in the screen component information (UI description) of at least one application. Then, the device 100 may extract the page, which includes the UI elements (UI objects) that are most similar to the UI elements (UI objects) included in the current page, from among the pages defined in the screen component information (UI description) of the application. In this case, the current page may be extracted from the screen component information (UI description) of the application.

For example, when the current page includes the first object, the second object, the third object, and the fourth object and the first page among the pages provided by the messenger application also includes the first object, the second object, the third object, and the fourth object, the device 100 may identify that the current page is the first page provided by the messenger application.

According to an exemplary embodiment, the information about the UI elements (UI objects) included in the current page may be acquired from the information that is exchanged between the application and the platform for driving the application.

According to an exemplary embodiment, when the current page is the home screen (or the launcher screen), the device 100 may detect that the current page is the home screen even without using the screen component information (UI description) of the application.

In operation S2330, the device 100 may determine the UI path from the current page to the target page by using the screen component information (UI description) of the application. The UI path may refer to the path that is determined by automatically generating a user-operated input event in the device 100.

According to an exemplary embodiment, the device 100 may determine at least one intermediate page for transfer from the current page to the target page and identify trigger information for calling the intermediate page. The trigger information may include input event information for calling the intermediate page. For example, the input event for calling the intermediate page may include a tap event, a click event, and a Back key click event.

Since operation S2330 is similar to operation S2020 of FIG. 20, a detailed description will be omitted for conciseness.

In operation S2340, the device 100 may call the intermediate page according to the determined UI path. For example, the device 100 may identify the trigger information for calling the intermediate page. The device 100 may call the intermediate page by generating an input event in the current page based on the trigger information.

In operation S2350, the device 100 may verify the intermediate page.

For example, the device 100 may identify whether the called intermediate page is the intermediate page on the UI path (e.g., the intermediate page defined in the screen component information (UI description)). According to an exemplary embodiment, when the intermediate page is called, the device 100 may verify the called intermediate page by comparing first information about the UI elements (UI objects) included in the called intermediate page (e.g., type, number, and identification information of the UI objects) with second information about the UI elements (UI objects) of the intermediate page included in the screen component information (UI description) (e.g., type, number, and identification information of the UI objects).

When the first information is identical to the second information, the device 100 may determine that the called intermediate page is the intermediate page on the UI path. In this example, the verification of the called intermediate page may succeed.

According to another exemplary embodiment, when the first information is not identical to the second information, the device 100 may determine that the called intermediate page is not the intermediate page on the UI path, and the verification of the called intermediate page may fail.

Therefore, the device 100 may repeat the process for setting the intermediate page, which is called and currently displayed on the screen, as the current page and identifying the current page. When identifying the currently-displayed intermediate page, the device 100 may redetermine the UI path for transfer from the currently-displayed intermediate page to the target page. The device 100 may call the intermediate page and the target page sequentially according to the redetermined UI path.

When the called intermediate page is the intermediate page on the UI path but some components of the called intermediate page are updated, the device 100 may update the information of the UI elements (UI objects) related to the intermediate page in the prestored screen component information (UI description).

According to an exemplary embodiment, the device 100 may transmit an update request for the screen component information (UI description) of the application to the server 200. An exemplary operation of the device 100 for requesting the server 200 to update the screen component information (UI description) of the application has been described with reference to FIG. 18.

In operations S2360 and S2370, when succeeding in verifying the called intermediate page, the device 100 may call the target page. For example, the device 100 may call the target page by generating a predetermined input event in the called intermediate page. The device 100 may perform the requested function in the target page based on the voice input.

An operation of the device 100, according to an exemplary embodiment, for requesting the server 200 to analyze the voice data will be described in detail with reference to FIGS. 24A and 24B.

Figure 24A:
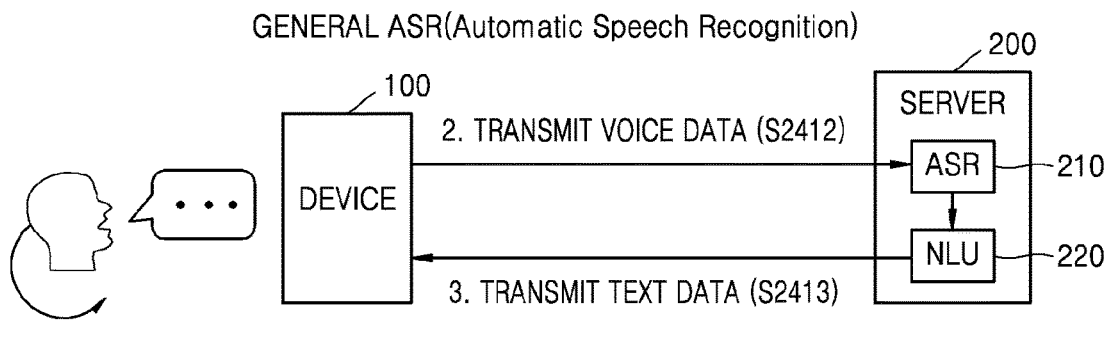
FIGS. 24A and 24B are diagrams illustrating a general automatic speech recognition (ASR) method and a streaming ASR method respectively, according to an exemplary embodiment.
Figure 24B:
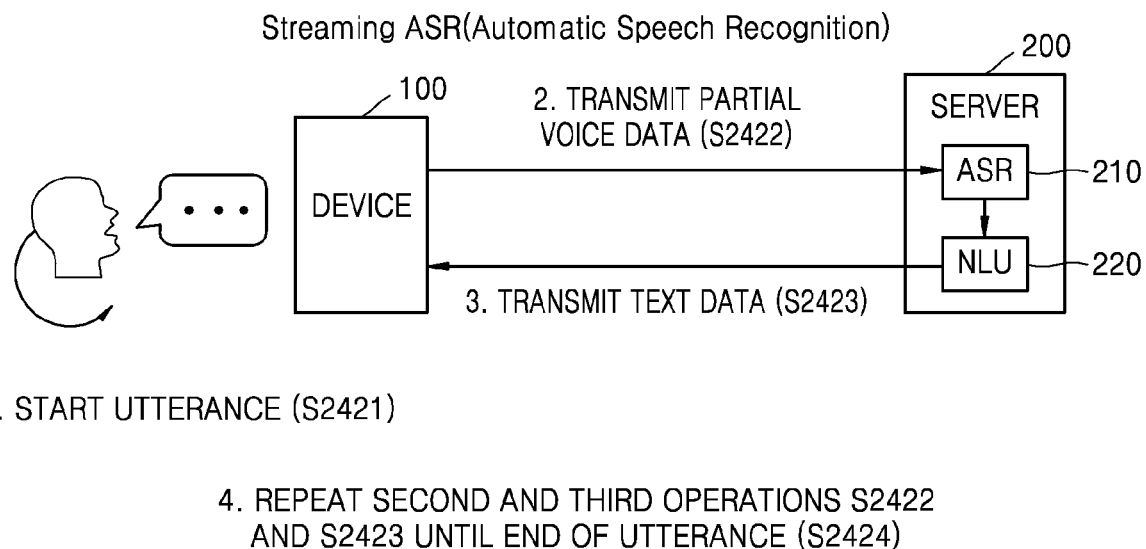

FIG. 24A is a diagram illustrating a general automatic speech recognition (ASR) method, and FIG. 24B is a diagram illustrating a streaming ASR method.

As illustrated in FIG. 24A, the device 100 may detect the start and end of the user's utterance and acquire voice data from the start time to the end time of the user's utterance (S2411). For example, the device 100 may record the user's voice until the end of the user's utterance.

When the user's utterance ends, the device 100 may request the server 200 to analyze the voice data, while transmitting the voice data to the server 200 (S2412).

The server 200 may include an ASR module 210 for converting voice data into text data. By using the ASR module 210, the server 200 may convert the voice data received from the device 100 into text data.

According to an exemplary embodiment, the server 200 may include a natural language understanding (NLU) module 220. By using the NLU module 220, the server 200 may determine or analyze the meanings of sentences or words included in the text data and convert the text data into command data used in the device 100.

The server 200 may transmit the command data or the text data converted from the voice data, to the device 100 (S2413). In this example, the device 100 may receive the command data or the text data converted from the voice data, from the server 200. The device 100 may determine the target page by analyzing the text data or the command data. For example, the device 100 may extract the function information and the identification information of the application from the text data (or the command data). The device 100 may detect the target page, which provides a predetermined function requested by the voice, by using the function information and the identification information of the application.

As illustrated in FIG. 24B, the device 100 may detect the start of the user's utterance and acquire voice data thereof (S2421). The device 100 may request the server 200 to analyze the partial voice data, while transmitting the partial voice data to the server 200 periodically during the user's utterance (S2422).

By using the ASR module 210, the server 200 may convert the partial voice data received from the device 100 into text data. Also, by using the NLU module 220, the server 200 may determine or analyze the meanings of sentences or words included in the text data and convert the text data into command data used in the device 100. According to an exemplary embodiment, the server 200 may skip an operation of determining or analyzing the meanings of sentences or words included in the text data by using the NLU module 220.

The server 200 may transmit the command data or the text data converted from the voice data, to the device 100 (S2423). In this case, the device 100 may receive the command data or the text data corresponding to the partial voice data, from the server 200. The device 100 may determine the intermediate page or the target page by using the text data or the command data. The device 100 may continuously update the utterance contents in the server 200 by repeating operations S2422 and S2423 until the end of the user's utterance (S2424).

According to an exemplary embodiment, the device 100 may first perform some command included in the voice data even before the end of the user's utterance, by continuously analyzing the voice data through the server 200 during the user's utterance.

As an example, a case in which the device 100 receives the voice data '1) Execute Chat Application, 2) Search for Kim Myungjun from Friend List, 3) Execute 1:1 Chat, 4) Input Message 'Where are you?', and 5) Send Message' will be described below.

According to an exemplary embodiment, when receiving the first voice data '1) Execute Chat Application', the device 100 may first transmit the first voice data to the server 200 to analyze the same. Then, while receiving the second voice data '2) Search for Kim Myungjun from Friend List', the device 100 may execute the chat application based on the analysis results of the first voice data. Additionally, after analyzing the first voice data, the device 100 may transmit the second voice data '2) Search for Kim Myungjun from Friend List' to the server 200 to analyze the same. The device 100 may call and display the friend list page according to the second voice data. The friend list page may be called in the process of receiving the third voice data '3) Execute 1:1 Chat'.

According to an exemplary embodiment, by first analyzing the partial voice data during the user's utterance, the device 100 may more quickly provide information about a command that may be input by the user's voice. This will be described with reference to FIG. 25.

Figure 25:
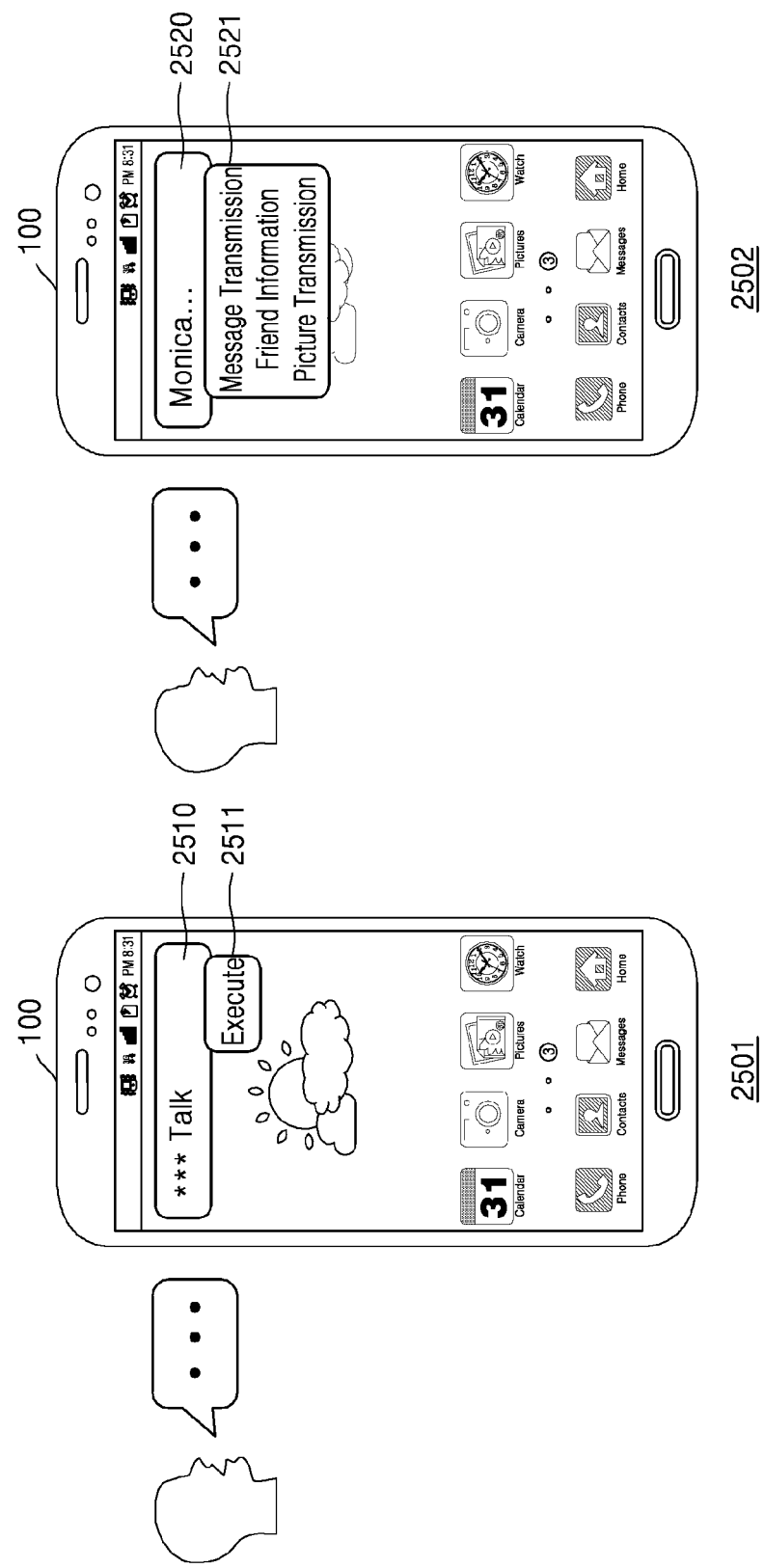
FIG. 25 is a diagram illustrating an example of providing guide information by the device in the process of receiving a voice input of the user, according to an exemplary embodiment.

FIG. 25 is a diagram illustrating an example of providing guide information by the device in the process of receiving a voice input of the user.

Referring to 2501 of FIG. 25, when a voice including a predetermined word is input from the user, the device 100 may provide a command, which is used after the predetermined word and has a high use frequency or a high priority, as guide information.

For example, there may be a high probability that a command 'Execute' will be input after 'Application Name'. In this case, when a voice 2510 including Application Name (e.g., *Talk) is input from the user, the device 100 may provide guide information 2511 including the command 'Execute'. In this case, the user may identify the guide information 2511 and input a voice command 'Execute' to the device 100**.

Referring to 2502 of FIG. 25, when a voice 2520 including Friend Name (e.g., Monica) is input from the user, the device 100 may provide guide information 2521 based on at least one of command use frequency information and priority information. The guide information 2521 may include commands such as 'Message Transmission', 'Friend Information', and 'Picture Transmission' that are frequently used after Friend Name. The user may identify the guide information 2521 and input a voice command 'Message Transmission' to the device 100.

According to an exemplary embodiment, by providing the guide information 2511 and 2521, the device 100 may assist the user if the user forgets the command or has trouble remembering the command.

According to an exemplary embodiment, the commands matched to a predetermined function may be defined or changed by the user. Also, as described with reference to 1950 of FIG. 19A, by managing information about the usage of the application or command, the device 100 may determine the priority of the application or command.

FIGS. 26A to 26D are diagrams illustrating an example of performing a function corresponding to a voice input of the user by the device through applications. FIGS. 26A to 26D illustrate an exemplary case in which the applications are a camera application and a chat application.

As illustrated in FIG. 26A, the device 100 may receive a voice input for requesting performance of at least one function. For example, the device 100 may receive voice data 2600 'Photograph and Send Picture to Kim Myungjun by Talk'.

When receiving the voice data 2600, the device 100 may analyze the voice data 2600. For example, the device 100 may convert the received voice data 2600 into text data and analyze the text data based on natural language processing technology. For example, by analyzing the received voice data 2600 (e.g., 'Photograph and Send Picture to Kim Myungjun by Talk'), the device 100 may generate command data 2600' such as 'Execute Camera Application→Photograph→Execute Chat Application→Send Picture to Kim Myungjun'. The device 100 may distinguish between functions (e.g., Execute Camera Application, Photograph, Execute Chat Application, and Send Picture) and variables (also referred to as 'arguments') (e.g., Who: 'Kim Myungjun', and Message Contents: Picture) in the command data 2600'. Then, the device 100 may extract the screen page or the UI element corresponding to each function. When variables are required in the process of generating an input event on the extracted UI element, the device 100 may insert the variables.

According to an exemplary embodiment, while transmitting the voice data 2600 to the server 200, the device 100 may request the server 200 to analyze the voice data 2600. In this case, the server 200 may analyze the voice data 2600 based on natural language processing technology. The server 200 may transmit analysis results 2600' of the voice data 2600 to the device 100.

When the analysis of the voice data is completed, the device 100 may read the screen component information (UI description) of the camera application and the screen component information (UI description) of the chat application from the memory in order to sequentially execute the commands included in the command data 2600'. By using the screen component information (UI description) of the camera application, the device 100 may determine a photographing page (MainScreen) including a photographing function as the first target page. Also, by using the screen component information (UI description) of the chat application, the device 100 may determine a media transmission page (MediaSendPage) of the chat application providing a media transmission function as the final target page. Also, the device 100 may identify the current page as the home screen (launcher screen).

By using the screen component information (UI description) of the camera application and the screen component information (UI description) of the chat application, according to an exemplary embodiment, the device 100 may determine the path for transfer from the home screen to the media transmission page (MediaSendPage) after photographing. For example, the device 100 may execute the camera application in the home screen (launcher screen), photograph in the photographing page of the camera application, execute the chat application, and determine the path for transfer to the fourth page (e.g., media transmission page (MediaSendPage)) through the first page (e.g., friend list page (FriendListTab)), the second page (e.g., friend information summary page (FriendSummary)), the third page (e.g., chat room page (ChatRoom)), the fourth page (e.g., media transmission page (MediaSendPage)), the fifth page (e.g., photo album page (PhotoAlbum)), the sixth page (e.g., photo grid view page (PhotoGridView)), and the seventh page (e.g., photo review page (PhotoReviewPage)) of the chat application as the shortest path.

The device 100 may call the photographing page of the camera application, the first page, the second page, the third page, the fourth page, the fifth page, the sixth page, the seventh page, and the target page (the fourth page) sequentially according to the determined path.

Figure 26B:
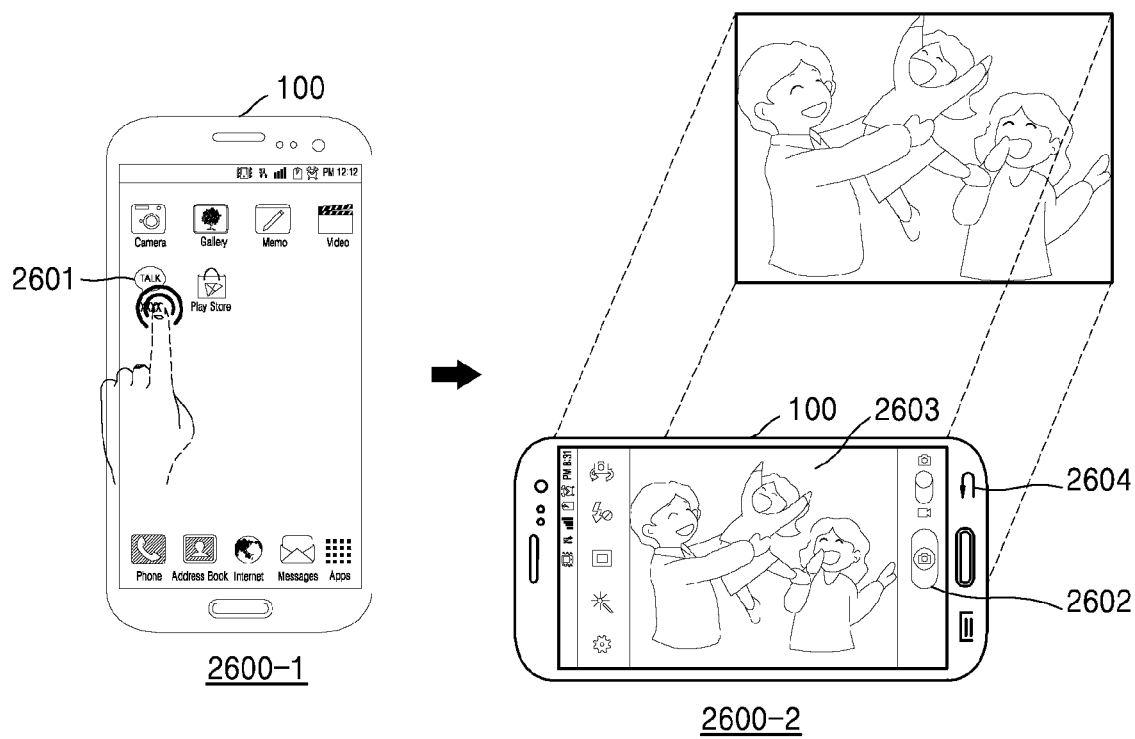

Referring to 2600-1 of FIG. 26B, the device 100 may execute the camera application by generating an event for clicking an icon 2601 of the camera application in the home screen (launcher screen) by using the first description defining a global command (e.g., Execute). Referring to 2600-2 of FIG. 26B, when the camera application is executed, the device 100 may display the photographing page (MainScreen) thereon. In this case, the device 100 may perform photographing by using the second description of the camera application that includes photographing function information. For example, when the function information of the second description (e.g., <appFeature name="Photographing">) defines that an event for clicking a photographing button 2602 may be used to perform photographing, the device 100 may acquire picture content 2603 by generating an event for clicking the photographing button 2602 included in the photographing page (MainScreen). In this case, the device 100 may store the picture content 2603 as the execution result value of the camera application. Then, the device 100 may return to the home screen by generating a key event for touching a Cancel key (e.g., Back key) 2604.

Referring to 2600-3 of FIG. 26C, according to an exemplary embodiment, the device 100 may execute the chat application by generating an event for clicking an icon 2605 of the chat application in the home screen (launcher screen) by using the third description defining a global command (e.g., Execute). Referring to 2600-4 and 2600-5 of FIG. 26C, the device 100 may display the first page (e.g., friend list page (FriendListTab)) thereon after the loading page. In this case, the device 100 may call the second page (FriendSummary) by using the fourth description including the transition information from the first page (FriendListTab) to the second page (e.g., friend information summary page (FriendSummary)).

For example, when the transition information (<stateMachine>) of the fourth description includes information defining that an event for clicking a friend name may be used to transition from the first page (FriendListTab) to the second page (FriendSummary) (e.g., <transition sourceUIPageID="friendListTab" targetUIPageID="friendSummary" action="Click">), the device 100 may call the second page (FriendSummary) by generating an event for searching for a friend name 'Kim Myungjun' and clicking the friend name 'Kim Myungjun' in the first page (FriendListTab).

The fourth description may include function information (e.g., <appFeature name="Chat Window Open">) of a 1:1 Chat button 2607 included in the second page (FriendSummary).

Referring to 2600-6 of FIG. 26C, the device 100 may call the third page (ChatRoom) by using the fifth description including the transition information from the second page (FriendSummary) to the third page (ChatRoom).

For example, when the transition information (<stateMachine>) of the fifth description includes information defining that an event for clicking the 1:1 Chat button 2607 may be used to transition from the second page (FriendSummary) to the third page (ChatRoom) (e.g., <transition sourceUIPageID="friendSummary" targetUIPageID="chatroom" action="Click">), the device 100 may call the third page (ChatRoom) by generating an event for clicking the 1:1 Chat button 2607 in the second page (e.g., friend information summary page (FriendSummary)).

Referring to 2600-7 of FIG. 26C, the device 100 may call the fourth page (MediaSendPage) by using the sixth description including the transition information from the third page (ChatRoom) to the fourth page (MediaSendPage).

For example, when the transition information (<stateMachine>) of the sixth description includes information defining that an event for clicking a media transmission button (e.g., + button) 2608 may be used to transition from the third page (ChatRoom) to the fourth page (MediaSendPage), the device 100 may call the fourth page (MediaSendPage) by generating an event for clicking the media transmission button (e.g., + button) 2608 in the third page (ChatRoom).

Referring to 2600-8 of FIG. 26C, the device 100 may call the fifth page (PhotoAlbum) by using the seventh description including the transition information from the fourth page (MediaSendPage) to the fifth page (PhotoAlbum).

For example, when the transition information (<stateMachine>) of the seventh description includes information defining that an event for clicking a Picture button 2609 may be used to transition from the fourth page (MediaSendPage) to the fifth page (PhotoAlbum), the device 100 may call the fifth page (PhotoAlbum) by generating an event for clicking the Picture button 2609 in the fourth page (MediaSendPage).

Referring to 2600-9 and 2600-10 of FIG. 26D, the device 100 may call the sixth page (PhotoGridView) by using the eighth description including the transition information from the fifth page (PhotoAlbum) to the sixth page (PhotoGridView).

For example, when the transition information (<stateMachine>) of the eighth description includes information defining that an event for clicking an image folder name may be used to transition from the fifth page (PhotoAlbum) to the sixth page (PhotoGridView), the device 100 may call the sixth page (PhotoGridView) by generating an event for clicking a View All folder 2611 in the fifth page (PhotoAlbum). Thumbnails of images included in the View All folder 2611 may be displayed on the sixth page (PhotoGridView).

Referring to 2600-11 of FIG. 26D, the device 100 may perform a picture transmission function by using the ninth description defining the picture transmission function. For example, when the ninth description includes a first command for clicking a thumbnail of a recently-captured picture, the device 100 may select the picture content 2603 by generating an event for clicking a thumbnail 2612 of the picture content 2603 in the sixth page (PhotoGridView) according to the first command.

Referring to 2600-12 of FIG. 26D, when the ninth description includes a second command for clicking an OK button 2613 in the sixth page (PhotoGridView), the device 100 may generate an event for clicking the OK button 2613 in the sixth page (PhotoGridView) according to the second command. In this case, according to the event for clicking the OK button 2613, the device 100 may display the seventh page (PhotoReviewPage) for reviewing the picture content 2603.

Referring to 2600-13 of FIG. 26D, when the ninth description includes a third command for clicking a Send button 2614 in the seventh page (PhotoReviewPage), the device 100 may generate an event for clicking the Send button 2614 in the seventh page (PhotoReviewPage) according to the third command. In this case, according to the event for clicking the Send button 2614, the device 100 may transmit the picture content 2603 to a friend device.

According to an exemplary embodiment, in FIGS. 26A to 26D, the first description may be a portion of the screen component information of the launcher application, and the second to ninth descriptions may be a portion of the screen component information of the chat application.

FIGS. 27A to 27C are diagrams illustrating an example of displaying intermediate pages on a virtual display by the device.

According to an exemplary embodiment, when determining the path for transfer from the current page to the target page, the device 100 may display intermediate pages between the current page and the target page on a virtual display. Then, the device 100 may display only the target page for performing at least one function requested by the user, on the actual screen. According to an exemplary embodiment, the virtual display is a space that is not physically shown to the user, and may be a virtual space that is required by the device 100 to perform a function.

As illustrated in FIG. 27A, the device 100 may receive a voice input for requesting performance of at least one function. For example, the device 100 may receive voice data 2700 'Search for How Long It Takes from Gangnam Station to Jamsil Station'.

When receiving the voice data 2700, the device 100 may analyze the voice data 2700 based on natural language processing technology. For example, the device 100 may convert the received voice data 2700 into text data and analyze the text data.

For example, by analyzing the received voice data 2700 (e.g., 'Search for How Long It Takes from Gangnam Station to Jamsil Station'), the device 100 may generate command data 2700' such as 'Execute Subway Application→Set Gangnam Station as Departure Station→Set Jamsil Station as Arrival Station→Search for Service Information'. The device 100 may distinguish between functions (e.g., Execute Subway Application, Set Departure Station, Set Arrival Station, and Search for Service Information) and variables (also referred to as 'arguments') (e.g., Gangnam, Jamsil, etc.) in the command data. Then, the device 100 may extract the screen page or the UI element corresponding to each function. When variables are required in the process of generating an input event on the extracted UI element, the device 100 may insert the variables.

According to an exemplary embodiment, while transmitting the voice data 2700 to the server 200, the device 100 may request the server 200 to analyze the voice data 2700. In this case, the server 200 may analyze the voice data 2700 based on natural language processing technology. The server 200 may transmit the analysis results of the voice data 2700 to the device 100.

When the analysis of the voice data 2700 is completed, the device 100 may read the screen component information (UI description) of the subway application from the memory. By using the screen component information of the subway application, the device 100 may determine a search result providing page provided by the subway application as the target page. Also, the device 100 may identify the current page as the home screen (launcher screen).

According to an exemplary embodiment, the device 100 may determine the path for transfer from the home screen (launcher screen) to the search result providing page of the subway application by using the screen component information (UI description) of the subway application. For example, the device 100 may execute the subway application in the home screen (launcher screen) and determine the path for transfer to the search result providing page through the first page (e.g., main map page (MainMap)), the second page (e.g., station search page (SearchStation)), the third page (e.g., menu selection page (SelectOption)), the first page (e.g., main map page (MainMap)), the second page (e.g., station search page (SearchStation)), the third page (e.g., menu selection page (SelectOption)), and the fourth page (e.g., time selection page (TimeSelect)) of the subway application as the shortest path. The device 100 may call the first page, the second page, the third page, the first page, the second page, the third page, the fourth page, and the target page sequentially according to the determined path.

Referring to 2700-1 of FIG. 27B, the device 100 may execute the subway application by generating an event for clicking an icon 2701 of the subway application in the home screen (launcher screen) by using the first description defining a global command (e.g., Execute).

Referring to 2700-2 of FIG. 27B, the device 100 may display the first page (MainMap) after the loading page of the subway application. In this case, the device 100 may call the second page (SearchStation) by using the second description including the transition information from the first page (MainMap) to the second page (SearchStation).

For example, when the transition information (<stateMachine>) of the second description includes information defining that an event for clicking a station search button may be used to transition from the first page (MainMap) to the second page (SearchStation) (e.g., <transition sourceUIPageID="mainMap" targetUIPageID="searchStation" resourceID="main_tab_btn0" action="Click"/>), the device 100 may call the second page (SearchStation) by generating an event for clicking a station search button 2702 in the first page (MainMap).

Referring to 2700-3 of FIG. 27B, the device 100 may perform a departure station setting function in the second page (SearchStation) by using the third description defining a departure station setting function (e.g., <appFeature name="Set Departure Station">). For example, when the third description includes a first command for inputting a text to a text edit window, the device 100 may input 'Gangnam' (i.e., departure station) to a text edit window 2703 of the second page (SearchStation) according to the first command. In this case, a list of station names related to 'Gangnam' may be displayed on the second page (SearchStation).

Referring to 2700-4 of FIG. 27B, when the third description includes a second command for clicking a TextView, the device 100 may generate an event for clicking 'Gangnam' 2704 among the list of station names related to 'Gangnam' according to the second command. In this case, the device 100 may display the fourth page (SelectOption) according to the event for clicking 'Gangnam' 2704.

Referring to 2700-5 of FIG. 27B, when the third description includes a third command for clicking a departure station button 2705 in a circular menu of the fourth page (SelectOption), the device 100 may generate an event for clicking a departure station button 2705 in the fourth page (SelectOption) according to the third command. In this case, 'Gangnam' may be set as the departure station, and the device 100 may recall the first page (Main Map) in order to set the arrival station.

Referring to 2700-6 of FIG. 27C, the device 100 may call the second page (SearchStation) by using the fourth description including the transition information from the first page (MainMap) to the second page (SearchStation).

For example, when the transition information (<stateMachine>) of the fourth description includes information defining that an event for clicking a station search button may be used to transition from the first page (MainMap) to the second page (SearchStation) (e.g., <transition sourceUIPageID="mainMap" targetUIPageID="searchStation" resourceID="main_tab_btn0" action="Click"/>), the device 100 may call the second page (SearchStation) by generating an event for clicking a station search button 2702 in the first page (MainMap).

Referring to 2700-7 of FIG. 27C, the device 100 may perform an arrival station setting function in the second page (SearchStation) by using the fifth description defining an arrival station setting function (e.g., <appFeature name="Set Arrival Station">).

For example, when the fifth description includes a fourth command for inputting a text to a text edit window 2703, the device 100 may input 'Jamsil' (i.e., arrival station) to the text edit window 2703 of the second page (SearchStation) according to the fourth command. In this case, a list of station names related to 'Jamsil' may be displayed on the second page (SearchStation).

Referring to 2700-8 of FIG. 27C, when the fifth description includes a fifth command for clicking a TextView, the device 100 may generate an event for clicking 'Jamsil' 2706 among the list of station names related to 'Jamsil' according to the fifth command. In this case, the device 100 may display the fourth page (SelectOption) according to the event for clicking 'Jamsil' 2706.

Referring to 2700-9 of FIG. 27C, when the fifth description includes a sixth command for clicking an arrival station button in the circular menu of the fourth page (SelectOption), the device 100 may generate an event for clicking an arrival station button 2707 in the fourth page (SelectOption) according to the sixth command. In this case, 'Jamsil' may be set as the arrival station, and the device 100 may call the fourth page (e.g., time selection page (TimeSelect)).

Referring to 2700-10 and 2700-11 of FIG. 27C, the device 100 may provide service information in the search result providing page by using the sixth description defining a service information providing function (e.g., <appFeature name="Service Information">).

For example, when the sixth description includes information defining that an event for clicking an OK button (button1) of the fourth page (e.g., time selection page (TimeSelect)) may be used to provide the service information, the device 100 may generate an event for clicking an OK button 2709 of the fourth page (e.g., time selection page (TimeSelect)). According to the event for clicking the OK button 2709, the device 100 may call the search result providing page and provide the subway service information between Gangnam Station to Jamsil Station through the search result providing page.

According to an exemplary embodiment, the device 100 may display some intermediate pages (e.g., pages displayed on 2700-2 to 2700-10) for transfer from the current page to the target page on the virtual display and actually display the search result providing page (i.e., the target page) to the user.

According to an exemplary embodiment, in FIGS. 27A to 27C, the first description may be a portion of the screen component information of the launcher application, and the second to sixth descriptions may be a portion of the screen component information of the subway application.

Figure 28:
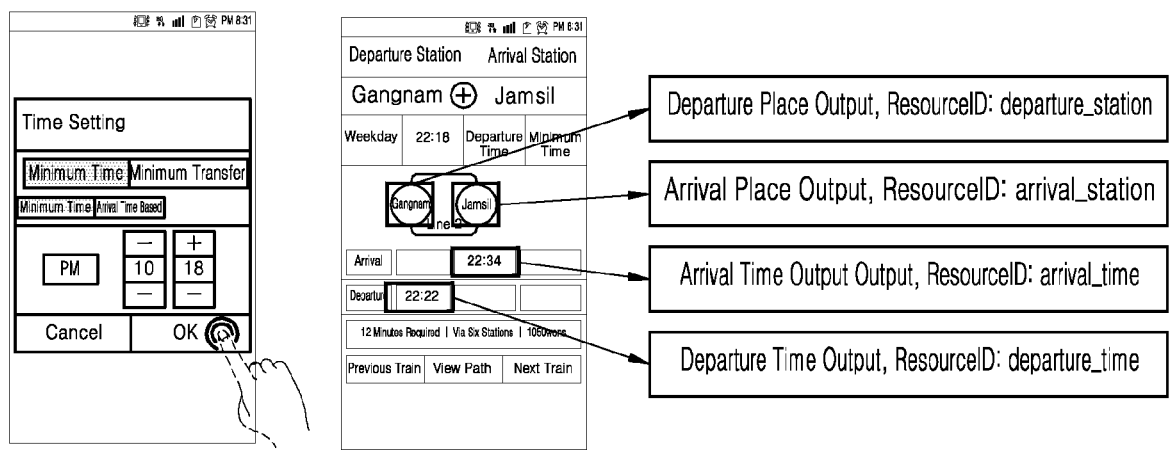
FIG. 28 is a diagram illustrating result values obtained when the device performs a user-requested function by using screen component information of an application according to an exemplary embodiment.

FIG. 28 is a diagram illustrating result values obtained when the device performs a user-requested function by using screen component information of an application according to an exemplary embodiment.

Referring to FIG. 28, the device 100 may provide the subway service information between Gangnam Station and Jamsil Station in the subway application according to the voice command of FIG. 27A. In this example, the device 100 may store the subway service information between Gangnam Station and Jamsil Station, which is generated in the subway application, as result values and use the stored result values as variables in the process of performing actions corresponding to other voice commands.

For example, when receiving a voice command 'Search for How Long It Takes from Gangnam Station to Jamsil Station and Send Search Result to Peter', the device 100 may search for the subway service information between Gangnam Station and Jamsil Station in the subway application (e.g., Gangnam-Jamsil, Depart at 22:22 and Arrive at 22:34) and store the found subway service information as the execution result values of the subway application. Then, the device 100 may execute the chat application and generate input events for calling a chat room page of Peter. The device 100 may read the subway service information between Gangnam Station and Jamsil Station, which is stored as the execution result values of the subway application, and add the read subway service information between Gangnam Station and Jamsil Station to a message input window of the chat room page of Peter. The device 100 may transmit the subway service information between Gangnam Station and Jamsil Station (e.g., Gangnam-Jamsil, Depart at 22:22 and Arrive at 22:34) to Peter by generating an input event for clicking a Send button.

According to another exemplary embodiment, when the user utters a voice 'Send Monica Message Transmitted to Peter at about 7:00 Yesterday', the device 100 may analyze the voice to acquire analysis data 'Execute Chat Application, Search for Message Transmitted to Peter between 6:30 and 7:30 May 17, 2014, and Send Found Message to Monica'.

The device 100 may execute the chat application and call the chat room page of Peter by generating an input event for selecting Peter in the friend list page. The device 100 may extract 'Seminar Place and Time Text' Transmitted to Peter at about 7:00 Yesterday (e.g., 7:03 May 17, 2014) in the chat room page and generate an input event for long-clicking (e.g., 2 or more seconds) in a region in which 'Seminar Place and Time Text' is displayed. In this example, a menu window for 'Seminar Place and Time Text' may be displayed. For example, Copy, Delete, Transmit, Share, and Notify may be displayed on the menu window. The device 100 may call the friend list page by generating an input event for clicking 'Transmit'. The device 100 may transmit 'Seminar Place and Time Text' to Monica by generating an input event for selecting 'Monica' and an input event for selecting an OK button in the friend list page.

Figure 29:
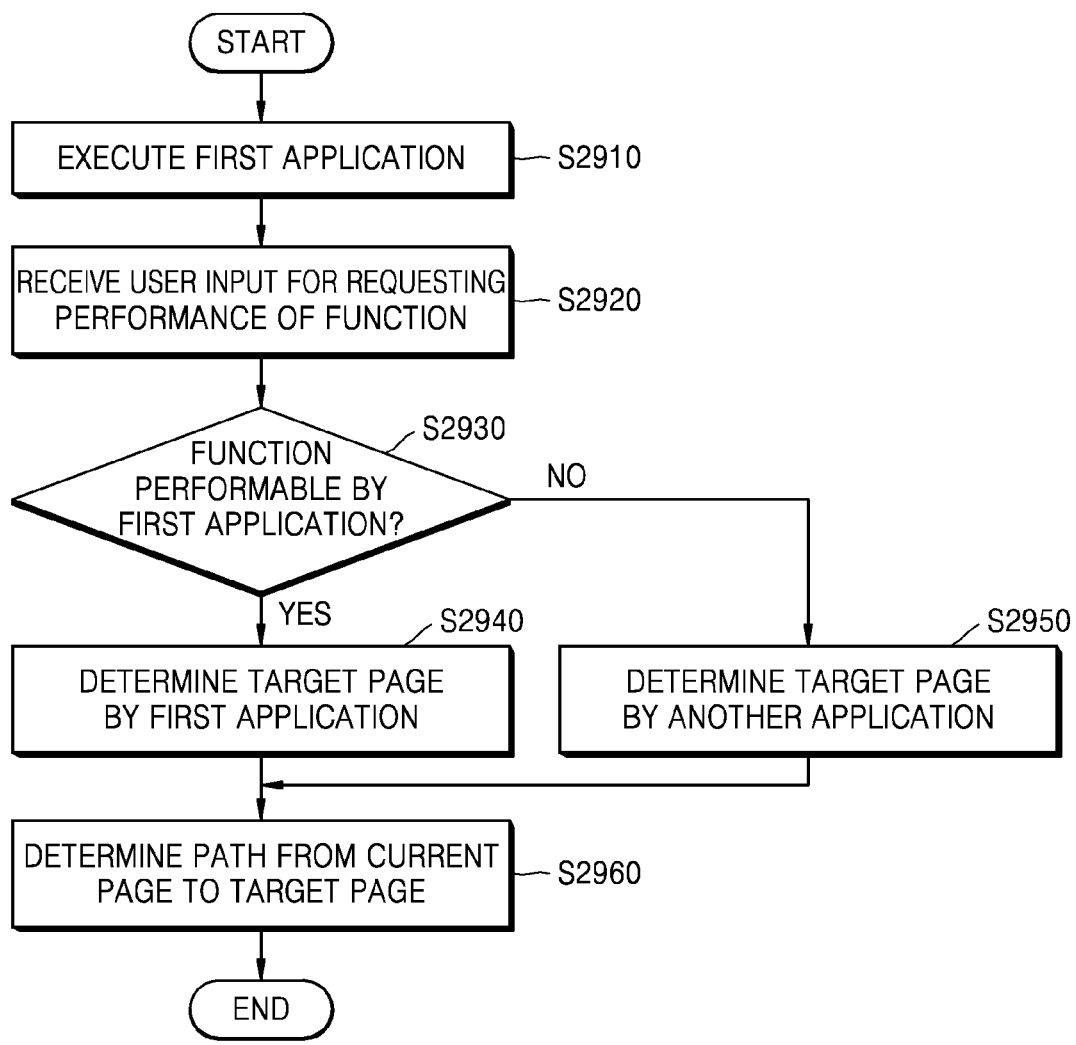
FIG. 29 is a flowchart illustrating a method for performing a predetermined function by the device based on application execution information, according to an exemplary embodiment.

FIG. 29 is a flowchart illustrating a method for performing a predetermined function by the device based on application execution information, according to an exemplary embodiment.

Referring to FIG. 29, in operation S2910, the device 100 may execute a first application. The first application may vary. For example, the first application may include, but is not limited to, at least one of a Web browser application, a camera application, a dictionary application, a translation application, a data transmission application, a music player application, a video player application, a message application, a social media application, a map application, a subway application, a bus application, a broadcast application, a game application, an exercise support application, and a payment application.

In operation S2920, the device 100 may receive a user input in the process of executing the first application. For example, the device 100 may receive a user input for requesting performance of a predetermined function. According to an exemplary embodiment, the user input may include at least one of a voice input, a gesture input (e.g., a touch input or an air gesture input), a motion input, a bending input, a key input, and a multiple/combination input.

In operation S2930, the device 100 may determine whether the requested function may be performed through the first application that is being executed. For example, by using information about the first application, the device 100 may determine whether the user-requested function is provided by the first application.

In operation S2940, the device 100 may determine the target page in the first application. For example, when the function requested by the user's voice is provided by the first application, the device 100 may determine the target page by using the screen component information (UI description) of the first application.

In operation S2950, when the user-requested function is not provided by the first application, the device 100 may determine the target page in another application by using the screen component information (UI description) of the other application.

In operation S2960, the device 100 may determine the path from the current page to the target page.

For example, since the first application is being executed in the first device 100, the device 100 may identify the current page, which is being displayed on the screen, by using the screen component information (UI description) of the first application.

According to an exemplary embodiment, the device 100 may compare the information about the UI elements (UI objects) included in the current page with the information about the UI elements (UI objects) defined in the UI description corresponding to at least one application. Then, the device 100 may extract the page that includes the UI elements (UI objects) that are most similar to the UI elements (UI objects) included in the current page, from among the pages defined in the screen component information (UI description). In this case, the current page may be extracted from the screen component information (UI description).

For example, when the current page includes the first object, the second object, the third object, and the fourth object, and the first page among the pages provided by the first application also includes the first object, the second object, the third object, and the fourth object, the device 100 may identify that the current page is the first page provided by the first application.

When the identification of the current page is completed, the device 100 may determine the path for transfer from the current page to the target page. When there are a plurality of paths for transferring from the current page to the target page, the device 100 may determine the shortest path among the plurality of paths.

Figure 30B:
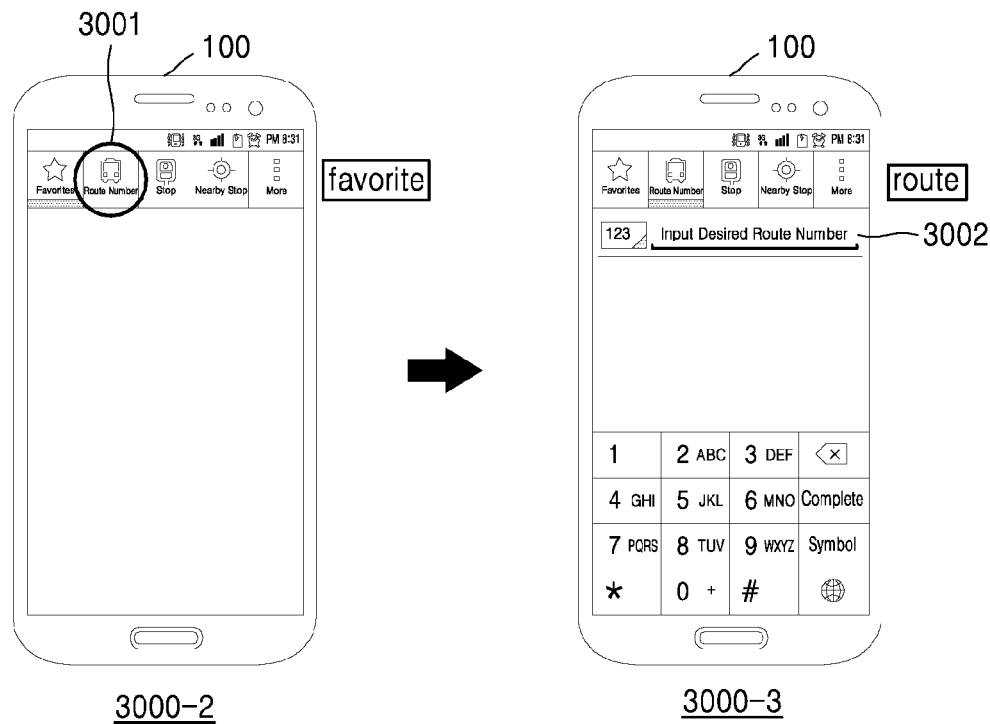

FIGS. 30A and 30B are diagrams illustrating an example of performing a function corresponding to a voice input of the user by the device by using screen component information (UI description) of an application that is being executed. FIGS. 30A and 30B illustrate an exemplary case in which the application is a bus application providing bus information.

As illustrated in FIG. 30A, the device 100 may execute the bus application. In this example, the device 100 may display a Favorite page of the bus application (3000-1).

The device 100 may receive a voice input of the user in the process of displaying the Favorite page of the bus application. For example, the device 100 may receive voice data 3000 'Show Me When Bus No. 3002 Arrives'.

When receiving the voice data 3000, the device 100 may generate analysis result data 3000' of the voice data 3000 by analyzing the voice data 3000 based on natural language processing technology. For example, the device 100 may convert the received voice data 3000 into text data and analyze the text data based on natural language processing. For example, by analyzing the received voice data 3000 (e.g., 'Show Me When Bus No. 3002 Arrives'), the device 100 may generate the analysis result data 3000' including command data such as 'Execute Bus Application→Check Route No. 3002 or Provide No. 3002 Arrival Time Information'. The device 100 may distinguish between functions (e.g., Check Bus Route and Provide Arrival Time Information) and variables (also referred to as 'arguments') (e.g., Bus No.: '3002') in the command data. Then, the device 100 may extract the screen page or the UI element corresponding to each function. When variables are required in the process of generating an input event on the extracted UI element, the device 100 may insert the variables.

According to an exemplary embodiment, while transmitting the voice data 3000 to the server 200, the device 100 may request the server 200 to analyze the voice data 3000. In this case, the server 200 may analyze the voice data 3000 based on natural language processing technology. The server 200 may transmit the analysis result data 3000' of the voice data 3000 to the device 100.

When the analysis of the voice data 3000 is completed, the device 100 may determine whether a bus arrival time search function is provided by the bus application that is being executed. For example, the device 100 may extract a first description defining the function information of the bus application among the screen component information of the bus application. Then, based on the first description, the device 100 may detect that the bus arrival time search function is provided by the bus application. In this case, the device 100 may determine a route information page providing the bus arrival time search results as the target page.

Also, according to an exemplary embodiment, by using the screen component information (UI description) of the bus application, the device 100 may identify that the current page is a Favorite page (Favorites) of the bus application.

By using the screen component information (UI description) of the bus application, the device 100 may determine the path for transfer from the Favorite page (current page) to the route information page (target page). For example, the device 100 may determine the first path for transfer from the Favorite page (Favorites) through a route number search page (Route) to the route information page (RouteInfo) as the shortest path.

Referring to 3000-2 of FIG. 30B, the device 100 may call the route number search page (Route) by using a second description including transition information from the Favorite page (Favorites) to the route number search page (Route). For example, since the transition information (<stateMachine>) of the second description includes information defining that an event for clicking a TextView may be used to transition from the Favorite page (Favorites) to the route number search page (Route) (e.g., <transition sourceUIPageID="favorite" targetUIPageID="route"

action="Click">), the device 100 may call the route number search page (Route) by generating an event for clicking a Route Number tab 3001.

Referring to 3000-3 of FIG. 30B, the device 100 may search for a bus route by using a third description defining a bus route check function (e.g., <appFeature name="Route Check"). For example, when the third description includes a first command for inputting a bus number to a text edit window, the device 100 may input a bus number '3002' to a text input window 3002 of the route number search page (Route) according to the first command. In this case, a list of bus names related to '3002' may be displayed on the route number search page (Route).

Referring to 3000-4 and 3000-5 of FIG. 30B, when the third description includes a second command for clicking a TextView, the device 100 may generate an event for clicking '3002 (Direct)' 3003 among the list of bus names related to '3002' according to the second command. In this case, the device 100 may display the arrival time information and the route information of '3002 (Direct)' 3003 through the route information page (RouteInfo).

The user may identify the position or the arrival time of the bus No. 3002 through the route information page (RouteInfo).

According to an exemplary embodiment, in FIGS. 30A and 30B, the first description may be a portion of the screen component information of the launcher application, and the second and third descriptions may be a portion of the screen component information of the bus application.

Figure 31:
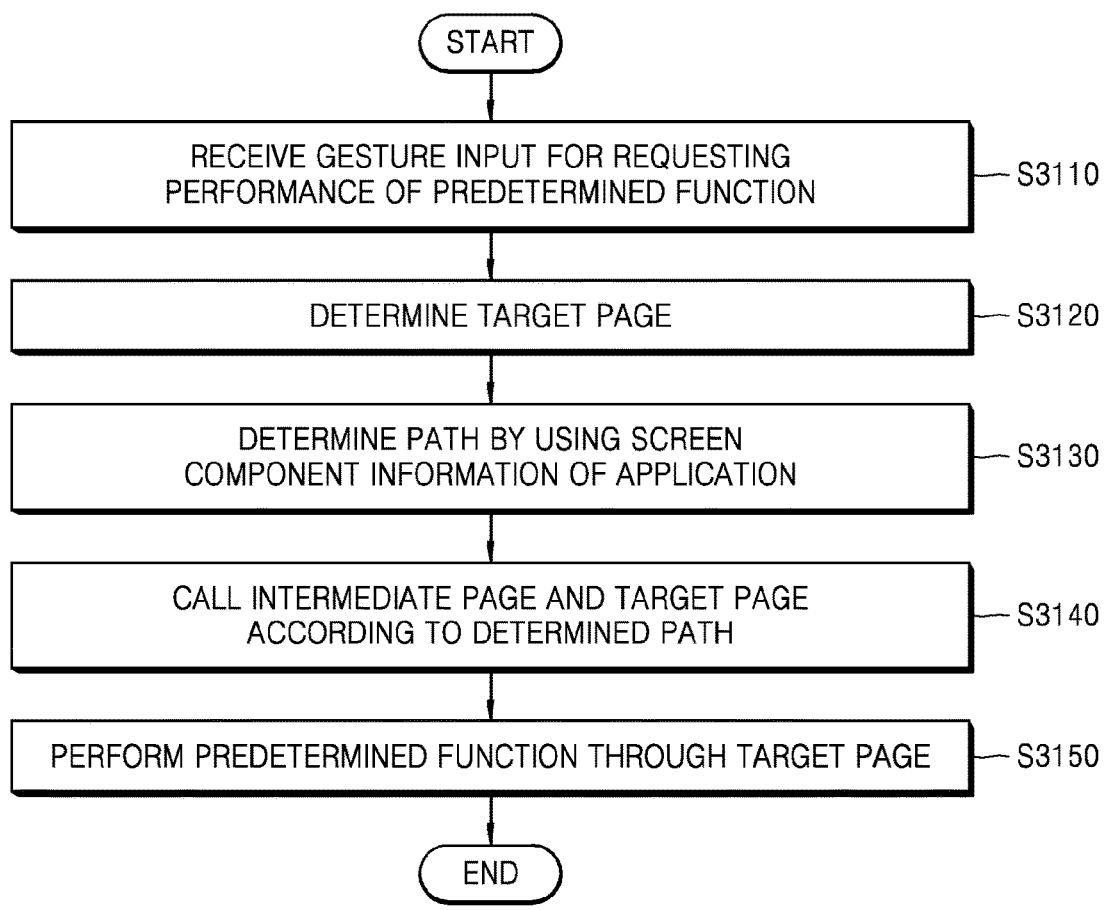
FIG. 31 is a flowchart illustrating a method for performing a function corresponding to a gesture input by the device by using screen component information of an application, according to an exemplary embodiment.

FIG. 31 is a flowchart illustrating a method for performing a function corresponding to a gesture input by the device by using screen component information of an application, according to an exemplary embodiment.

Referring to FIG. 31, in operation S3110, the device 100 may receive a gesture input for requesting performance of a predetermined function. The gesture input may include a touch input or an air gesture input.

For example, the user may set a gesture of a predetermined pattern (e.g., a gesture for drawing a star) as a gesture for requesting performance of a predetermined function (e.g., a function for uploading a picture to a cloud server).

In operation S3120, the device 100 may determine the target page corresponding to the gesture input. For example, the gesture for drawing a star may be set as the gesture for requesting performance of a function for uploading a picture to a cloud server. In this case, when detecting the gesture for drawing a star, the device 100 may determine a picture upload page of a file transfer application as the target page.

In operation S3130, the device 100 may determine the path for transfer from the current page to the target page by using the UI description of the application.

For example, the device 100 may identify the current page and determine the shortest path for transfer from the current page to the target page by using the screen component information (UI description) of the application.

In operation S3140, the device 100 may call the intermediate pages and the target page according to the determined path. For example, when the determined path is the path for transfer from the current page through the first and second intermediate pages to the target page, the device 100 may sequentially call the first intermediate page, the second intermediate page, and the target page.

According to an exemplary embodiment, the device 100 may display all of the first intermediate page, the second intermediate page, and the target page sequentially on an actual screen. According to another exemplary embodiment, the device 100 may display the first intermediate page and the second intermediate page on a virtual display and display only the target page on an actual screen.

In operation S3150, the device 100 may perform the predetermined function requested by the gesture input, through the target page.

According to an exemplary embodiment, by using the screen component information (UI description) of the application, the device 100 may generate an input event for performing a user-requested function. For example, when the user-requested function is a picture upload function, the device 100 may perform the picture upload function by generating an input event for touching an Upload button included in the target page.

Figure 32:
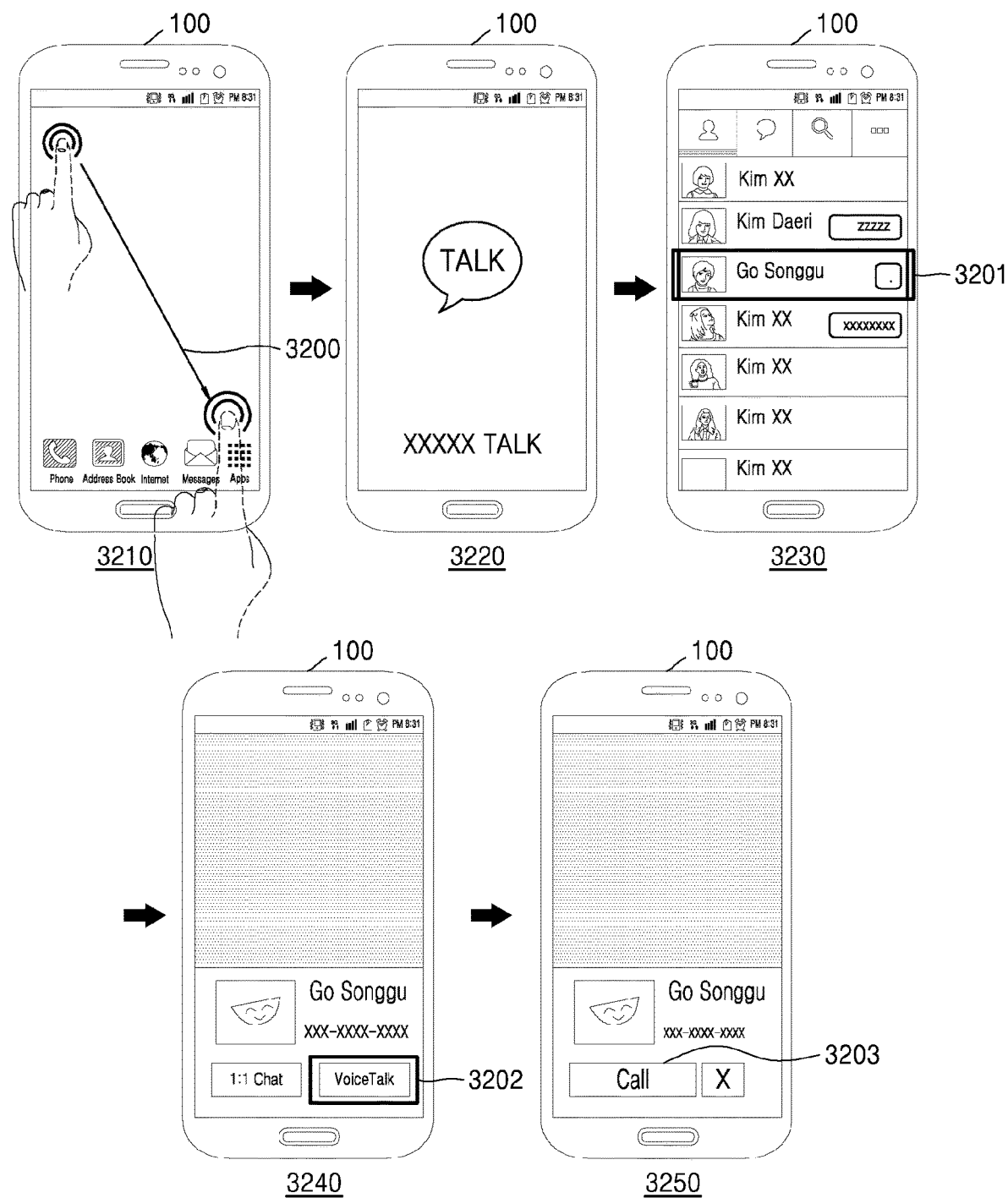
FIG. 32 is a diagram illustrating an example of performing a function corresponding to a gesture input by the device by using screen component information of an application, according to an exemplary embodiment.

FIG. 32 is a diagram illustrating an example of performing a function corresponding to a gesture input by the device by using screen component information of an application. FIG. 32 illustrates an exemplary case in which a drag input for dragging from the top left to the bottom right is mapped to Chat Application Execution, Friend (e.g., Go Songgu), and VoiceTalk Performance.

Referring to 3210 of FIG. 32, the device 100 may receive a drag input 3200 for dragging from the top left to the bottom right of the home screen. The device 100 may identify the drag input 3200 as a gesture for requesting performance of VoiceTalk in the chat application.

The device 100 may determine a VoiceTalk page for providing a call connection function with a friend (e.g., Go Songgu) as the target page. Also, the device 100 may identify the current page as the home screen.

The device 100 may determine the path for transfer from the home screen to the VoiceTalk page by using the screen component information (UI description) of the chat application. For example, the device 100 may execute the chat application in the home screen and determine the path for transfer to the VoiceTalk page (e.g., VoiceTalk) through the first page (e.g., friend list page (FriendListTab)) and the second page (e.g., friend information summary page (FriendSummary)) of the chat application, as the shortest path.

The device 100 may display the first page, the second page, and the target page sequentially according to the determined path.

Referring to 3220 of FIG. 32, the device 100 may execute the chat application by generating an event for clicking an icon of the chat application. Then, the device 100 may display a loading page of the chat application.

Referring to 3230 of FIG. 32, the device 100 may display the first page (e.g., friend list page (FriendListTab)). The device 100 may search for Go Songgu 3201 in the first page (e.g., friend list page (FriendListTab)).

Referring to 3240 of FIG. 32, the device 100 may call the second page (e.g., friend information summary page (FriendSummary)) by generating an event for clicking an object, namely, Go Songgu 3201, included in the first page (e.g., friend list page (FriendListTab)).

Referring to 3250 of FIG. 32, the device 100 may call the VoiceTalk page (i.e., the target page) by generating an event for clicking a VoiceTalk button 3202 in the second page (e.g., friend information summary page (FriendSummary)). The device 100 may generate an event for clicking a Call button 3203 included in the VoiceTalk page.

According to an exemplary embodiment, since the device 100 automatically generates a realistic user input event in each page from the current page to the target page by using the screen component information (UI description) of the application, the device 100 may provide the user with a much easier experience than directly operating the device 100 by hand.

Figure 33:
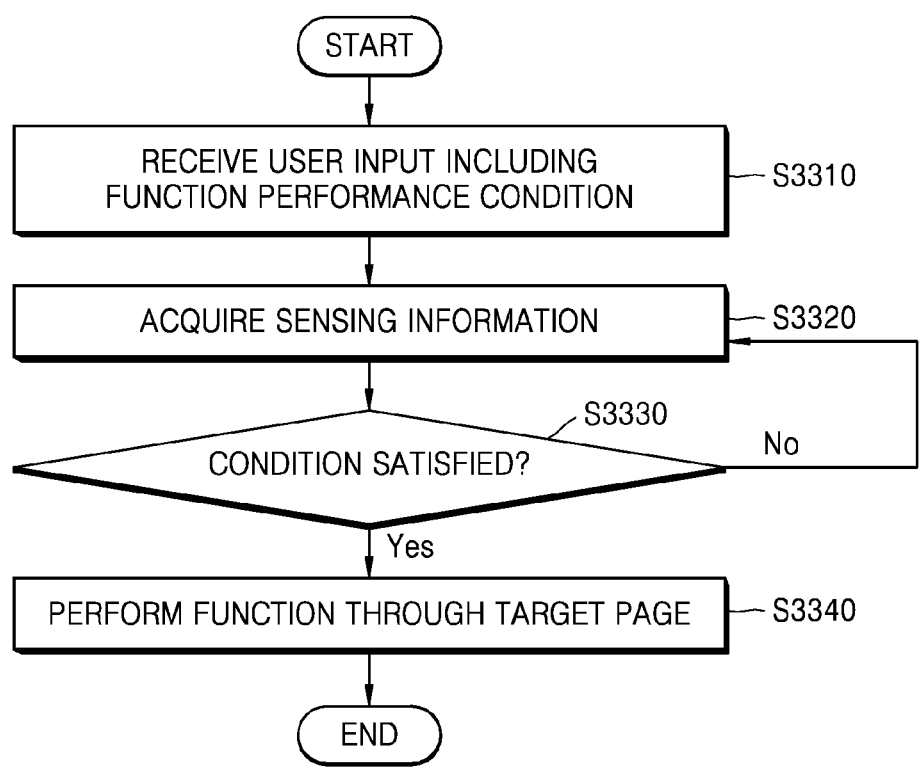
FIG. 33 is a flowchart illustrating a method for performing a predetermined function by the device based on a predetermined condition according to an exemplary embodiment.

FIG. 33 is a flowchart illustrating a method for performing a predetermined function by the device based on a predetermined condition, according to an exemplary embodiment.

Referring to FIG. 33, in operation S3310, the device 100 may receive a user input including a function performance condition. For example, the user input may include condition information about a condition and function information about a function that has to be performed when the condition is satisfied.

According to an exemplary embodiment, the condition for performance of a function may include, but is not limited to, at least one of a schedule-based condition, a sensor input-based condition, an application state-based condition, and a user definition-based condition.

According to an exemplary embodiment, the user input including the schedule-based condition may refer to a user input for requesting performance of a predetermined function at predetermined intervals or a predetermined time set by the user.

According to an exemplary embodiment, the user input including the sensor input-based condition may refer to a user input for requesting performance of a predetermined function when a value sensed by a sensor reaches a critical value. For example, the device 100 may determine that the user input including a command for calling an emergency center or outputting a warning message is received when a heart rate increases by 10% or more, or decreases abruptly.

According to an exemplary embodiment, the user input including the application state-based condition may refer to a user input for requesting performance of a predetermined function according to the changing state of a predetermined application. For example, the device 100 may determine that the user input for automatically requesting transmission of a response message to a counterpart device is received when a message is received through a message application while the state of the user is set as 'In Conference' in the device 100.

In operation S3320, the device 100 may acquire sensing information.

According to an exemplary embodiment, the sensing information may be measured by a sensor or may be sensed through an application. For example, the sensing information may include, but is not limited to, at least one of acceleration information, position information, temperature information, humidity information, heart rate information, network state information (e.g., change from LTE to Wi-Fi), and user state information (e.g., Sleep state or Exercise state).

According to an exemplary embodiment, the device 100 may directly generate the sensing information or may receive the sensing information generated by an external device (e.g., wearable device, portable device, etc.).

According to an exemplary embodiment, the wearable device may include, but is not limited to, wristwatches, bands, spectacles, necklaces, rings, hairpins, hats, gloves, thimbles, footwear, and underwear.

In operation S3330, based on the sensing information, the device 100 may determine whether the condition is satisfied. For example, the device 100 may compare the sensing information with the condition. When the value included in the sensing information is identical to the value included in the condition, the device 100 may determine that the condition is satisfied. However, exemplary embodiments are not limited to this. For example, a condition may be satisfied when the sensing information goes above or below a critical value.

In operation S3340, the device 100 may perform the user-requested function through the target page when the condition is satisfied. According to an exemplary embodiment, the device 100 may identify the current page and determine the path for transfer from the current page to the target page.

For example, in the case in which the condition 'Communication Network Change from LTE to Wi-Fi' is mapped to the command 'Upload Pictures Taken Today to Cloud Server', when the communication network used by the device 100 changes from LTE to Wi-Fi, the device 100 may automatically upload the pictures taken today to the cloud server.

Further, when the communication network used by the device 100 changes from LTE to Wi-Fi, the device 100 may determine an upload page of a cloud application for connection to the cloud server as the target page. Then, the device 100 may identify the current page and determine the UI path for transfer from the current page to the upload page of the cloud application by using the screen component information (UI description) of the cloud application.

According to the determined UI path, the device 100 may execute the cloud application and display the home page of the cloud application. The device 100 may call a picture selection page by generating an event for touching an Upload button in the home page of the cloud application. The device 100 may generate an event for selecting all of the 'pictures taken today' in the picture selection page. Then, the device 100 may call/display the upload page and upload the pictures to the cloud server automatically by generating an event for pressing an Upload button in the upload page.

According to an exemplary embodiment, when the condition is not satisfied, the device 100 may continue to acquire sensing information (S3330-N) until the condition is satisfied (S3330-Y).

Figure 34:
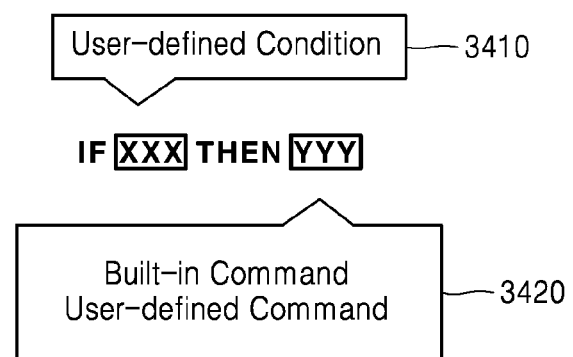
FIG. 34 is a diagram illustrating an interface for setting a condition according to an exemplary embodiment.

FIG. 34 is a diagram illustrating an interface for setting a condition according to an exemplary embodiment.

Referring to FIG. 34, the device 100 may provide an interface (e.g., GUI) for setting a condition for activating a predetermined function of the application. The user may define a condition 3410 and a function (command) 3420 through the interface.

Figure 35A:
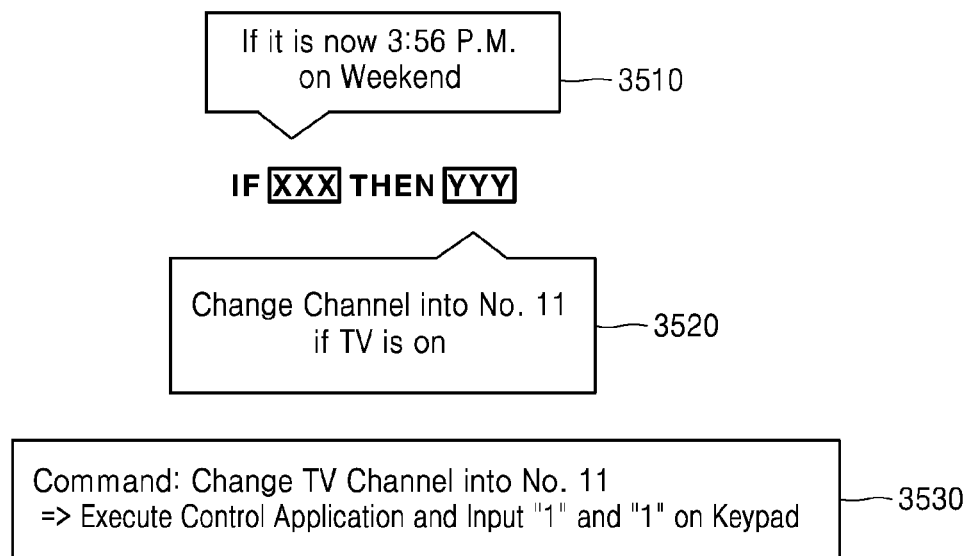
FIGS. 35A and 35B are diagrams illustrating an example of controlling a television (TV) by the device based on a predetermined condition, according to an exemplary embodiment.
Figure 35B:
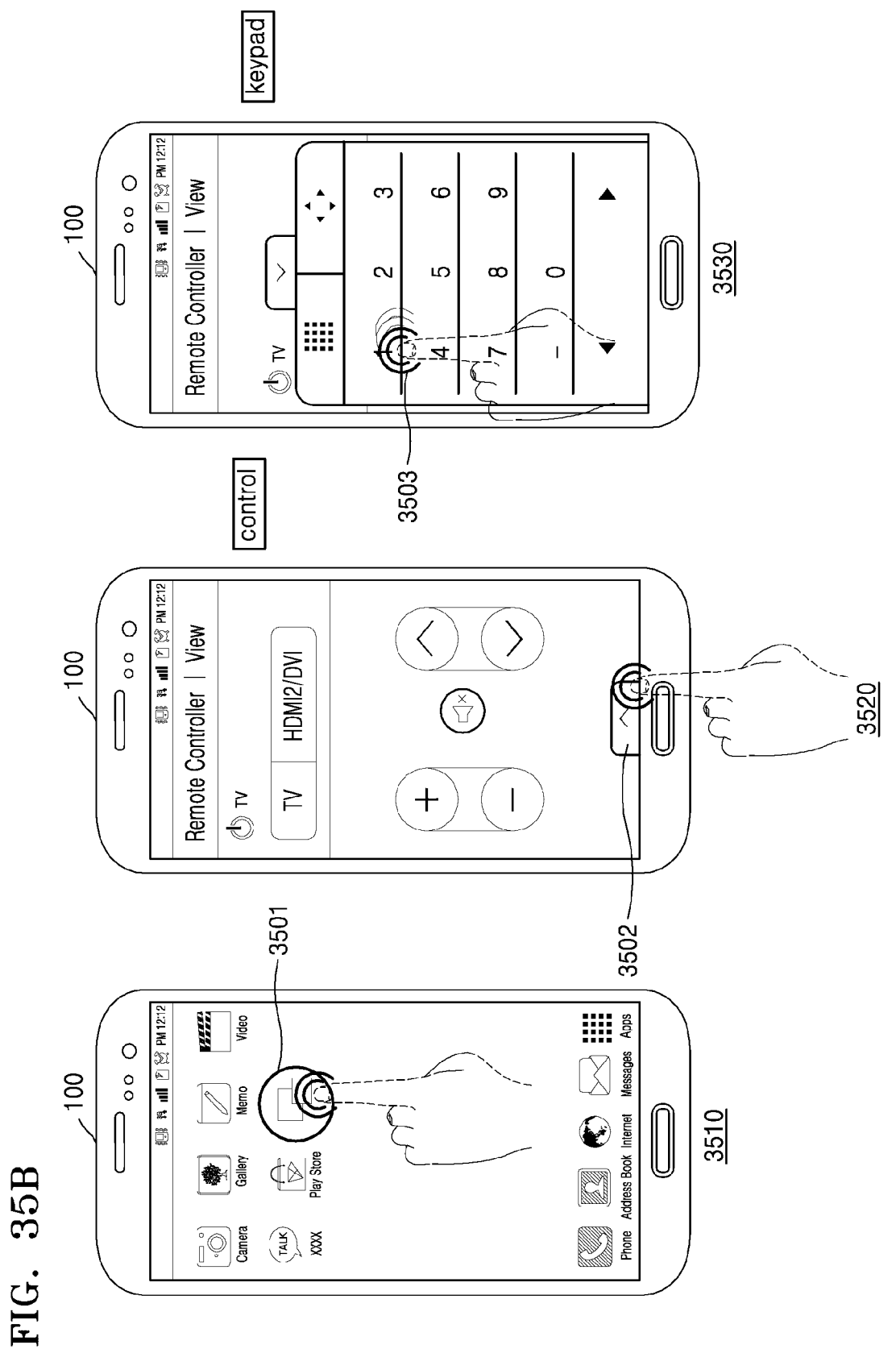

FIGS. 35A and 35B are diagrams illustrating an example of controlling a TV by the device based on a predetermined condition.

As illustrated in FIG. 35A, the user may define a condition 3510 (e.g., If it is now 3:56 P.M. on Weekend) and a function 3520 (e.g., Change Channel to Channel No. 11 if TV is on) through the interface.

The device 100 may convert the function 3520 input by the user into a command 3530. For example, the device 100 may convert 'Change TV Channel to Channel No. 11' into 'Execute Control Application and Input "1" on Keypad'.

According to an exemplary embodiment, when the condition defined by the user is satisfied afterward, the device 100 may automatically perform commands by using the screen component information of the control application. Based on time information, the device 100 may determine whether the condition is satisfied. For example, when it is now 3:56 P.M. on Saturday, the device 100 may determine that the condition predefined by the user (If it is now 3:56 P.M. on Weekend) is satisfied.

Referring to 3510 of FIG. 35B, when the predefined condition (If it is now 3:56 P.M. on Weekend) is satisfied, the device 100 may generate an event for clicking an icon 3501 of the control application on the home screen (launcher screen) by using a first description defining a global command (e.g., Execute).

Referring to 3520 of FIG. 35B, according to an event for clicking an icon 3501, the device 100 may execute the control application and display a control page (sourceUIPageID="control"). In this case, the device 100 may call a keypad page (UIPageID="keypad") by using a second description including the transition information from the control page to the keypad page (UIPageID="keypad"). In this case, the second description may be defined in the screen component information of the control application.

For example, since the transition information (<stateMachine>) of the second description may include information defining that an event for clicking a predetermined button (e.g., button having a resourceID "remote_control_more") may be used to transition from the control page to the keypad page (e.g., <transition sourceUIPageID="control" targetUIPageID="keypad" action="Click" resourceID="remote_control_more"/>), the device 100 may display the keypad page including a remote control panel by generating an event for clicking a button 3502 including an up arrow key in the control page.

Referring to 3530 of FIG. 35B, the device 100 may input '11' by using a third description including function information for inputting '1' (e.g., <appFeature name="1 Input"). For example, since the third description includes an event for clicking '1' on the remote control panel (e.g., <featureEntry pageID="keypad" action="Click" resourceID="remote_control_panel_1"/>), the device 100 may input '11' by generating an event for clicking '1' on the remote control panel two times. In this case, the device 100 may transmit a control command 'Change TV Channel into No. 11' to the TV.

Figure 36A:
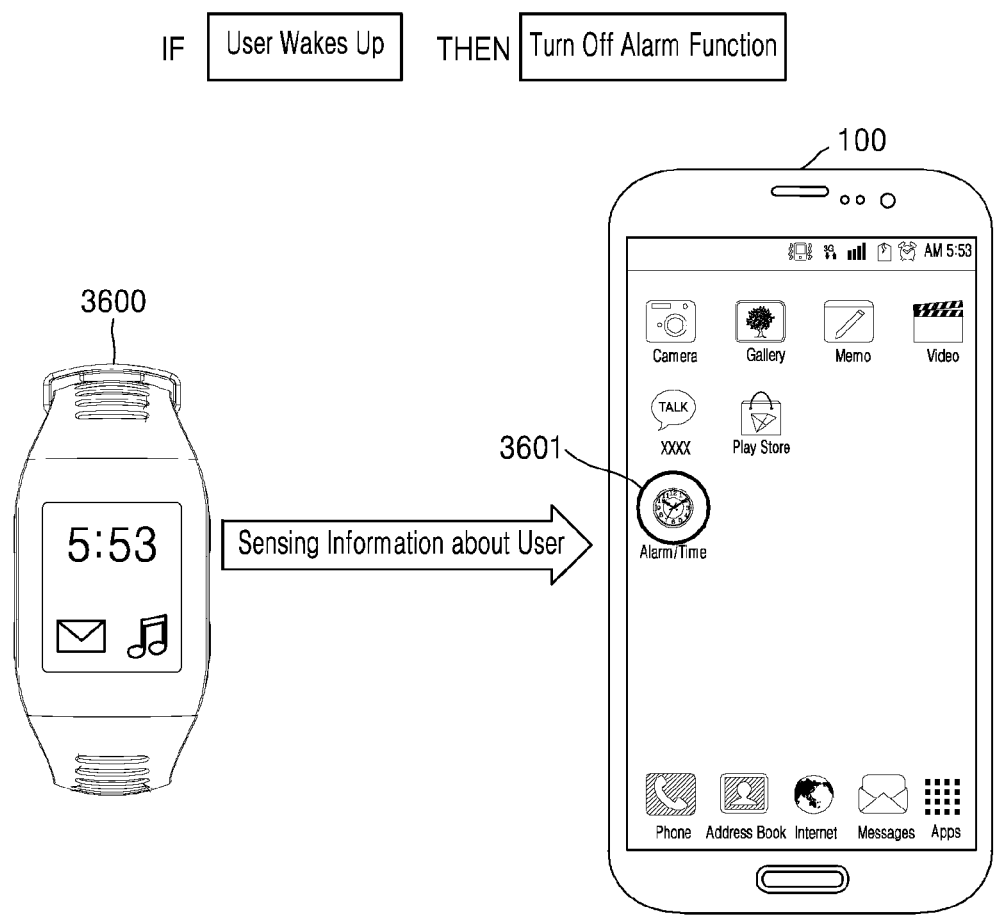
FIGS. 36A and 36B are diagrams illustrating an example of canceling an alarm setting by the device based on a predetermined condition, according to an exemplary embodiment.
Figure 36B:
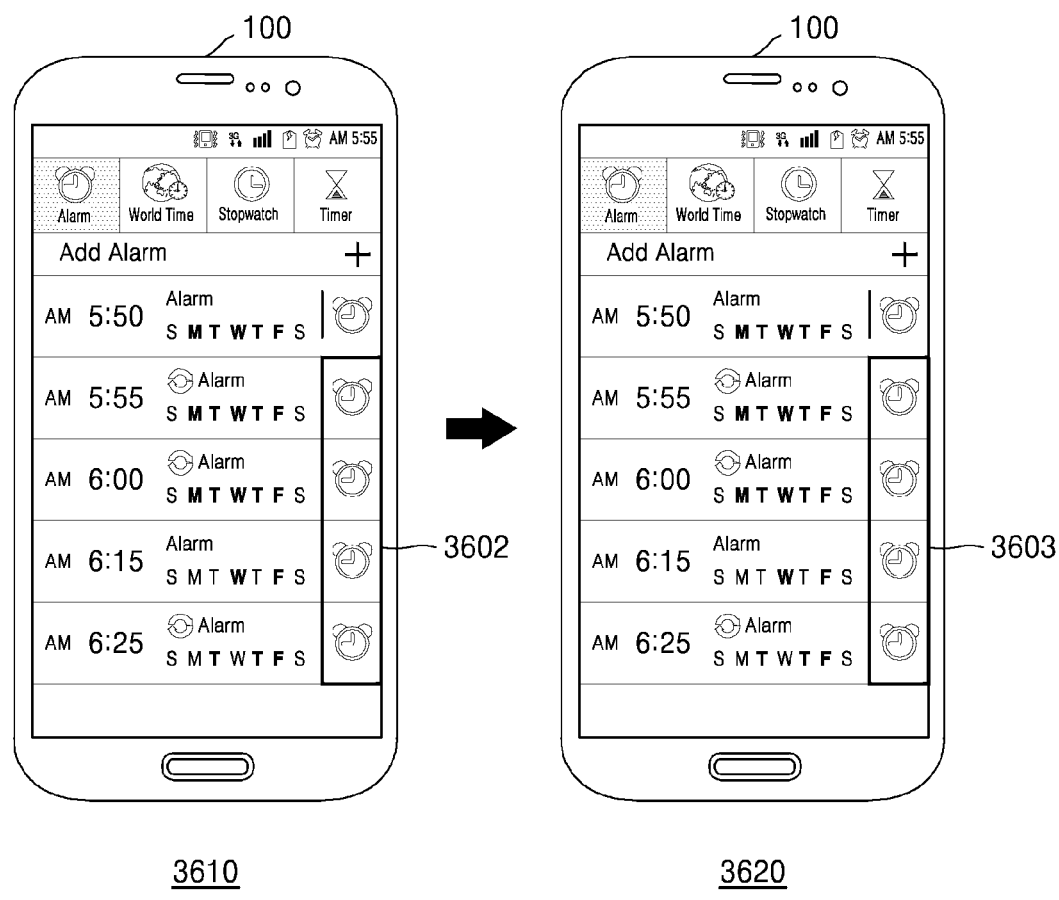

FIGS. 36A and 36B are diagrams illustrating an example of canceling an alarm setting by the device based on a predetermined condition, according to an exemplary embodiment.

FIGS. 36A and 36B illustrate an exemplary case in which the device 100 is set to automatically cancel (command) alarm settings within one hour from the wake-up time of the user when the user wakes up (condition).

Referring to FIG. 36A, a smart watch 3600 may collect state information of the user. For example, the smart watch 3600 may determine whether the user is in a sleep state or in a wake-up state, by detecting the position of the user (by using a position sensor), the movement of the user (by using an acceleration sensor), the temperature of the user, the sound generated from the user (by using a microphone), and/or the use state of the application (by using a touch sensor).

The smart watch 3600 may transmit sensing information about the user to the device 100. For example, when the user wakes up at 5:53 A.M., the smart watch 3600 may transmit information indicating the wakeup of the user at 5:53 A.M., to the device 100.

The device 100 may receive the information indicating the wakeup of the user at 5:53 A.M. from the smart watch 3600. In this case, the device 100 may determine an alarm setting page as the target page in order to cancel alarm settings within one hour from 5:53 A.M.

According to an exemplary embodiment, the device 100 may determine the state of the user. For example, the device 100 may receive position information of the user, movement information of the user, temperature information of the user, sound information generated from the user, and information about the use state of the application installed in the smart watch 3600 from the smart watch 3600 and determine whether the user has woken up by using the received information.

The device 100 may determine the path for transfer from the current page to the alarm setting page (target page) by using the screen component information (UI description) of an alarm application. According to the determined path, the device 100 may execute the alarm application by generating an input event for tapping an icon 3601 of the alarm application.

Referring to FIG. 36B, the device 100 may call and display the alarm setting page of the alarm application. In this case, in the device 100, an alarm output function may be activated at 5:55 A.M., 6:00 A.M., 6:15 A.M., and 6:25 A.M. (3602) (3610).

In order to cancel the alarm settings within one hour from 5:53 A.M. that is the wake-up time of the user, the device 100 may generate an input for touching a watch icon corresponding to each of 5:55 A.M., 6:00 A.M., 6:15 A.M., and 6:25 A.M. In this case, the alarm output functions within one hour from the wake-up time of the user may be deactivated (3603) (3620).

Figure 37:
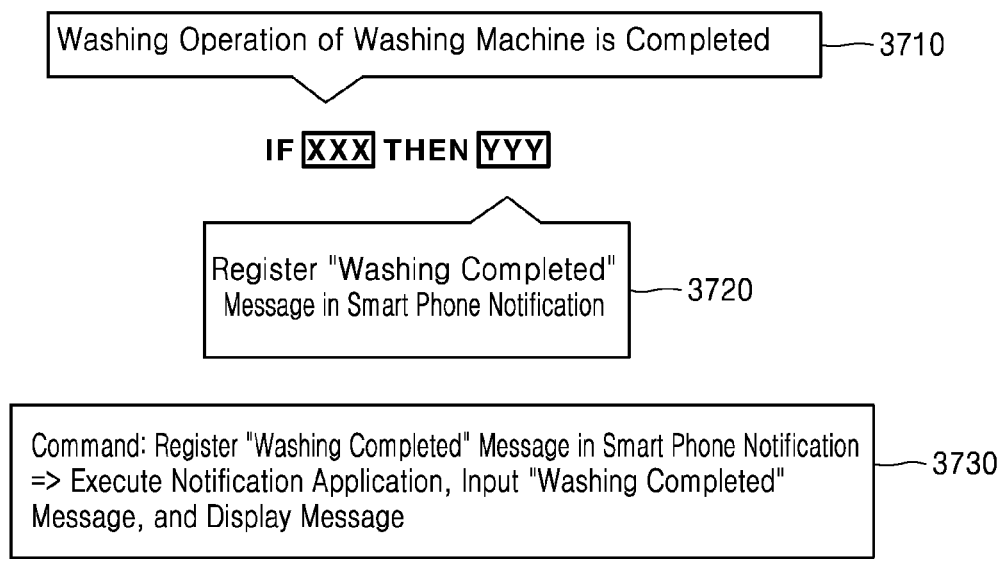
FIG. 37 is a diagram illustrating an example of displaying a notification message by the device based on a predetermined condition, according to an exemplary embodiment.

FIG. 37 is a diagram illustrating an example of displaying a notification message by the device based on a predetermined condition.

Referring to FIG. 37, the user may define a condition 3710 (e.g., Washing Operation of Washing Machine is Completed) and a function 3720 (e.g., Register "Washing Completed" Message in Smart Phone Notification) through the interface.

The device 100 may convert the function 3720 input by the user into a command 3730. For example, the device 100 may convert 'Register "Washing Completed" Message in Smart Phone Notification' into 'Execute Notification Application, Input "Washing Completed" Message, and Display Message'.

According to an exemplary embodiment, when the condition defined by the user is satisfied afterward (e.g., when a "Washing Completed" message is received from the washing machine), the device 100 may display the "Washing Completed" message on the screen by using the screen component information of the notification application.

Figure 38B:
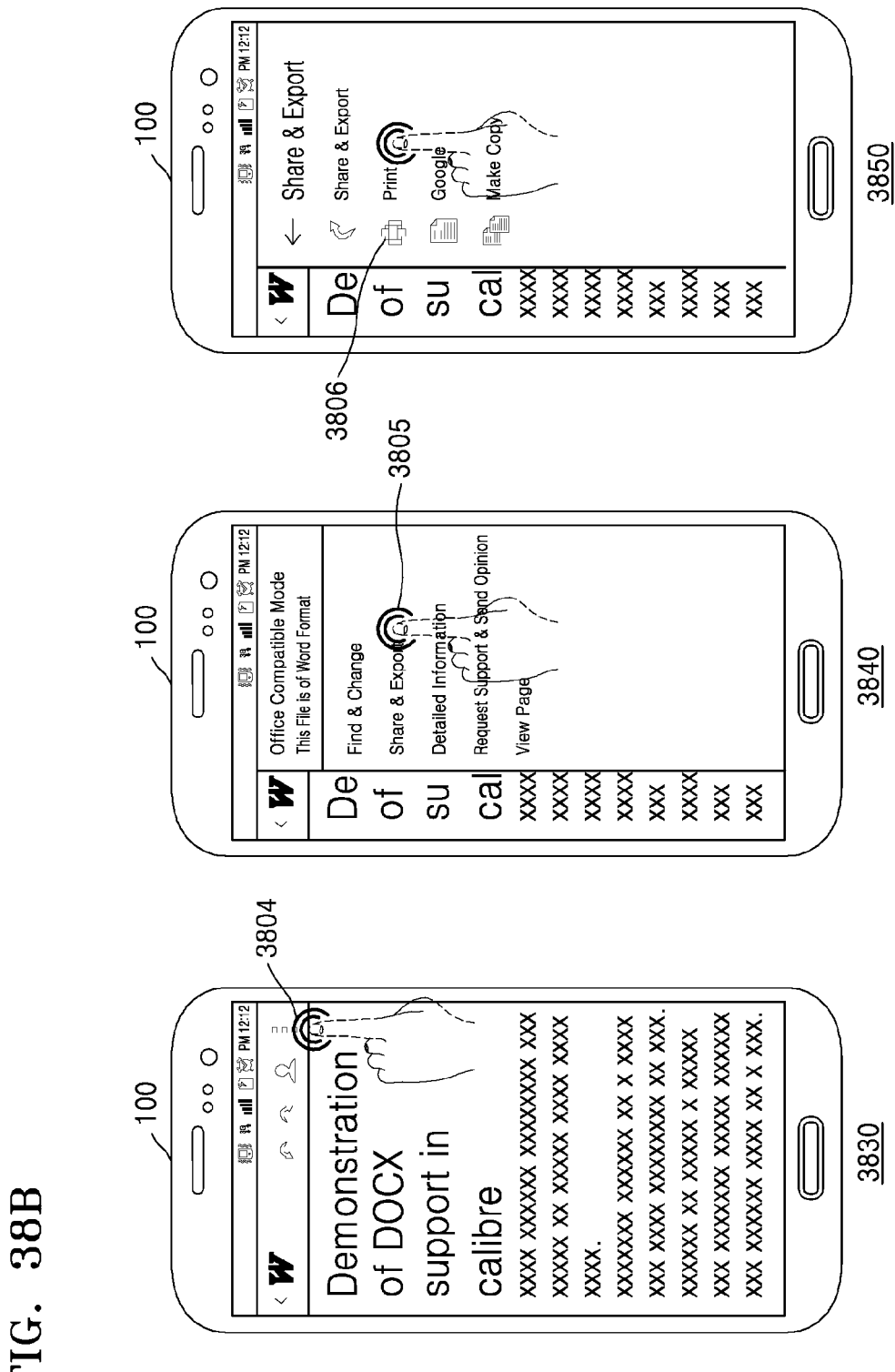
Figure 38C:
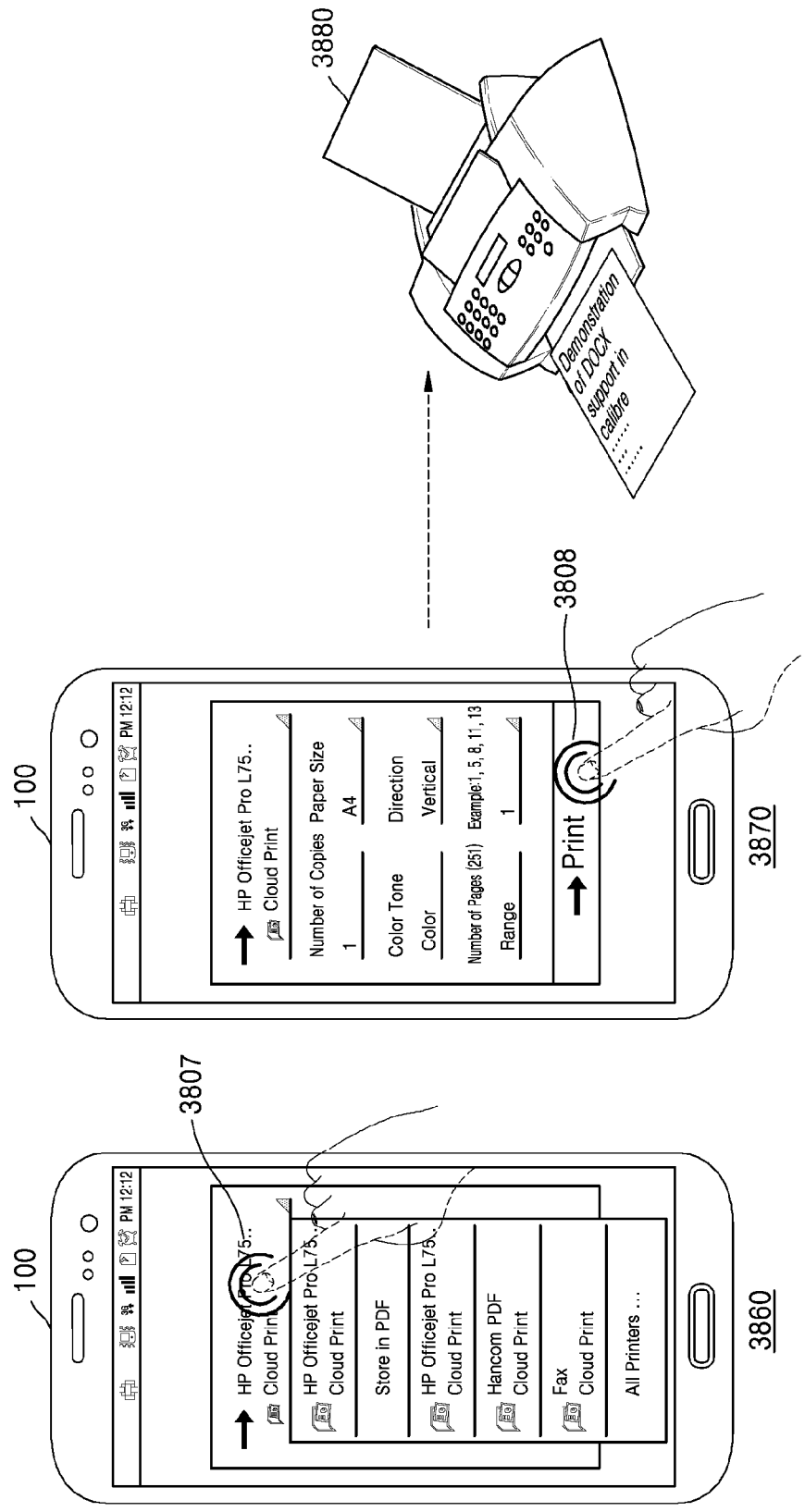

FIGS. 38A to 38C are diagrams illustrating an example of controlling a printer by the device using a user voice input, according to an exemplary embodiment.

Referring to FIG. 38A, the device 100 may receive voice data 3800 'Print Document Written at 3:00 P.M.' from the user through the microphone. In this case, the device 100 may convert the voice data 3800 into command data 3800' based on natural language processing technology. For example, the device 100 may convert the voice data 3800 'Print Document Written at 3:00 P.M.' into a command set such as 'Execute Document→Select Document Written at 3:00 P.M.→Print Selected Document'. According to an exemplary embodiment, the device 100 may directly convert the voice data 3800 into the command data 3800' or may request the server 200 to convert the voice data 3800 into the command data 3800', while transmitting the voice data 3800 to the server 200.

According to an exemplary embodiment, the device 100 may determine the UI path by using the screen component information and perform the commands included in the command set (e.g., Execute Document→Select Document Written at 3:00 P.M.→Print Selected Document) according to the determined UI path.

For example, referring to 3810 of FIG. 38A, the device 100 may generate an event for clicking an icon 3801 of a document management application in the home screen (launcher screen) by using a first description defining a global command (e.g., Execute). The first description may be defined in the screen component information of the launcher application.

Referring to 3820 of FIG. 38A, according to the event for clicking the icon 3801, the device 100 may execute the document management application and display a document list page. In this case, the device 100 may search the document list page for a document 3802 written at 3:00 P.M.

The device 100 may call a preview page displaying a preview image of the document by using a second description including the transition information from the document list page to the preview page. In this case, the second description may be defined in the screen component information of the document management application.

For example, the transition information of the second description may include information defining that an event for clicking a predetermined document may be used to transition from the document list page to the preview page. In this case, the device 100 may call the preview page displaying a preview image of the document 3802 by generating an event for clicking the document 3802.

Referring to 3830 of FIG. 38B, the device 100 may call a menu page by using a third description including the transition information from the preview page to the menu page. In this case, the third description may be included in the screen component information of the document management application.

For example, when the third description includes information defining that an event for clicking a menu tab 3804 of the preview page may be used to transition from the preview page to the menu page, the device 100 may generate an event for clicking the menu tab 3804 according to the third description. The menu page may be called corresponding to the event for clicking the menu tab 3804.

Referring to 3840 and 3850 of FIG. 38B, when a fourth description includes information defining that an event for clicking a TextView may be used to transition from the menu page to a print page, the device 100 may sequentially generate an event for clicking a Share & Export button 3805 and an event for clicking a Print button 3806 in the menu page. In this case, the fourth description may be included in the screen component information of the document management application. The device 100 may call the print page corresponding to the event for clicking the Print button 3806.

Referring to 3860 of FIG. 38C, the device 100 may print the document 3802 by using a fifth description defining a print function. In this case, the device 100 may select a predetermined printer 3880 by generating an event for clicking a print setting button 3807 in the print page.

Referring to 3870 of FIG. 38C, by using the fifth description, the device 100 may generate an event for clicking a Print button 3808 in the print page. In this case, the device 100 may output the document 3802 written at 3:00 P.M. through the predetermined printer 3880. The predetermined printer 3880 may be, but is not limited to, a printer connected to a local network or a cloud printer connected by a cloud account.

Figure 39A:
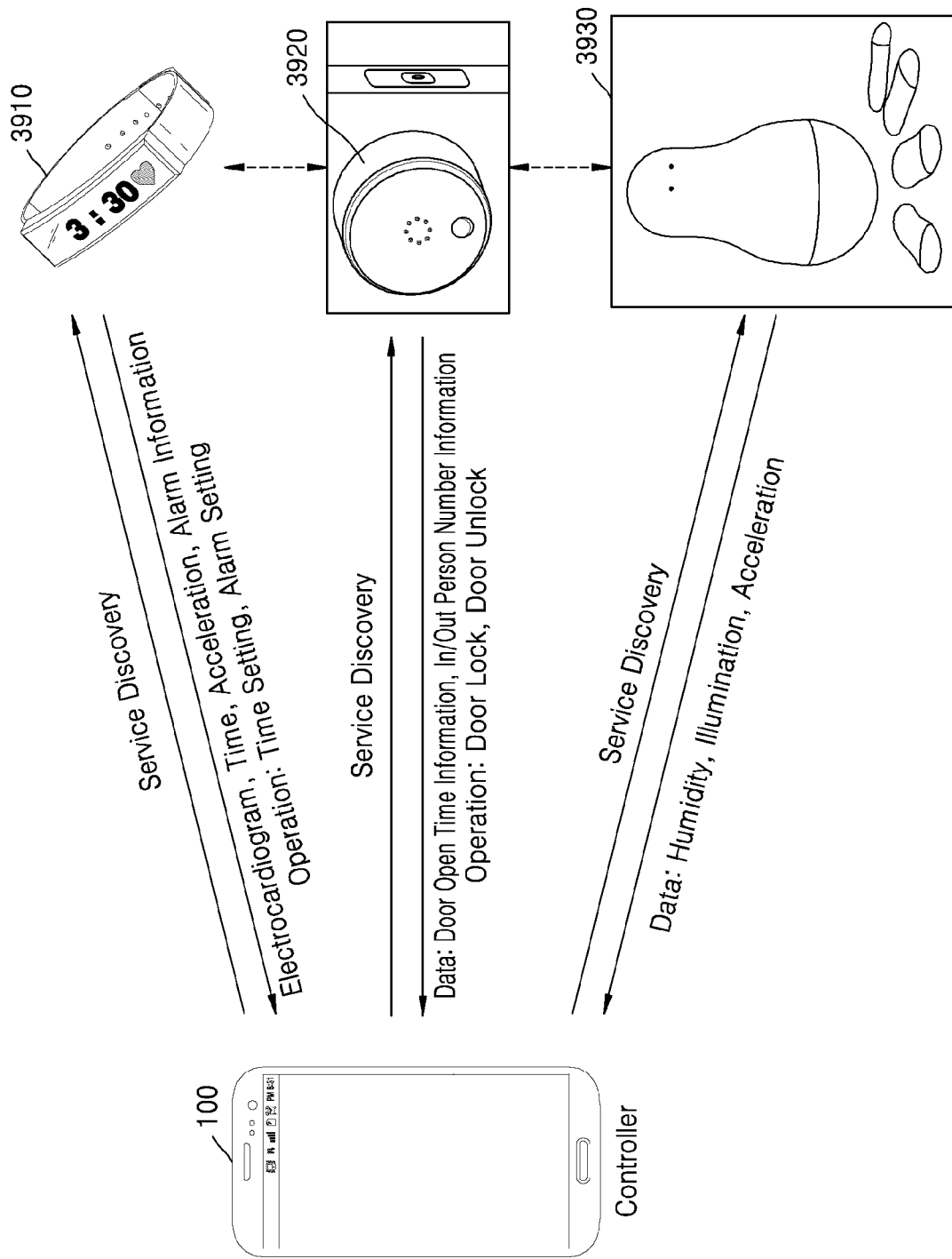

FIGS. 39A and 39B are diagrams illustrating a system for performing a predetermined function in an IoT environment, according to an exemplary embodiment.

Referring to FIG. 39A, the device 100 may be connected to a plurality of IoT devices (e.g., 3910, 3920, and 3930). In this example, the device 100 may also be an IoT device. The IoT device may refer to a device that collects data through sensors and shares the collected data (hereinafter referred to as 'sensor data') with other IoT devices. For example, the IoT device may include, but is not limited to, smart phones, wearable devices (e.g., wearable glasses, rings, necklaces, a wristband 3910, wristwatches, footwear, earrings, hair bands, clothes, gloves, and thimbles), a door lock device 3920, a sensor control device 3930, smart bulbs, refrigerators, washers, air conditioners, audio devices, TVs, robotic cleaners, humidifiers, smart forks, kitchen appliances, bicycles, exercise equipment, and washing tools, etc.

The IoT device may store service information related to services provided by the IoT device. For example, the IoT device may include a space (e.g., memory or disk) for storing a user's use history data and sensor data collected from sensors. Referring to FIG. 39B, the service information may include, but is not limited to, device IDs (DeviceID: 2798E016-E646-47B5-B988-C22D933C19D4), device names (e.g., DeviceName: Hanmin's Band), device product names (e.g., DeviceProductName: SmartBand), device versions (e.g., DeviceVersion: 1.0.1.2), device types (e.g., DeviceType: Wearable Watch|Wearable Band), device data (e.g., electrocardiogram (ECG) and current time), and operation information (e.g., time settings).

Also, the IoT device may manage a list of services provided by the IoT device. For example, the IoT device may update the list of services by registering a new service in the list of services or deleting some services from the list of services.

According to an exemplary embodiment, the IoT device may process or analyze the sensor data collected from the sensors. For example, the IoT device may recognize a user gesture based on the acceleration data collected from the acceleration sensor.

According to an exemplary embodiment, the IoT device may perform a predetermined function related to each service provided by the IoT device. For example, the IoT device may play music, control indoor temperature/humidity, output alarm signals, or change illumination; however, the exemplary embodiments are not limited thereto.

According to an exemplary embodiment, the IoT devices may exchange information about their respective functions with each other. In this case, the IoT devices may be connected by wireless communication. For example, the IoT devices may be connected to each other by ZigBee, Wi-Fi-Direct (WFD), ISA100.11a, or Wireless HART.

According to an exemplary embodiment, the device 100 may operate as a controller for the IoT devices. For example, by performing a service discovery process, the device 100 may receive data (e.g., service information of the IoT devices, operation information of the IoT devices, sensor data collected from the sensors, use history data, and analysis data of the sensor data) from the IoT devices.

According to an exemplary embodiment, when connected to the IoT devices, the device 100 may periodically receive the updated service information from the IoT devices. For example, the device 100 may receive ECG information, time information, acceleration information, alarm information, and operation information of the wristband 3910 (e.g., time setting information and alarm setting information), from the wristband 3910. Also, the device 100 may receive door open time information, in/out person number information, and operation information of the door lock device 3920 (e.g., door lock information and door unlock information), from the door lock device 3920.

The device 100 may receive information such as humidity, illumination, and acceleration from the sensor control device 3930. Herein, the sensor control device 3930 may be connected to a plurality of sensor tags and may collect various pieces of sensor data from the plurality of sensor tags. For example, when a temperature sensor tag is attached to a baby bottle, the sensor control device 3930 may collect temperature data of the baby bottle from the temperature sensor tag. Also, when an illumination sensor tag is attached to a bed, the sensor control device 3930 may collect illumination data of a bedroom from the illumination sensor tag.

According to an exemplary embodiment, when the device 100 operates as a controller, the device 100 may transmit data for commanding performance of a predetermined function to the IoT device. Hereinafter, an example of the operation of the device 100 as a controller will be described in detail with reference to FIGS. 40 and 41.

Figure 40:
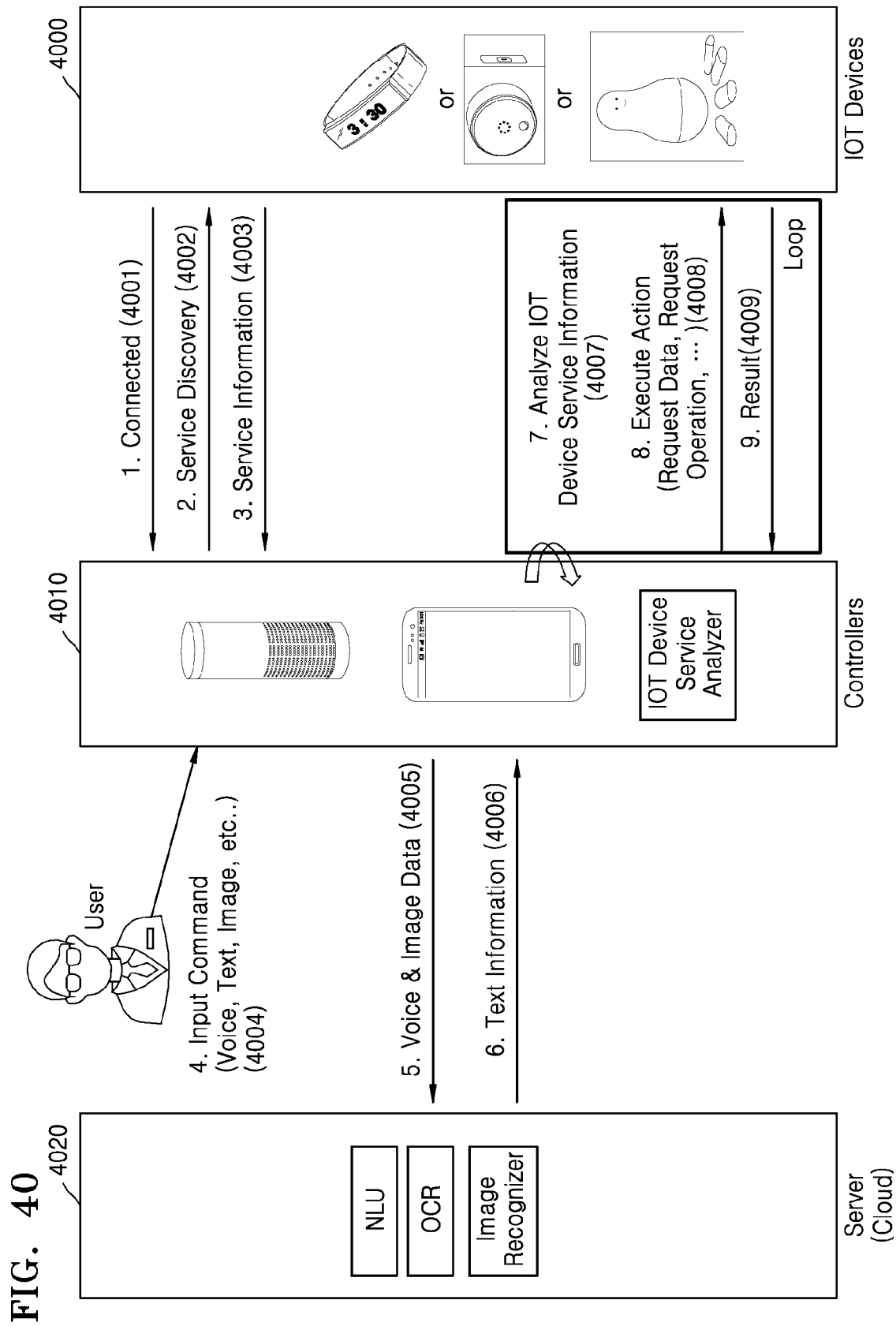
FIGS. 40 and 41 are flow diagrams illustrating a method for performing a command input by the user in an IoT environment, according to an exemplary embodiment.

FIG. 40 is a flow diagram illustrating a method for performing a command input by the user in an IoT environment.

Referring to FIG. 40, in operation 4001, a controller device 4010 may be connected to at least one IoT device 4000 through a communication link. For example, the controller device 4010 and the at least one IoT device 4000 may form a Bluetooth communication link or a ZigBee communication link; however, the exemplary embodiments are not limited thereto.

In operation 4002, the controller device 4010 may perform a service discovery process. For example, the controller device 4010 may request service information from the at least one IoT device 4000 that is communication-connected thereto.

In operation 4003, the controller device 4010 may receive service information from the at least one IoT device 4000. The service information may include service identification information, device identification information, sensor data, and operation information provided by the at least one IoT device 4000. In this case, the controller device 4010 may store the service information received from the at least one IoT device 4000. Also, the controller device 4010 may periodically receive the updated service information from the at least one IoT device 4000 to update the stored service information.

In operation 4004, the controller device 4010 may receive a user input for requesting performance of a predetermined function from the user. In this case, the user input may include, but is not limited to, at least one of a voice input, a text input, and an image input. For example, the controller device 4010 may receive an input of a voice representing a predetermined function, a text representing a predetermined function, and/or an image representing a predetermined function.

In operation 4005, the controller device 4010 may transmit the data input from the user to a server 4020. For example, the controller device 4010 may transmit voice data representing a predetermined function or image data representing a predetermined function to the server 4020.

In operation 4006, the server 4020 may generate text data by analyzing the data input from the user and transmit the generated text data to the controller device 4010. For example, the server 4020 may convert the voice data into the text data (e.g., command) by analyzing the voice data (or metadata of the voice data) by using an NLU module. Also, the server 4020 may convert the image data into the text data by recognizing the characters included in the image by using an OCR module. The server 4020 may extract the text data matched to the received image by comparing the template image with the received image by using an image recognizer. For example, by using the metadata of the received image, the server 4020 may select the template image matched to the received image and extract the text data connected to the selected template image.

In operation 4007, the controller device 4010 may analyze the service information of the at least one IoT device 4000. For example, when receiving the text data from the server 4020, the controller device 4010 may analyze the service information of the at least one IoT device 4000 to select the at least one IoT device 4000 for performing a predetermined function input from the user. For example, when the predetermined function is a function for outputting an alarm signal when the door is opened, the controller device 4010 may select a door lock device as the IoT device for outputting an alarm signal when the door is opened. Also, when the predetermined function is a function for changing the indoor illumination or color, the controller device 4010 may select an illumination device (e.g., smart bulb) as the IoT device for changing the indoor illumination or color.

In operation 4008, the controller device 4010 may transmit an execution command of a predetermined action to the selected at least one IoT device 4000. For example, the controller device 4010 may request the selected at least one IoT device 4000 to transmit predetermined data (e.g., heart rate, temperature, or acceleration) or to perform a predetermined operation (e.g., alarm signal output or illumination control).

In operation 4009, the at least one IoT device 4000 may transmit the execution result of the predetermined action to the controller device 4010. For example, the at least one IoT device 4000 may transmit the data requested by the controller device 4010 to the controller device 4010 or transmit a performance completion message of the predetermined operation to the controller device 4010.

According to an exemplary embodiment, the order of operations 4001 to 4009 may be changed. For example, operation 4001 may be performed after operation 4002 or operation 4003. Also, operation 4004 may be performed between operation 4001 and operation 4002.

Hereinafter, an example of analyzing the service information of the at least one IoT device 4000 by the server 4020 instead of by the controller device 4010 will be described with reference to FIG. 41.

Figure 41:
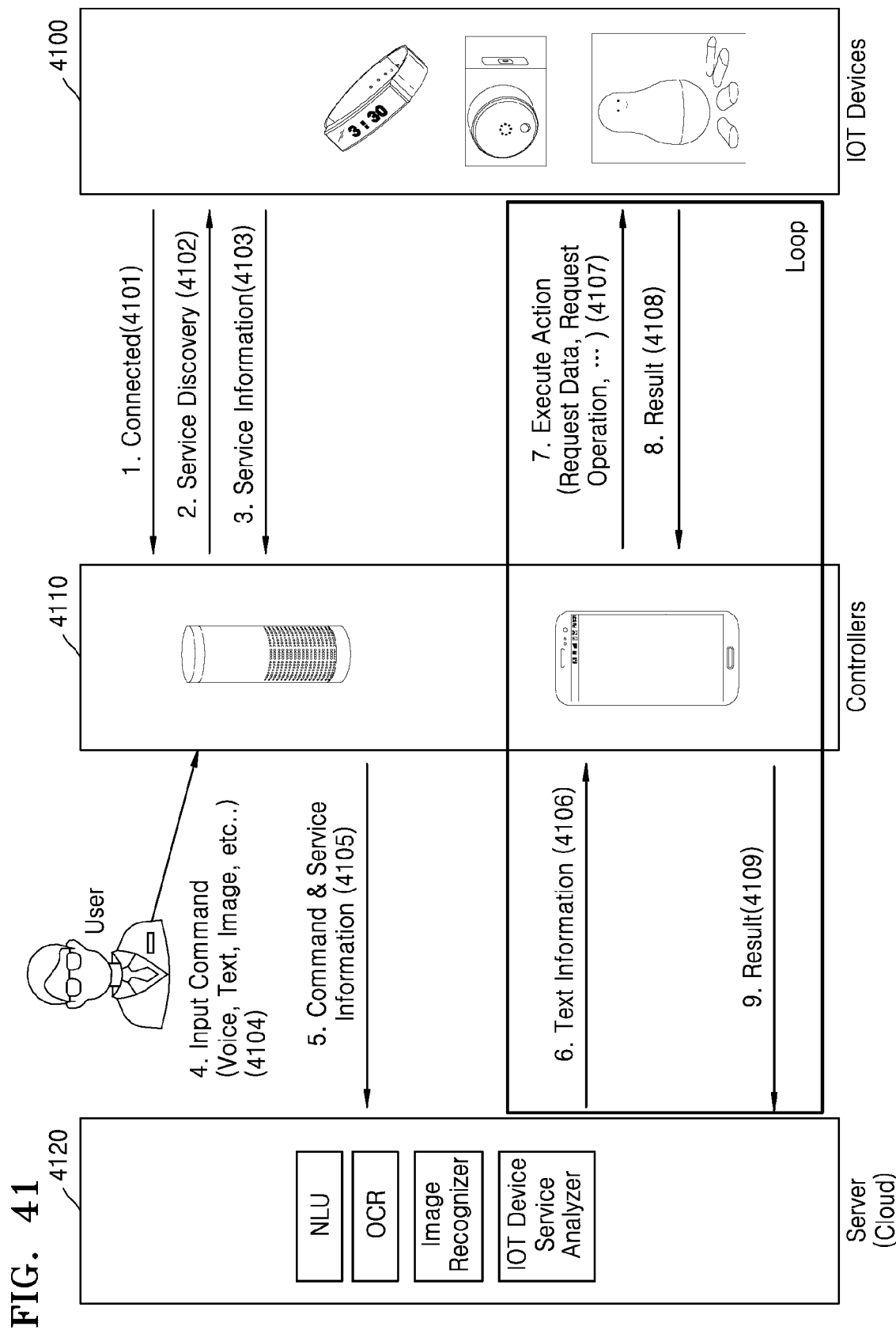

FIG. 41 is a flow diagram illustrating a method for performing a command input by the user in an IoT environment, according to an exemplary embodiment.

Referring to FIG. 41, in operation 4101, a controller device 4110 may be connected to at least one IoT device 4100 through a communication link. Herein, the communication link may include a short-range wireless communication link such as a Bluetooth communication link, a ZigBee communication link, and/or a Wi-Fi communication link.

In operation 4102, the controller device 4110 may perform a service discovery process. In this case, in operation 4103, the controller device 4110 may receive service information from the at least one IoT device 4100. According to an exemplary embodiment, the controller device 4110 may store the service information received from the at least one IoT device 4100 in a storage medium (e.g., memory).

In operation 4104, the controller device 4110 may receive a user input for requesting performance of a predetermined function from the user. For example, the controller device 4110 may receive an input of a voice representing a predetermined function, a text representing a predetermined function, and/or an image representing a predetermined function.

Operations 4101 to 4104 respectively correspond to operations 4001 to 4004 of FIG. 40.

In operation 4105, the controller device 4110 may transmit the data input from the user to a server 4120. For example, the controller device 4110 may transmit voice data representing a predetermined function or image data representing a predetermined function to the server 4120.

Also, the controller device 4110 may transmit the service information received from the at least one IoT device 4100 to the server 4120. The controller device 4110 may transmit, to the server 4120, the data input by the user together with or separately from the service information of the at least one IoT device 4100.

According to an exemplary embodiment, the controller device 4110 may upload the service information to the server 4120 periodically whenever the service information is received from the at least one IoT device 4100.

In operation 4106, the server 4120 may determine an action event of the at least one IoT device 4100 based on the analysis results of the data input from the user and transmit information about the determined action event to the controller device 4110. For example, the server 4120 may convert the voice data into the text data (e.g., command) by analyzing the voice data by using an NLU module. Also, the server 4120 may convert the image data into the text data (e.g., command) by recognizing the characters included in the image by using an OCR module. The server 4120 may extract the text data (e.g., command) matched to the received image by comparing the template image with the received image by using an image recognizer.

The server 4120 may analyze the service information of the at least one IoT device 4100 based on the text data (e.g., command). For example, by analyzing the service information of the at least one IoT device 4100, the server 4120 may select the action event and the at least one IoT device 4100 for performing a predetermined function input from the user. For example, when the predetermined function is a function for outputting an alarm signal when the door is opened, by using the service information of the at least one IoT device 4100, the server 4120 may select a door lock device as the IoT device for outputting an alarm signal when the door is opened and determine 'Output Alarm Signal When Door is Opened' as the action event. In this case, the server 4120 may transmit action event information related to the door lock device ('IoT Device: Door Lock Device, Action: Output Alarm Signal When Door is Opened') to the controller device 4110.

According to an exemplary embodiment, when the predetermined function is a function for changing the indoor illumination or color, by using the service information of the at least one IoT device 4100, the server 4120 may select an illumination device (e.g., smart bulb) as the IoT device for changing the indoor illumination or color and determine 'Change Illumination or Color' as the action event. In this case, the server 4120 may transmit action event information related to the illumination device ('IoT Device: Illumination Device, Action: Change Illumination or Color') to the controller device 4110.

When the predetermined function is a function for collecting heart rate data, by using the service information of the at least one IoT device 4100, the server 4120 may select a wristband as the IoT device for collecting heart rate data and determine 'Collect Heart Rate Data' as the action event. In this case, the server 4120 may transmit action event information related to the wristband (e.g., 'IoT Device: Wristband, Action: Collect Heart Rate Data') to the controller device 4110.

In operation 4107, based on the action event information received from the server 4120, the controller device 4110 may transmit an execution command of a predetermined action to the at least one IoT device 4100. For example, the controller device 4110 may request the at least one IoT device 4100 to transmit predetermined data (e.g., heart rate, temperature, or acceleration) or to perform a predetermined operation (e.g., alarm signal output, illumination control, or color control).

In operation 4108, the at least one IoT device 4100 may transmit the execution result of the predetermined action to the controller device 4110. For example, the at least one IoT device 4100 may transmit the data requested by the controller device 4110 to the controller device 4110 or transmit a performance completion message of the predetermined operation to the controller device 4110.

In operation 4109, the controller device 4110 may transmit the execution result of the predetermined action received from the at least one IoT device 4100 to the server 4120.

According to an exemplary embodiment, the order of operations 4101 to 4109 may be changed. For example, operation 4101 may be performed after operation 4102 or operation 4103. Also, operation 4104 may be performed between operation 4101 and operation 4102.

Although FIG. 41 illustrates an exemplary case in which the user input is related to one action event, the user input may also be related to two or more action events. Below, the case in which different actions are consecutively performed by two or more IoT devices according to a user input will be described with reference to FIG. 42.

Figure 42:
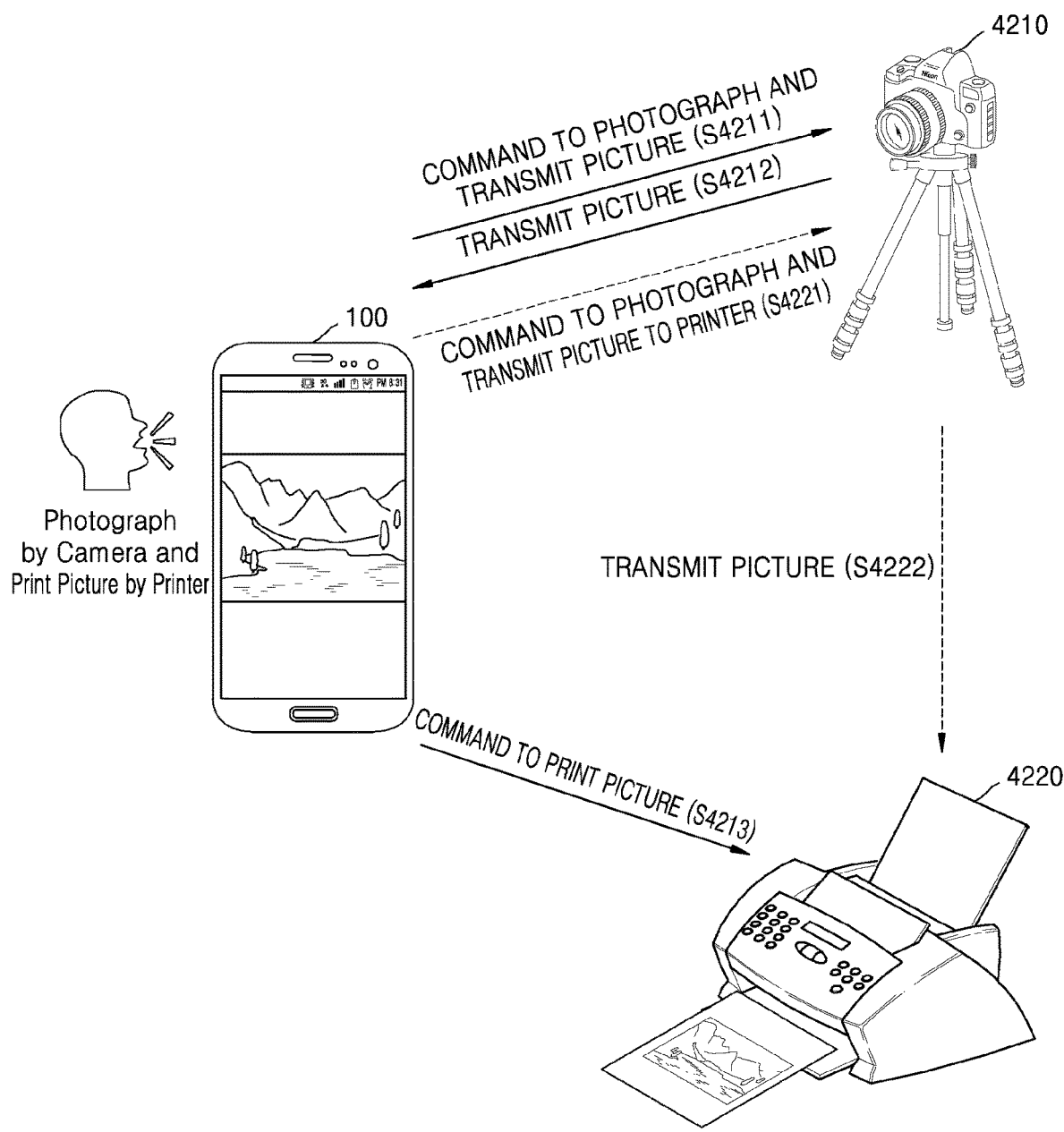
FIG. 42 is a diagram illustrating an example in which result data output from a first IoT device is used as an input parameter in a second IoT device, according to an exemplary embodiment.

FIG. 42 is a diagram illustrating an example in which result data output from a first IoT device is used as an input parameter in a second IoT device. FIG. 42 illustrates an exemplary case in which the device 100 receives a user's voice input 'Photograph by Camera and Print Picture by Printer'.

Referring to FIG. 42, in operation S4211, the device 100 may transmit first action event information (e.g., Command to Photograph and Transmit Picture) to a camera 4210 based on the analysis results of the user's voice input.

According to an exemplary embodiment, the device 100 may analyze the voice data by using an NLU module. Then, based on the analysis result data of the voice data, the device 100 may generate action event information related to the IoT devices. The device 100 may analyze the voice data of the user directly or through the server 200.

For example, the device 100 may extract two functions of a photographing function and a picture print function from the voice data. The device 100 may select the camera 4210 and a printer 4220 as the IoT devices in order to perform the extracted two functions. Also, the device 100 may determine Photographing, Picture Transmission, and Picture Print as actions that are necessary to perform the two functions. The device 100 may also determine the order of the actions. For example, the device 100 may determine the order of the actions so that the actions may be executed in the order of Photographing, Picture Transmission, and Picture Print. In this case, the device 100 may transmit the first action event information including a first action ID corresponding to Photographing and Picture Transmission to the camera 4210.

In operation S4212, in response to the first action event information, the camera 4210 may take a picture and transmit the taken picture to the device 100.

In operation S4213, when receiving the picture from the camera 4210, the device 100 may transmit second action event information (e.g., Picture Print Command) including a second action ID corresponding to Picture Print to the printer 4220 together with the received picture.

The printer 4220 may print the received picture in response to the second action event information. In this case, the picture taken by the camera 4210 in response to the first action event information may be input data that is used to execute the second action event (Picture Print).

According to an exemplary embodiment, the printer 4220 may transmit a picture print completion message to the device 100.

According to another exemplary embodiment, in operation S4221, the device 100 may transmit third action event information corresponding to 'Photograph and Transmit Picture to Printer' to the camera 4210. In operation S4222, the camera 4210 may take a picture in response to the third action event information and transmit fourth action event information for requesting print of the taken picture to the printer 4220 together with the taken picture.

The printer 4220 may print the picture received from the camera 4210 according to the fourth action event information.

According to an exemplary embodiment, when different actions are consecutively performed by two or more IoT devices, the result data of the first action may be used as an input parameter of the next action. For example, referring to FIG. 43, the result data of the first action performed by the first IoT device may be used as an input parameter of the second action that is to be performed by the second IoT device.

Figure 43:
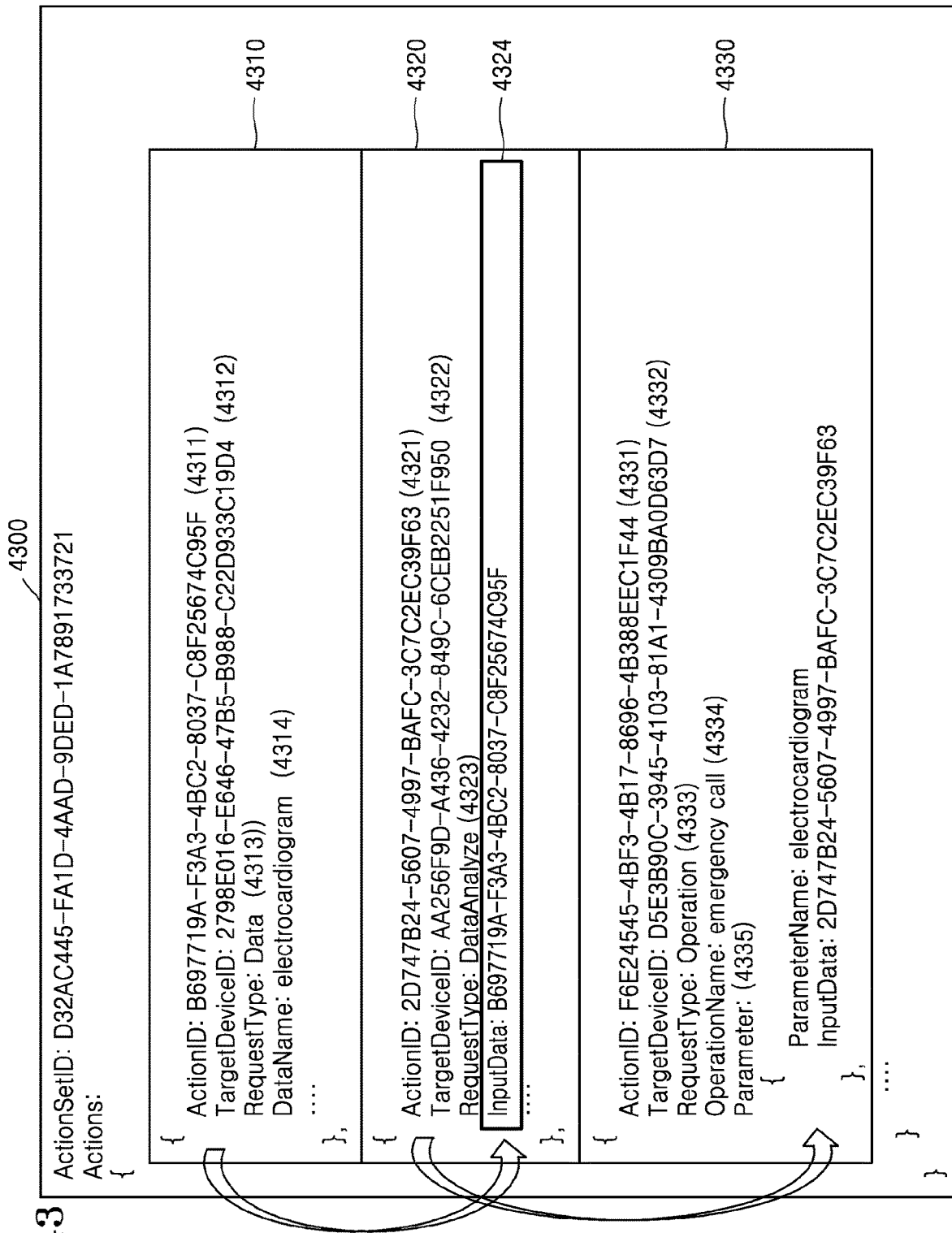
FIG. 43 is a diagram illustrating information about action events, according to an exemplary embodiment.

FIG. 43 is a diagram illustrating an example of information about action events. FIG. 43 illustrates an exemplary case in which the user inputs 'Measure/Analyze ECG and Make Emergency Call to Hospital When User is Determined to be in Emergency state Based on ECG Analysis Result' to the device 100.

Since the user inputs a command including actions, action event information 4300 generated by the device 100 or the server 200 by analyzing the user's input may include first action event information 4310, second action event information 4320, and third action event information 4330. In this case, a first action 4311 may be ECG Measurement, a second action 4321 may be ECG Data Analysis, and a third action 4331 may be Emergency Call.

The first action event information 4310 may include the first action 4311 (e.g., ActionID: B697719A-F3A3-4BC2-8037-C8F25674C95F, ECG Measurement), a first device 4312 (e.g., TargetDeviceID: 2798E016-E646-47B5-B988-C22D933C19D4, Wristband), a request type 4313 (e.g., RequestType: Data), and a data name 4314 (e.g., DataName: Electrocardiogram).

The second action event information 4320 may include the second action 4321 (e.g., ActionID: 2D747B24-5607-4997-BAFC-3C7C2EC39F63, ECG Data Analysis), a second device 4322 (e.g., TargetDeviceID: AA256F9D-A436-A232-849C-6CEB2251F950, Tablet), a request type 4323 (e.g., RequestType: DataAnalyze), an analyzer name (e.g., AnalyzerName: ECG Analyzer), and input data 4324 (e.g., InputData: B697719A-F3A3-4BC2-8037-C8F25674C95F).

The third action event information 4330 may include the third action 4331 (e.g., ActionID: F6E24545-4BF3-4B17-8696-4B388EEC1F44, Emergency Call), a third device 4332 (e.g., TargetDeviceID: D5E3B90C-3945-4103-81A1-4309BA0D63D7, Smart Phone), a request type 4333 (e.g., RequestType: Operation), an operation name 4334 (e.g., OperationName: Emergency Call), and a parameter 4335 (e.g., ParameterName: electrocardiogram, InputData: 2D747B24-5607-4997-BAFC-3C7C2EC39F63).

From the comparison between the first action event information 4310 and the second action event information 4320, it may be seen that the data of the first action 4311 is used as the input data 4324 of the second action 4321. Also, from the comparison between the second action event information 4320 and the third action event information 4330, it may be seen that the data of the second action 4321 is used as the input data of the third action 4331.

For example, when the first action 4311 (ECG Measurement) is performed by the first device 4312 (e.g., Wristband) and the second action 4321 (ECG Data Analysis) is performed by the second device 4322 (e.g., Tablet), the ECG data resulting from the first action 4311 in the first device 4312 may be used as the input data 4325 of the second action 4321 (ECG Data Analysis). Also, the analysis data resulting from the second action 4321 (ECG Data Analysis) in the second device 4322 (e.g., Tablet) may be used as the input data of the third action 4331 (Emergency Call) For example, when determining that the user is in an emergency state based on the analysis results of the ECG data in the second device 4322 (e.g., a heart rate increase, an irregular rhythm, and an abnormal ECG waveform), the third device 4332 may attempt an emergency call.

Figure 44:
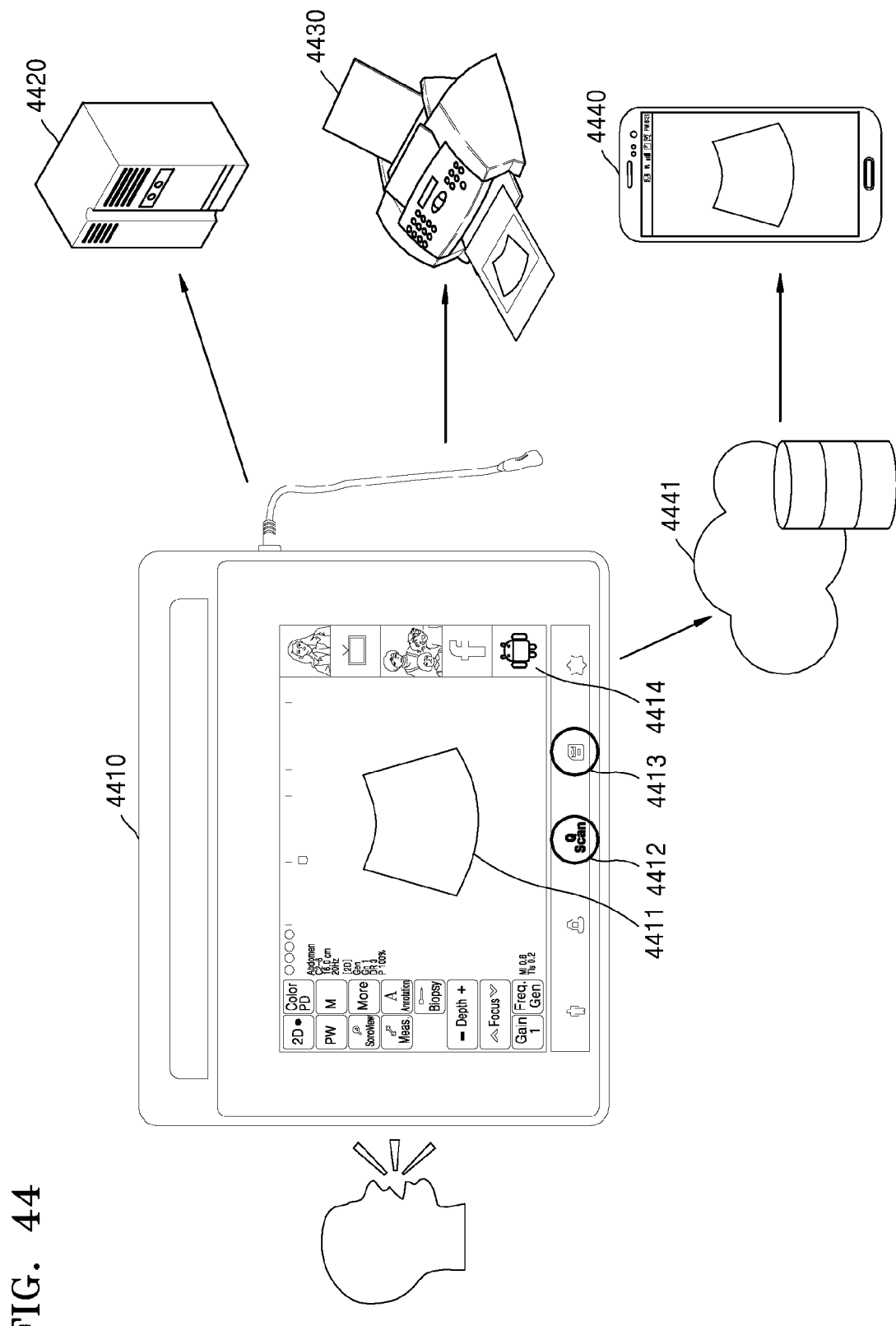
FIG. 44 is a diagram illustrating an example in which a medical device transmits data to an external device at the request of the user, according to an exemplary embodiment.

FIG. 44 is a diagram illustrating a system for sharing medical image data at the request of the user.

Referring to FIG. 44, the system for sharing medical image data may include, a medical device 4410, a medical institution server 4420, a printer 4430, a social networking service (SNS) server 4441, and a mobile phone 4440. However, not all of the illustrated components are necessary components. The system for sharing medical image data may include more or less components than the illustrated components.

The medical device 4410 may acquire medical images and display the medical images on a screen. For example, the medical device 100 may include, but is not limited to, an ultrasound device, a magnetic resonance imaging (MRI) device, a computerized tomography (CT) device, an X-ray photographing device, and/or an angiography device. Below, a case in which the medical device 4410 is an ultrasound device will be described as an example.

The medical device 4410 may receive a user input for requesting performance of a predetermined function. For example, the medical device 4410 may receive a user input including a command for acquiring an ultrasound image of a patient and a command for transmitting an ultrasound image to an external device. When the user input is a voice input, the medical device 4410 may convert the voice input into text data by using a voice recognition module and/or an NLU module.

The medical institution server 4420 may include a hospital server and/or a medical information management server (e.g., an electronic medical record (EMR) server, an electronic health record (EHR) server, and/or a personal health record (PHR) server).

According to an exemplary embodiment, the medical device 4410 may communicate with the medical institution server 4420 by long-range wireless communication. For example, when the user inputs a voice 'Capture Medical Image and then Transmit Medical Image to Hospital/Doctor' to the medical device 4410 in an emergency rescue field (e.g., an earthquake field, a building collapse field, or an ambulance), the medical device 4410 may acquire a medical image (e.g., ultrasound image or X-ray image) of the patient and transmit the acquired medical image (e.g., ultrasound image or X-ray image) to the medical institution server 4420 or a doctor terminal of the patient.

According to an exemplary embodiment, the medical device 4410 may exchange data with a hospital server or other medical devices in a hospital connected through a picture archiving and communication system (PACS). Also, the medical device 4410 may perform data communication according to the Digital Imaging and Communications in Medicine (DICOM) standard.

According to an exemplary embodiment, the medical device 4410 may acquire prestored medical image data and a medical treatment record of the patient from the medical institution server 4420 connected through the PACS.

According to an exemplary embodiment, the medical device 4410 may transmit the medical image data to the printer 4430 by long-range wireless communication or short-range wireless communication. For example, when the user inputs a voice 'Acquire and Output Ultrasound Image 4411 of Fetus' to the medical device 4410, the medical device 4410 may identify service information of the printer 4430 connected to the medical device 4410 and transmit the ultrasound image 4411 of the fetus and action event information (e.g., Output Ultrasound Image 4411 of Fetus) to the printer 4430. The printer 4430 may output the ultrasound image 4411 of the fetus based on the action event information received from the medical device 4410.

According to an exemplary embodiment, when an SNS application is installed in the medical device 4410, the medical device 4410 may transmit the medical image of the patient to the mobile phone 4440 through the SNS server 4441. For example, the medical device 4410 may transmit the ultrasound image 4411 of the patient to the family of the patient, friends, a designated hospital server, or the doctor's terminal (or the doctor's SNS account) through the SNS server 4441; however, the exemplary embodiments are not limited thereto.

For example, when the medical device 4410 is a portable tablet PC of a pregnant woman, the medical device 4410 may receive a voice input 'Send Ultrasound Image 4411 of Fetus to Husband' from the pregnant woman. In this case, the medical device 4410 may acquire the ultrasound image 4411 of the fetus by using the screen component information of an ultrasound application. For example, by generating an event for clicking a scan button 4412 by using the screen component information of the ultrasound application, the medical device 4410 may generate the ultrasound image 4411 of the fetus based on an ultrasound echo signal received from a probe. According to an exemplary embodiment, the scan button 4412 may be a button for quickly correcting the ultrasound image by using a parameter value preset in the medical device 4410. Also, the medical device 4410 may store the ultrasound image 4411 of the fetus by generating an event for clicking a Store button 4413 by using the screen component information of the ultrasound application.

Then, the medical device 4410 may transmit the ultrasound image 4411 of the fetus to the husband's terminal (or the husband's SNS account) by using the screen component information of an SNS application 4414 that is being executed. For example, the medical device 4410 may search for the husband in a friend list page by using the screen component information of the SNS application 4414, select the ultrasound image of the fetus in an image insertion page, and transmit the ultrasound image 4411 of the fetus to the husband's terminal or the husband's account by generating an event for clicking a Send button in a Send page.

According to an exemplary embodiment, in order to prevent the medical image from being exposed to other unauthorized persons, the medical device 4410 may encode the medical image and transmit the encoded medical image to the acquaintance's terminal through the SNS server 4441.

Figure 45:
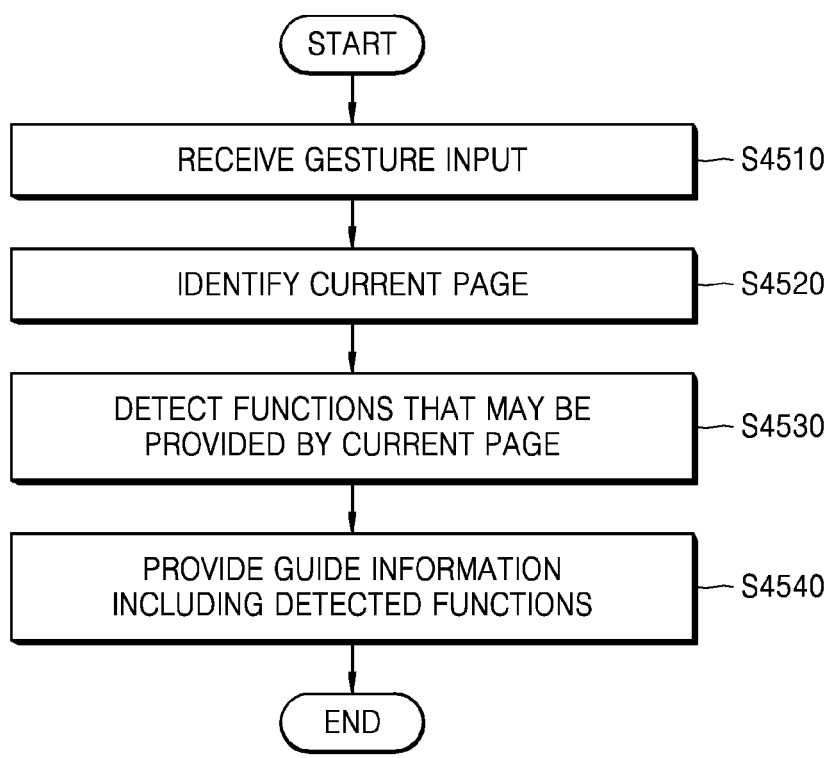
FIG. 45 is a flowchart illustrating a method for providing guide information by the device, according to an exemplary embodiment.

FIG. 45 is a flowchart illustrating a method for providing guide information by the device according to an exemplary embodiment.

Referring to FIG. 45, in operation S4510, the device 100 may receive a gesture input. In this case, the gesture input may be an input for requesting guide information.

The input for requesting guide information is not limited to the gesture input. For example, the input for requesting guide information may include a voice input, a motion input, a bending input, a key input, and/or a multiple/combination input in addition to the gesture input.

In operation S4520, the device 100 may identify the current page.

According to an exemplary embodiment, the device 100 may compare the information about the UI elements (UI objects) included in the current page with the information about the UI elements (UI objects) defined in the screen component information (UI description) of the application. Then, the device 100 may extract the page, which includes the UI elements (UI objects) that are most similar to the UI elements (UI objects) included in the current page, from among the pages defined in the screen component information (UI description). In this case, the current page may be extracted from the screen component information (UI description).

For example, when the current page includes the first object, the second object, the third object, and the fourth object and the first page among the pages provided by the messenger application also includes the first object, the second object, the third object, and the fourth object, the device 100 may identify that the current page is the first page provided by the messenger application.

In operation S4530, the device 100 may detect functions that may be provided by the current page.

According to an exemplary embodiment, from the information exchanged between the application and the platform for driving the application, the device 100 may extract information about the functions that may be provided by the current page.

Also, according to an exemplary embodiment, by using the screen component information (UI description) of the application, the device 100 may detect the functions that may be provided by the current page. For example, the screen component information (UI description) of the application may include information defining that function information corresponding to the current page includes 'Message Transmission' and 'Picture Transmission'.

In operation S4540, the device 100 may provide guide information including the detected functions.

According to an exemplary embodiment, the device 100 may display the detected functions in descending order of use frequency or priority. According to an exemplary embodiment, the guide information may be provided as a pop-up window.

Figure 46:
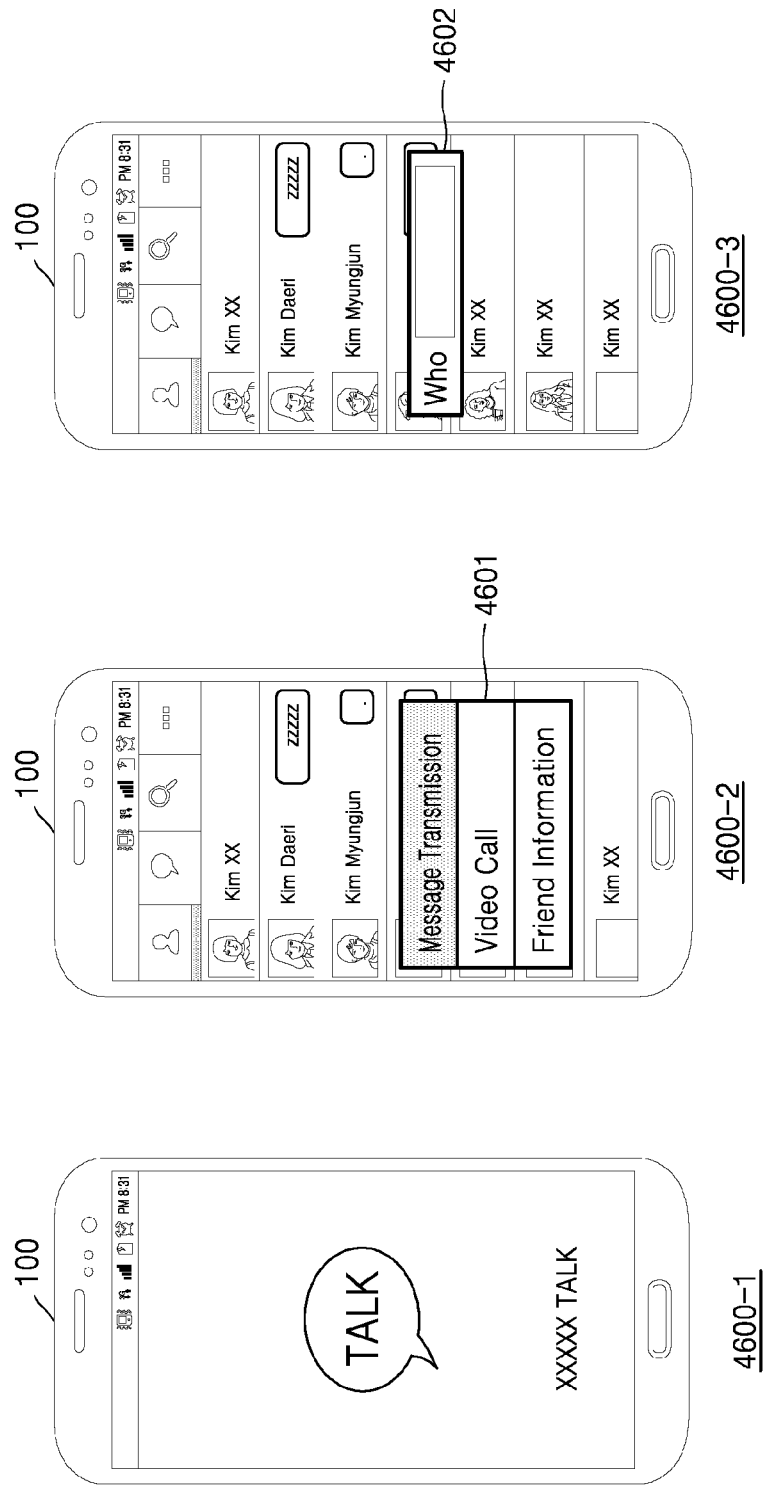
FIG. 46 is a diagram illustrating an example of providing guide information by the device.

FIG. 46 is a diagram illustrating an example of providing guide information by the device. FIG. 46 illustrates an exemplary case in which the application is a chat application.

Referring to FIG. 46, the device 100 may analyze a voice input pattern of the user. For example, the device 100 may receive user voice inputs 4610 'Execute OOO Talk to Send Tom Message "How Are You?"', 'Execute OOO Talk to Send Peter Message "Nice To Meet You"', and 'Execute OOO Talk to Send Andrew Message "Where are you?"' from the user. In this case, by analyzing the user voice inputs 4610, the device 100 may generate user input pattern information 4620 such as 'Execute OOO Talk to Send {argument1} Message "{argument2}"'. In this case, the user input pattern information 4620 may also include command usage information of the user.

Based on the user input pattern information 4620, the device 100 may provide guide information for allowing the user to easily input a voice command. For example, the device 100 may provide guide information by analyzing voice data in order of input even before the end of the user's utterance by using the streaming ASR method (see FIG. 24B).

Referring to 4600-1 of FIG. 46, when receiving a voice command 'Execute OOO Talk', the device 100 may execute the chat application (e.g., OOO Talk) by generating an event for clicking an OOO Talk icon in the launcher screen.

Referring to 4600-2 of FIG. 46, the device 100 may provide a list 4601 of functions, which are frequently used after the user executes the chat application (e.g., OOO Talk), as guide information. For example, when the user uses the functions in the chat application frequently in the order of Message Transmission, Video Call, and Friend Information Search, the device 100 may display 'Message Transmission' at the top of the function list 4601 and then display 'Video Call' and 'Friend Information' sequentially.

Referring to 4600-3 of FIG. 46, when the user selects 'Message Transmission' from the function list 4601, the device 100 may display an input window 4602, to which a friend name may be input as a message transmission target, as guide information.

According to an exemplary embodiment, the guide information may be provided as a pop-up window. In this case, the user may input a text-based command by using a pop-up window for providing the guide information.

Figure 47:
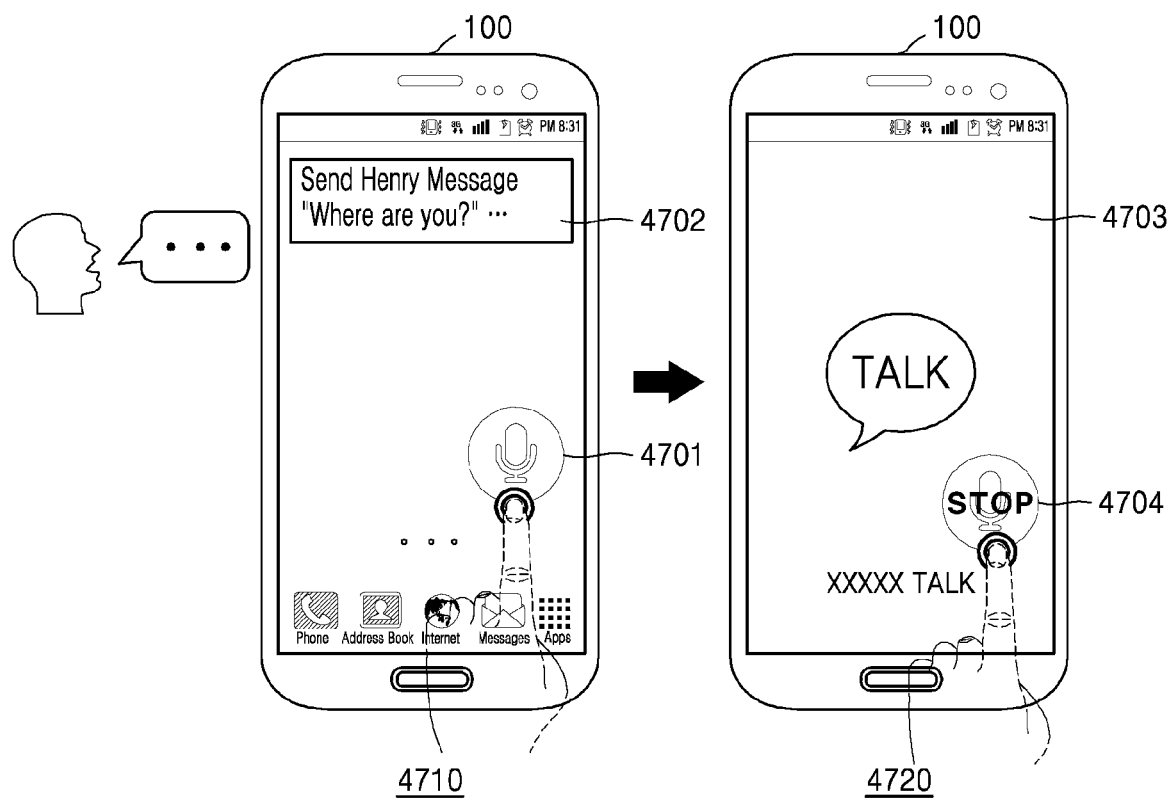
FIGS. 47 and 48 are diagrams illustrating an example of stopping function performance by the device based on a Cancel input of the user, according to an exemplary embodiment.
Figure 48:
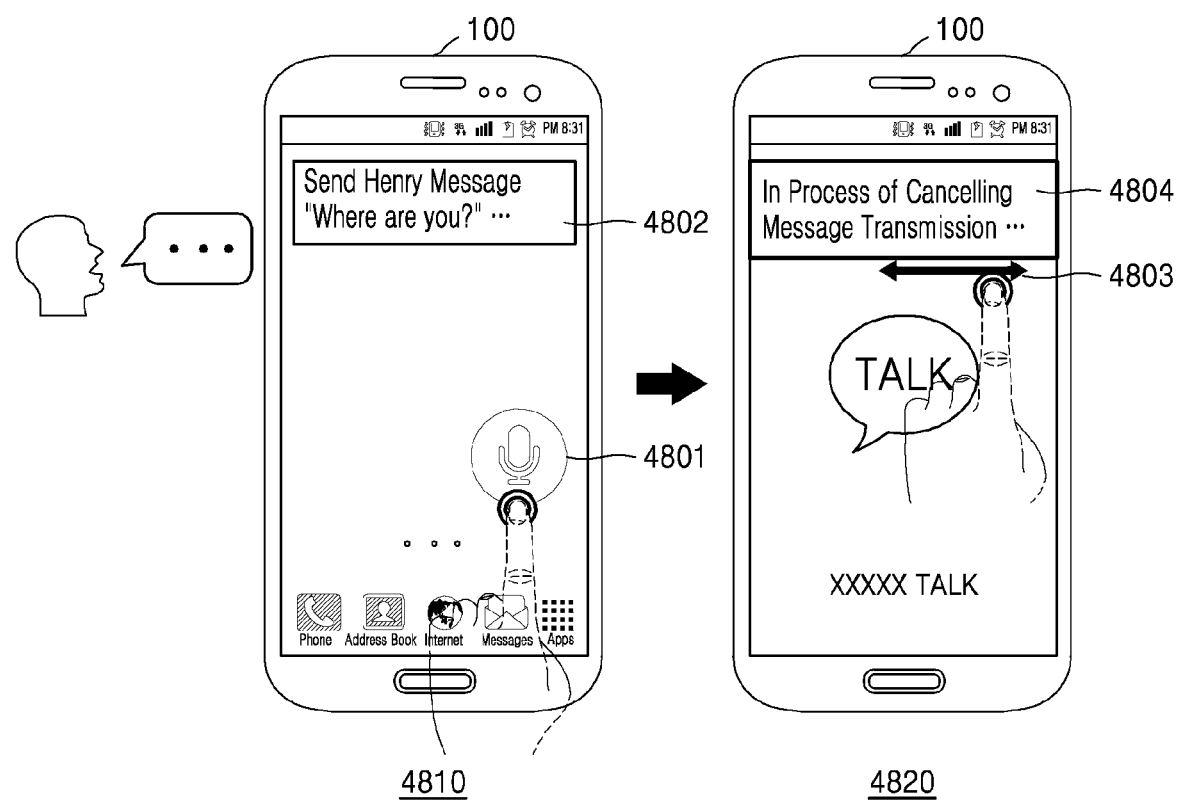

FIGS. 47 and 48 are diagrams illustrating an example of stopping function performance by the device based on a Cancel input of the user, according to an exemplary embodiment.

Referring to 4710 of FIG. 47, the device 100 may provide a voice recognition widget 4701. The user may input a voice command 4702 (e.g., 'Send Henry Message "Where are you?" . . . ') through the voice recognition widget 4701.

The voice recognition widget 4701 may occur when a predetermined event is generated. For example, the device 100 may provide the voice recognition widget 4701 when a predetermined hardware key attached to the device 100 is pressed for a predetermined time or more; however, the exemplary embodiments are not limited thereto.

According to an exemplary embodiment, when receiving the voice command 4702, the device 100 may determine the target page providing a message transmission function. Then, the device 100 may determine the path for transfer from the home page to the target page by using the screen component information (UI description) of an AAA application.

According to the determined path, the device 100 may automatically execute the AAA application (4703) and call a friend list page. The device 100 may search for 'Henry' in the friend list page and call a chat window for chatting with Henry. The device 100 may generate an event for inputting a text to the chat window and pressing a Send button.

Referring to 4720 of FIG. 47, the device 100 may receive a performance cancellation request from the user in the process of performing a user-requested function. For example, the device 100 may receive an input for touching the voice recognition widget 4704 where 'STOP' is displayed. In this case, the device 100 may stop the performance of the user-requested function.

Referring to 4810 of FIG. 48, the device 100 may provide a voice recognition widget 4801. The user may input a voice command 4802 (e.g., 'Send Henry Message "Where are you?" . . . ') through the voice recognition widget 4801. According to an exemplary embodiment, when receiving the voice command 4802, the device 100 may determine the target page providing a message transmission function. Then, the device 100 may determine the path for transfer from the home page to the target page by using the screen component information (UI description) of an AAA application.

According to the determined path, the device 100 may automatically execute the AAA application and call a friend list page. The device 100 may search for 'Henry' in the friend list page and call a chat window for chatting with Henry. The device 100 may generate an event for inputting a text to the chat window and pressing a Send button.

Referring to 4820 of FIG. 48, the device 100 may receive a performance cancellation request from the user in the process of performing a user-requested function. For example, the device 100 may receive a touch input 4803 of swiping in the horizontal direction. When the touch input 4803 of swiping in the horizontal direction is mapped to the performance cancellation request, the device 100 may stop the performance of the user-requested function. The device 100 may provide a notification message 4804 indicating the stop of the function performance (e.g., In Process of Cancelling Message Transmission . . . ).

Figure 49:
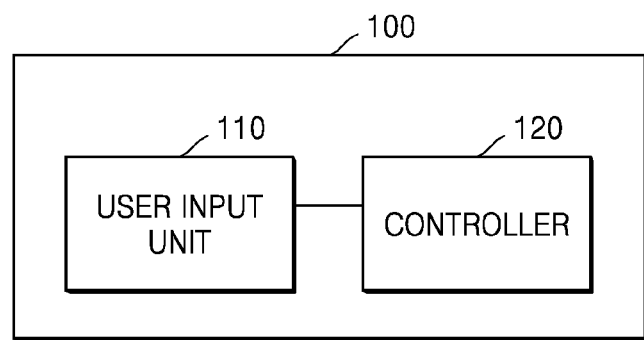
FIGS. 49 and 50 are block diagrams of the device according to one or more exemplary embodiments.
Figure 50:
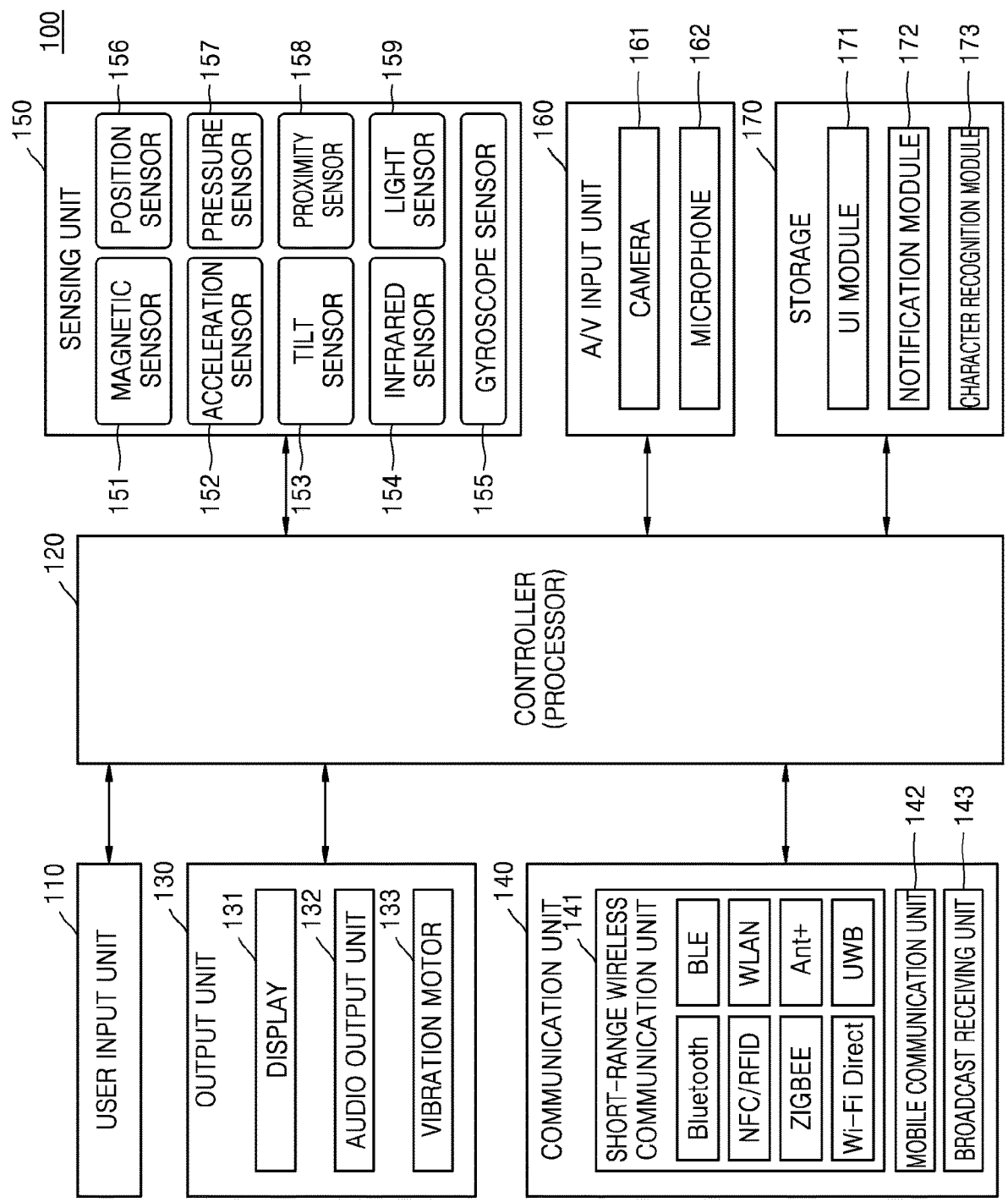

FIGS. 49 and 50 are block diagrams of the device according to one or more exemplary embodiments.

As illustrated in FIG. 49, the device 100 according to an exemplary embodiment may include a user input unit 110 and a controller 120. However, not all of the illustrated components are necessary components. The device 100 may include more or less components than the illustrated components.

For example, as illustrated in FIG. 50, the device 100 according to an exemplary embodiment may further include an output unit 130, a communication unit 140, a sensing unit 150, an audio/video (A/V) input unit 160, and a storage (memory) 170 in addition to the user input unit 110 and the controller 120.

The above components will be described below.

The user input unit 110 may refer to a unit through which the user inputs data for controlling the device 100. For example, the user input unit 110 may include, but is not limited to, a keypad, a dome switch, a touch pad (e.g., a capacitive overlay type, a resistive overlay type, an infrared beam type, a surface acoustic wave type, an integral strain gauge type, and a piezoelectric type), a jog wheel, and a jog switch.

The user input unit 110 may receive a user input for requesting performance of at least one function.

According to an exemplary embodiment, various user inputs may be used to request performance of at least one function. For example, the user inputs may include key inputs, gesture inputs (e.g., touch inputs and air gesture inputs), motion inputs, bending inputs, voice inputs, and/or multiple inputs.

According to an exemplary embodiment, the user input unit 110 may receive a user input including a condition for performance at least one function. For example, the user input may include condition information about a condition and function information about a function that has to be performed when the condition is satisfied.

According to an exemplary embodiment, the condition for performance of a function may include, but is not limited to, at least one of a schedule-based condition, a sensor input-based condition, an application state-based condition, and a user definition-based condition.

The user input unit 110 (e.g., user interface) may receive a performance cancellation request from the user in the process of performing a user-requested function. For example, the user input unit 110 may detect a gesture of a predetermined pattern or an input for selecting a predetermined button. In this case, the predetermined button may be a physical button or a GUI.

The controller 120 may control overall operations of the device 100. For example, the controller 120 may control overall operations of the user input unit 110, the output unit 130 (e.g., outputter), the communication unit 140, the sensing unit 150, and the AN input unit 160 by executing programs stored in the storage (e.g., memory) 170.

The controller 120 may install an application and generate screen component information of the application based on the use mode of the user about the installed application.

The screen component information of the application may include at least one of identification information of the application, information of UI elements included in screen pages of the application, transition information between the screen pages, and function information representing matches between the UI elements and functions provided by the application.

The controller 120 may acquire the information of the UI elements included in the screen pages of the application in order to generate the screen component information of the application. For example, the controller 120 may assign identifiers to the screen pages of the application and acquire the information of the UI elements included in the screen pages by analyzing a first UI element having text features and a second UI element having image features, which are included in the screen pages.

Also, the controller 120 may generate the function information representing the matches between the UI elements included in the screen pages and the functions provided by the application and analyze an input event for calling the screen pages to acquire the transition information between the screen pages.

When the information of the UI elements included in the screen pages of the application is changed, the controller 120 may update the stored screen component information of the application.

The controller 120 may determine a path for transfer from a current page displayed on the screen to a target page for providing at least one function by using the screen component information (UI description) defining the information about the UI elements (UI objects) provided by the application.

For example, the controller 120 may determine the target page for providing at least one function and identify the current page displayed on the screen. The controller 120 may determine paths for transfer from the current page to the target page and select the shortest path among the determined paths.

When the condition predetermined by the user is satisfied, the controller 120 may determine the path for transfer from the current page to the target page.

According to an exemplary embodiment, the controller 120 may call the target page according to the determined path and perform at least one function through the target page. For example, the controller 120 may sequentially call at least one intermediate page and the target page according to the determined path. The controller 120 may call a first intermediate page according to the determined path and generate an input event for calling the target page in the first intermediate page. The controller 120 may verify the called first intermediate page by using the screen component information (UI description) of the application.

According to an exemplary embodiment, the controller 120 may generate screen component information of an application that is newly installed through a predetermined application stored in the storage 170, or may perform a predetermined function through the screen component information. In this case, the predetermined application may be implemented on a platform or on an operating system (OS).

The output unit 130 may output an audio signal, a video signal, or a vibration signal and may include a display 131, an audio output unit 132, and a vibration motor 133.

The display 131 may display information processed by the device 100. For example, the display 131 may display at least one page provided by the application. The display 131 may display guide information for guiding a user input.

When the display 131 includes a touchscreen with a layer structure of a touch pad, the display 131 may also be used as an input device in addition to an output device. The display 131 may include at least one of a liquid crystal display (LCD), a thin film transistor liquid crystal display (TFT-LCD), an organic light-emitting diode (OLED) display, a flexible display, a three-dimensional (3D) display, and an electrophoretic display. Also, the device 100 may include two or more displays 131 according to embodiments.

The audio output unit 132 may output audio data received from the communication unit 140 or stored in the storage (memory) 170. Also, the audio output unit 132 may output audio signals related to functions (e.g., call signal reception, message reception, and notification) performed in the device 100. The audio output unit 132 may include a speaker and a buzzer.

The vibration motor 133 may output a vibration signal. For example, the vibration motor 133 may output a vibration signal corresponding to an output of audio data or video data (e.g., a call signal reception sound and a message reception sound). Also, the vibration motor 133 may output a vibration signal when a touch is input to the touchscreen.

The communication unit 140 (e.g., communicator) may include one or more components for allowing communication between the device 100 and the server 200 or between the device 100 and a wearable device. For example, the communication unit 140 may include a short-range wireless communication unit 141, a mobile communication unit 142, and a broadcast receiving unit 143.

The short-range wireless communication unit 141 may include, but is not limited to, a Bluetooth communication unit, a Bluetooth Low Energy (BLE) communication unit, a near field communication unit, a WLAN (Wi-Fi) communication unit, a ZigBee communication unit, an infrared data association (IrDA) communication unit, a WFD communication unit, an ultra wideband (UWB) communication unit, and/or Ant+ communication unit.

The mobile communication unit 142 (e.g., mobile communicator) may exchange wireless signals with at least one of a base station, an external terminal, and a server on a mobile communication network. Herein, the wireless signals may include voice call signals, video call signals, or various types of data for transmission and reception of text/multimedia messages.

The broadcast receiving unit 143 (e.g., broadcast receiver) may receive broadcast signals and/or broadcast-related information from external devices through broadcast channels. The broadcast channels may include satellite channels and terrestrial channels. In some exemplary embodiments, the device 100 may not include the broadcast receiving unit 143.

When the user input for requesting performance of at least one function is received as a voice signal, the communication unit 140 may transmit voice data corresponding to the voice signal to the server 200. The communication unit 140 may transmit the voice data to the server 200 after completion of the utterance of the user, or may transmit partial voice data to the server 200 during the utterance of the user. The communication unit 140 may receive the analysis results (e.g., text data) of the voice data from the server 200.

The communication unit 140 may receive the UI description corresponding to the application from the server 200. Also, the communication unit 140 may request the server to update the UI description of the application.

The sensing unit 150 may detect a state of the device 100, a peripheral state of the device 100, or a state of the user wearing the device 100 and transmit the detected state information to the controller 120.

The sensing unit 150 may include, but is not limited to, at least one of a magnetic sensor 151, an acceleration sensor 152, a tilt sensor 153, an infrared sensor 154, a gyroscope sensor 155, a position sensor (e.g., GPS sensor) 156, a pressure sensor 157, a proximity sensor 158, and a light sensor 159. The sensing unit 150 may include a temperature sensor, an illumination sensor, a pressure sensor, and an iris recognition sensor. Since those of ordinary skill in the art may intuitively infer the respective functions of the sensors from the respective names thereof, detailed descriptions thereof will be omitted.

The AN input unit 160 (e.g., AN inputter) may be used to input video signals or audio signals and may include a camera 161 and a microphone 162. The camera 161 may obtain a video frame such as a still image or a moving image in a video call mode or a photographing mode. The image captured through the camera 161 may be processed by the controller 120 or a separate image processing unit.

The image frame processed by the camera 161 may be stored in the storage (e.g., memory) 170 or may be transmitted to an external device through the communication unit 140. Two or more cameras 161 may be provided according to the configurations of the device 100.

The microphone 162 may receive an input of an external audio signal and process the same into electrical audio data. For example, the microphone 162 may receive an audio signal from an external device or a speaker. The microphone 162 may use various noise cancellation algorithms for cancelling a noise that may be generated in the process of receiving an input of an external audio signal.

The storage (memory) 170 may store a program for processing and control of the controller 120, and may store input/output data (e.g., an application, screen component information of the application, and content).

The storage (e.g., memory) 170 may include at least one type of storage medium from among a flash memory type, a hard disk type, a multimedia card micro type, card type memory (e.g., SD or XD memory), random-access memory (RAM), static random-access memory (SRAM), read-only memory (ROM), electronically erasable programmable read-only memory (EEPROM), programmable read-only memory (PROM), magnetic memory, a magnetic disk, and an optical disk. Also, the device 100 may operate a Web storage that performs a storage function of the storage (e.g., memory) 170 on the Internet.

The programs stored in the storage (memory) 170 may be classified into a plurality of modules according to their functions and may be classified into, for example, a UI module 171, a notification module 172, and a character recognition module 173.

The UI module 171 may provide a specialized UI and a GUI that interlocks with the device 100 for respective applications. The notification module 172 may generate a signal for notifying the generation of an event in the device 100. The notification module 172 may output a notification signal of a video signal type through the display 131, output a notification signal of an audio signal type through the audio output unit 132, and output a notification signal of a vibration signal type through the vibration motor 133.

The character recognition module 173 may perform character recognition (e.g., OCR) on a printed image included in a UI object. The OCR may refer to a technology that converts Korean characters, English characters, and numeral fonts included in an image object into character codes that may be edited in the device 100.

The storage (memory) 170 may store the screen component information of the application in a nonvolatile memory (e.g., flash memory). When the application is executed, the screen component information (UI description) of the application may be read and stored in the RAM.

The methods according to the exemplary embodiments may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the inventive concept, or may be those that are known and available to computer programmers skilled in the art. Examples of the computer-readable recording medium may include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands. Examples of the program commands may include machine language codes that may be generated by a compiler, and high-level language codes that may be executed by a computer by using an interpreter.

According to the above exemplary embodiments, since the device 100 automatically generates a realistic user input event in each page from the current page to the target page by using the screen component information (UI description), the device 100 may provide the user with a much easier experience than directly operating the device 100 by hand.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device comprising:
   a display configured to display at least one screen page of an application;

an audio inputter configured to receive audio of a user that includes a first voice command related to a first application and a second voice command related to a second application; and a controller configured to:

perform a first operation corresponding to the first voice command by using first screen page transition information for transitioning between screen pages of the first application, which is obtained from information about user interface (UI) elements included in the screen pages of the first application corresponding to the first voice command, provide the second application with performance result data of the first operation as input data of the second application corresponding to the second voice command, and perform a second operation corresponding to the second voice command by using second screen page transition information for transitioning between screen pages of the second application, which is obtained from information about UI elements included in the screen pages of the second application corresponding to the second voice command, wherein each of the UI elements is configured to perform a predetermined function in response to being selected by the user.

2. The device of claim 1, further comprising a memory configured to store the performance result data of the first operation.

3. The device of claim 2, wherein the controller is further configured to receive the performance result data of the first operation from the memory as the input data of the second application.

4. The device of claim 1, wherein the controller is further configured to determine a first transition path between the screen pages of the first application corresponding to the first voice command by using the first screen page transition information, and determine a second transition path between the screen pages of the second application corresponding to the second voice command by using the second screen page transition information.

5. The device of claim 4, wherein the controller is further configured to display the screen pages of the first application and the screen pages of the second application on the display sequentially based on the first transition path and the second transition path.

6. The device of claim 5, wherein the controller is further configured to generate an input event for controlling at least one UI element connecting the screen pages of the first application and the screen pages of the second application, to sequentially display the screen pages of the first application and the screen pages of the second application.

7. The device of claim 1, wherein the information about the UI elements comprises at least one of identification information of the UI elements, type information of input events for controlling the UI elements, application screen information connected with the UI elements, and function information connected with the UI elements.

8. The device of claim 1, wherein the controller is further configured to generate the information about the UI elements included in the screen pages of the first application by using information acquired to render the screen pages of the first application.

9. The device of claim 1, wherein the controller is further configured to identify a current page displayed on the display based on at least one of the information about the UI elements included in the screen pages of the first application and the information about the UI elements included in the screen pages of the second application.

10. The device of claim 1, wherein the first screen page transition information comprises at least one of identification information of the UI elements connecting the screen pages of the first application and input event information for controlling the UI elements connecting the screen pages of the first application, and the second screen page transition information comprises at least one of identification information of the UI elements connecting the screen pages of the second application and input event information for controlling the UI elements connecting the screen pages of the second application.

11. The device of claim 1, wherein the audio inputter provides the audio to a server and receives analysis results of the audio from the server.

12. A method of performing a function by a device, the method comprising:

receiving an audio of a user that includes a first voice command related to a first application and a second voice command related to a second application;

performing a first operation corresponding to the first voice command by using first screen page transition information for transitioning between screen pages of the first application, which is obtained from information about user interface (UI) elements included in the screen pages of the first application corresponding to the first voice command;

providing the second application with performance result data of the first operation as input data of the second application corresponding to the second voice command; and performing a second operation corresponding to the second voice command by using second screen page transition information for transitioning between screen pages of the second application, which is obtained from information about UI elements included in the screen pages of the second application corresponding to the second voice command, wherein each of the UI elements performs a predetermined function in response to being selected by the user.

13. The method of claim 12, wherein the performing the first operation corresponding to the first voice command comprises storing the performance result data of the first operation in a memory.

14. The method of claim 13, wherein the performing the second operation corresponding to the second voice command comprises receiving the performance result data of the first operation from the memory as the input data of the second application.

15. The method of claim 12, wherein the performing the first operation corresponding to the first voice command comprises determining a first transition path between the screen pages of the first application corresponding to the first voice command by using the first screen page transition information, and the performing the second operation corresponding to the second voice command comprises determining a second transition path between the screen pages of the second application corresponding to the second voice command by using the second screen page transition information.

16. The method of claim 15, further comprising displaying the screen pages of the first application and the screen pages of the second application sequentially based on the first transition path and the second transition path.

17. The method of claim 16, wherein the displaying of the screen pages of the first application and the screen pages of the second application sequentially based on the first transition path and the second transition path comprises generating an input event for controlling at least one UI element connecting the screen pages of the first application and the screen pages of the second application.

18. The method of claim 12, further comprising generating the information about the UI elements included in the screen pages of the first application by using information acquired for rendering the screen pages of the first application.

19. The method of claim 12, wherein the receiving the audio comprises:
providing the audio to a server; and
receiving analysis results of the audio from the server.

20. A non-transitory computer-readable recording medium having recorded thereon a program executable by a computer for performing the method of claim 12.

21. A method of performing a function by a device, the method comprising:
receiving a user input for requesting performance of at least one function and obtaining information of the at least one function by analyzing the user input;
comparing information about user interface (UI) elements included in a current page with information about UI elements of screen component information of at least one application and identifying the current page as a page of an application based on the comparison;
detecting a target page of the application among a plurality of pages of the application by using the screen component information of the application and the obtained information of the at least one function; and
determining a path for transitioning from the current page to the target page of the application, which is a page for providing the at least one function;
transitioning to the target page of the application according to the determined path; and
performing the at least one function through the target page of the application;
wherein the plurality of pages of the application include at least one intermediate page, wherein the determined path comprises the current page, the at least one intermediate page, and the target page, and wherein the transitioning to the target page of the application comprises sequentially displaying the at least one intermediate page and the target page.

22. The method of claim 21, wherein the at least one function comprises at least one of a message transmission function, an alarm function, a phone call function, a content upload function, an image capture function, a sound recording function, and an information search function.

23. The method of claim 21, wherein the user input comprises at least one of a voice input, a gesture input, a motion input, a bending input, a key input, an eye input, and a combination input.

24. The method of claim 21, wherein the transitioning to the target page comprises generating an input event for displaying the target page.

* * * * *